(12) United States Patent
Kerr et al.

(10) Patent No.: US 8,760,400 B2
(45) Date of Patent: Jun. 24, 2014

(54) GUI APPLICATIONS FOR USE WITH 3D REMOTE CONTROLLER

(75) Inventors: Duncan R. Kerr, San Francisco, CA (US); Nicholas V. King, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1689 days.

(21) Appl. No.: 12/113,593

(22) Filed: May 1, 2008

(65) Prior Publication Data

US 2009/0322676 A1    Dec. 31, 2009

Related U.S. Application Data

(60) Provisional application No. 60/967,835, filed on Sep. 7, 2007.

(51) Int. Cl.
*G06F 3/033* (2013.01)
*G09G 5/08* (2006.01)

(52) U.S. Cl.
USPC ........... 345/158; 345/156; 345/157; 345/173; 715/788; 715/790; 715/835; 715/856; 715/863

(58) Field of Classification Search
None
See application file for complete search history.

(56) References Cited

U.S. PATENT DOCUMENTS

| | | | |
|---|---|---|---|
| 5,122,785 A * | 6/1992 | Cooper | 345/163 |
| 5,554,980 A * | 9/1996 | Hashimoto et al. | 345/158 |
| 5,929,857 A * | 7/1999 | Dinallo et al. | 715/840 |
| 7,233,316 B2 | 6/2007 | Smith et al. | |
| 2001/0002830 A1 | 6/2001 | Rahn et al. | |
| 2002/0140746 A1 | 10/2002 | Gargi | |
| 2003/0122787 A1 * | 7/2003 | Zimmerman et al. | 345/173 |
| 2004/0218104 A1 | 11/2004 | Smith et al. | |
| 2004/0261037 A1 * | 12/2004 | Ording et al. | 715/788 |
| 2005/0055624 A1 | 3/2005 | Seeman et al. | |
| 2005/0212749 A1 * | 9/2005 | Marvit et al. | 345/156 |
| 2006/0026535 A1 | 2/2006 | Hotelling | |
| 2006/0152488 A1 * | 7/2006 | Salsman et al. | 345/158 |
| 2006/0152489 A1 | 7/2006 | Sweetser et al. | |
| 2006/0184966 A1 | 8/2006 | Hunleth et al. | |
| 2006/0250358 A1 | 11/2006 | Wroblewski | |
| 2006/0262105 A1 | 11/2006 | Smith et al. | |
| 2007/0067798 A1 | 3/2007 | Wroblewski | |

FOREIGN PATENT DOCUMENTS

| | | |
|---|---|---|
| CN | 1877506 | 12/2006 |
| JP | H07284166 A | 10/1995 |
| JP | 2004317733 A | 11/2004 |
| KR | 2006-0052673 A | 5/2006 |
| WO | 2004057454 A2 | 7/2004 |
| WO | 2006/119269 A2 | 11/2006 |
| WO | 2007060287 A1 | 5/2007 |

OTHER PUBLICATIONS

Summons to Attend Oral Proceedings mailed Mar. 29, 2012 in European Patent Application No. EP 08 829 672.8, 4 pages.

(Continued)

*Primary Examiner* — Jesus Hernandez
(74) *Attorney, Agent, or Firm* — Kilpatrick Townsend & Stockton LLP

(57) ABSTRACT

A remote wand for controlling the operations of a media system is provided. The wand may be operative to control the movement of a cursor displayed on screen by the position and orientation at which the wand is held. As the user moves the wand, the on-screen cursor may move. The user may use the wand to control a plurality of operations and applications that may be available from the media system, including for example zoom operations, a keyboard application, an image application, an illustration application, and a media application.

12 Claims, 42 Drawing Sheets

(56) References Cited

OTHER PUBLICATIONS

KR office action mailed Sep. 30, 2013 in KR 10-2012-7019094, 2 pages. (English Translation).

JP office action mailed Oct. 1, 2013 in JP 2010-524171, 2 pages. (English Translation).

Office Action mailed Apr. 23, 2014 in U.S. Appl. No. 12/113,588, 22 pages.

* cited by examiner

GUI APPLICATIONS FOR USE WITH 3D REMOTE CONTROLLER

CROSS-REFERENCE TO RELATED APPLICATION

This application claims priority to U.S. Provisional Patent Application No. 60/967,835, filed Sep. 7, 2007, which is incorporated by reference herein in its entirety.

BACKGROUND OF THE INVENTION

This invention is related to controlling a media system using a remote controller.

Some existing media systems may be controlled using a variety of different input mechanisms. For example, some media systems may be controlled by a user providing inputs directly on an interface of the media system (e.g., by pressing buttons incorporated on the media system, or by touching a touch-screen of the media system).

As another example, some media systems may be controlled by a user providing inputs remotely from the media system (e.g., using a remote controller). Some remote controllers may include one or more buttons that the user can press to direct the media system to perform one or more operations. The buttons may be operative to automatically perform one or more media system operations, or the buttons may be operative to select options displayed on-screen. In some embodiments, some remote controllers may provide the user inputs associated with the one or more buttons to the media system using a short-range communications protocol, such as, for example, infrared or radio frequency protocols. To ensure that the user input is properly received, the user may point the remote controller to a receiver of the media system to transmit the user input.

Although such existing remote controllers may be sufficient to control many media system operations, it would be desirable to provide additional mechanisms by which a user can control media system displays. In particular, it would be desirable to provide a mechanism by which the user's movements of a wand may be operative to remotely provide instructions for the media system to perform one or more operations.

SUMMARY OF THE INVENTION

A media system in which a user may control a media application operation by moving a wand is provided.

The media system may include an electronic device, a screen, and a wand. The electronic device may be operative to provide a media application to the user. The electronic device may direct the screen to display the interface of the media application so that the user may interact with the with the media application.

The user may interact with the media application using the wand. In some embodiments, the movements of the wand may be operative to control operations of the media application. For example, the wand may transmit information identifying the movements of the wand to the electronic device. In some embodiments, the user may provide instructions on an input interface of the wand to control operations of the media application.

The media system may identify the movements of the wand using any suitable approach. For example, at least one motion detection component (e.g., an accelerometer or a gyroscope) may be incorporated in the wand. When the user moves the wand, the at least one motion detection component may detect the motion, and identify information related to the output. The wand may then transmit the identified information to the electronic device. For example, the wand may transmit the output of the at least one motion detection component to the electronic device. As another example, the wand may determine, based on the output of the at least one motion detection component, the amount and orientation of the movement of the wand, and transmit the determined amount and orientation. In some embodiments, the wand may provide movement information to the electronic device each time the user moves the wand (e.g., transmit as soon as the output of the at least one motion detection component exceeds a threshold), the wand may continuously transmit the output of the at least one motion detection component, or the wand may only transmit the output of the at least one motion detection component in response to first receiving an input on an input mechanism of the wand (e.g., press a button and move the wand).

As an example of another approach for identifying the movements of the wand, the wand or the electronic device may determine the absolute position of the wand relative to one or more infrared modules positioned adjacent the screen. The wand may include an optical component for capturing images of the infrared modules, and may calculate its orientation and distance from the modules based on the captured images. In some embodiments, the electronic device may direct the infrared modules to identify the position of an infrared emitter incorporated on the wand (e.g., by sequentially capturing images of the wand), and may calculate the absolute position of the wand relative to the infrared modules (e.g., using triangulation algorithms).

The media system may be operative to receive a transmission from the wand indicating that the wand was moved. The media system may identify, based on the received transmission from the wand, a media application operation to perform. For example, the media system may change the position of a cursor on the screen based on the movement of the wand (e.g., to follow the movement of the wand). As another example, the media system may perform an operation with a media playback application, image application, or illustration application. As still another example, the media system pay provide a keyboard application by which the user may select and enter characters (e.g., to login to the media system).

In some embodiments, the media system may provide a flashlight application by which only a portion of the screen is illuminated. The user may control the illuminated portion of the screen by moving the wand. For example, as the user moves the wand, the wand may transmit information identifying the movement of the wand. In response to receiving the information identifying the movement of the wand, the media system may change the portion of the screen that is illuminated to follow movement of the wand.

In some embodiments, the media system may change the size of the content displayed on the screen (e.g., zoom the content) in response to receiving an instruction from the wand. For example, in some embodiments the user may provide an input on an input mechanism of the wand (e.g., a touchpad or a button) to direct the content displayed on the screen to be zoomed. As another example, the media system may determine whether the user has moved the wand towards the screen (e.g., using the output of a motion detection component, or by determining the position of the wand relative the screen using infrared modules). In some embodiments, only specific media application displays may be zoomed.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
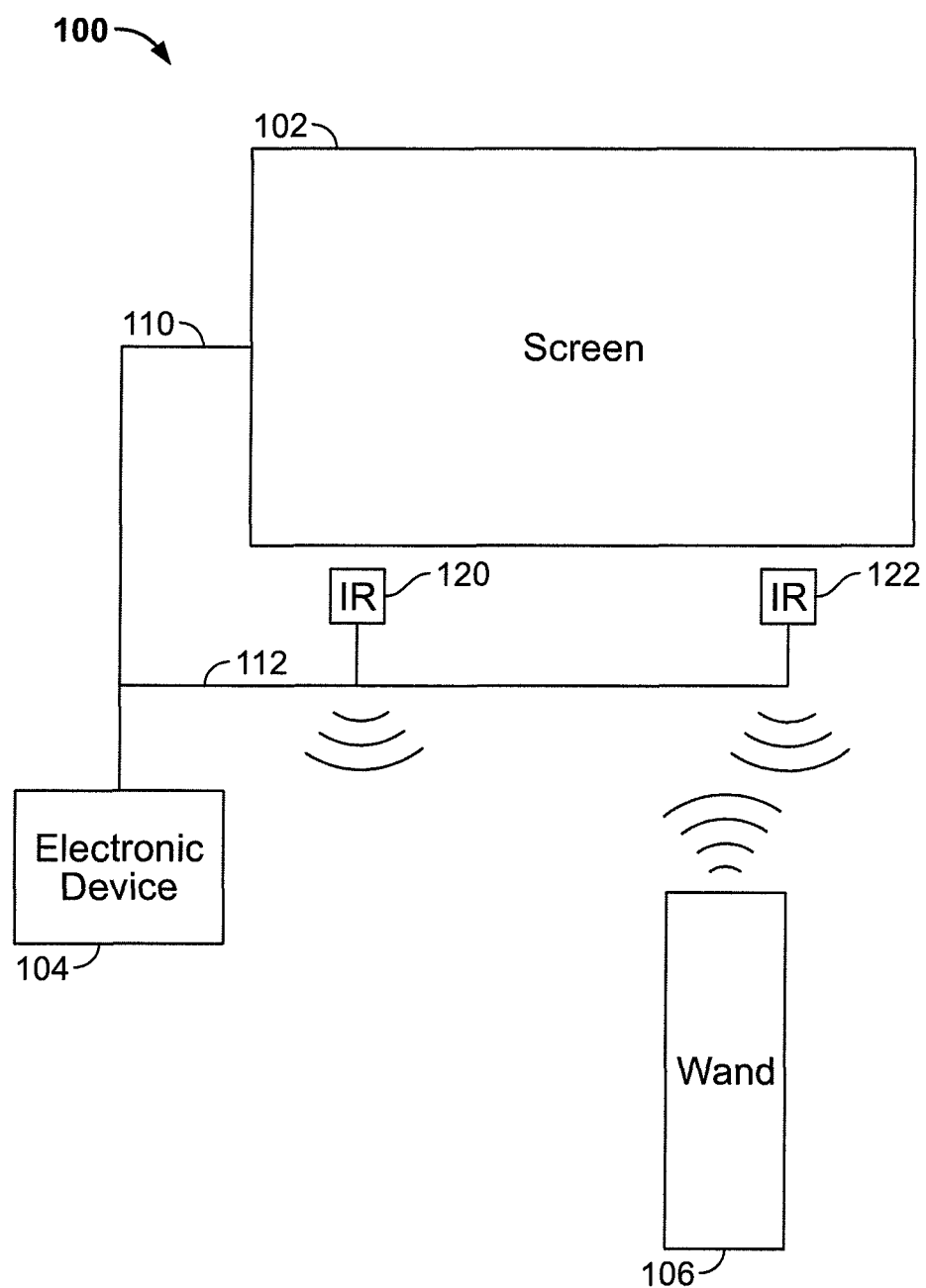
FIG. 1 is a schematic view of an illustrative media system by which a user may control the display of a screen based on the orientation of a remote wand in accordance with one embodiment of the invention.

FIG. 1 is a schematic view of an illustrative media system by which a user may control the display of a screen based on the orientation of a remote wand in accordance with one embodiment of the invention.

As shown in FIG. 1, media system 100 may include screen 102, electronic device 104 and wand 106. Screen 102 may be any suitable screen for displaying media or other content to a user. For example, screen 102 may be a television, a projector, a monitor (e.g., a computer monitor), a media device display (e.g., a media player or video game console display), a communications device display (e.g., a cellular telephone display), a component coupled with a graphical output device, any combinations thereof, or any other suitable screen.

Electronic device 104 may be coupled to screen 102 by link 110. Link 110 may be any suitable wired link, wireless link, or any suitable combination of such links for providing media and other content from electronic device 104 to screen 102 for display. For example, link 110 may include a coaxial cable, multi cable, optical fiber, ribbon cable, High-Definition Multimedia Interface (HDMI) cable, Digital Visual Interface (DVI) cable, component video and audio cable, S-video cable, DisplayPort cable, Visual Graphics Array (VGA) cable, Apple Display Connector (ADC) cable, USB cable, Firewire cable, or any other suitable cable or wire for coupling electronic device 104 with screen 102. As another example, link 110 may include any suitable wireless link for coupling electronic device 104 with screen 102. The wireless link may use any suitable wireless protocol including, for example, cellular systems (e.g., 0G, 1G, 2G, 3G, or 4G technologies), short-range radio circuitry (e.g., walkie-talkie type circuitry), infrared (e.g., IrDA), radio frequency (e.g., Dedicated Short Range Communications (DSRC) and RFID), wireless USB, Bluetooth, Ultra-wideband, high frequency systems (e.g., 900 MHz, 2.4 GHz, and 5.6 GHz communication systems), wireless local area network protocols (e.g., WiFi and Hiperlan), or any other suitable wireless communication protocol.

Electronic device 104 may be any suitable electronic device for providing content for display to screen 102. The content may include, for example, media (e.g., music, video and images), guidance screens (e.g., guidance application screens), software displays (e.g., Apple iTunes screens or Adobe Illustrator screens), prompts for user inputs, or any other suitable content. In some embodiments, electronic device 104 may be operative to generate content or displays that may be provided to screen 102. For example, electronic device 104 may include a desktop computer, a laptop or notebook computer, a personal media device (e.g., an iPod), a cellular telephone, a mobile communications device, a pocket-sized personal computer (e.g., an iPAQ or a Palm Pilot), a camera, a video recorder, or any other suitable electronic device.

In some embodiments, electronic device 104 may instead or in addition be operative to transmit content from a host device (not shown) to screen 102. For example, electronic device 104 may include a routing device, a device for streaming content to screen 102, or any other suitable device. In some embodiments, electronic device 104 may include an Apple TV sold by Apple Inc. of Cupertino, Calif. Electronic device 104 may be operative to receive content from the host device in any suitable manner, including any of the wired or wireless links described above in connection with link 110. The host device may be any suitable device for providing content to electronic device 104.

The following example will serve to illustrate an embodiment of this system. The host device may be a computer on which media is stored and played back using any suitable media application (e.g., iTunes, Windows Media Player, or Winamp). The electronic device may be an Apple TV device. Using a WiFi (e.g., 802.11) communications protocol, the Apple TV device may synch with the iTunes software on the host computer to provide listings of content available on a television screen. In response to a user selection of particular media content using a remote controller associated with the Apple TV device, the Apple TV device may stream the selected media content from the computer, and provide the streamed content to the television screen in high definition over an HDMI connection. Thus, the user may view the content stored on the host computer on a larger television screen.

To control media system 100, the user may provide instructions to electronic device 104 using wand 106. Wand 106 may include any suitable input device for providing user instructions to electronic device 104. Wand 106 may be formed into any suitable shape, including for example an elongated object, a round object, a curved object, a rectangular object, or any other suitable shape. Wand 106 may be operative to wirelessly transmit user instructions to electronic device 104 using any suitable wireless communications protocol, including those described above in connection with link 110. For example, wand 106 may be operative to transmit instructions using an infrared communications protocol by which information is transmitted from wand 106 to one of IR modules 120 and 122, and then transmitted to electronic device 104 through link 112. As another example, wand 106 may communicate directly with electronic device 104 using a Bluetooth or WiFi communications protocol.

Wand 106 may include one or more input mechanisms (e.g., buttons or switches) for providing user inputs to electronic device 104. In some embodiments, the input mechanism may include positioning or moving the wand in a specific manner. For example, wand 106 may be operative to identify a user input in response to the user flicking, spinning, rolling or rotating the wand in a particular direction or around a particular axis. As an illustration, a flick of the wrist may rotate wand 106, causing wand 106 to provide a SELECT or other instruction to electronic device 104. The user may move wand 106 in any direction with respect to the x axis (e.g., movement left and right on the screen), y axis (e.g., movement up and down on the screen), and z axis (e.g., movement back and forth from the screen).

Wand 106 may be operative to control a cursor (e.g., a pointer or a highlight region) displayed on screen 102 to access operations provided by electronic device 104. In some embodiments, the user may control the displacement of the cursor by the displacement of wand 106. Media system 100 may use any suitable approach for correlating the movement of wand 106 with the position of a cursor. For example, wand 106 may include one or more accelerometers, gyroscopes, or other motion detection components. Wand 106 may be operative to transmit motion detected by the motion detection component to electronic device 104. For example, wand 106 may identify motion in the x-y plane, and transmit the motion to electronic device 104, which may direct display screen 102 to displace a cursor in accordance with the motion of wand 106. Wand 106 may also include an input mechanism (e.g., a wheel or a touch strip) for providing inputs in the z direction to electronic device 104 (e.g., instead of or in addition to identifying motion of wand 106 in the z direction).

As another example for correlating the movement of wand 106 with the position of a cursor, IR modules 120 and 122 may be provided in the vicinity of screen 102. Media system 100 may include any suitable number of IR modules 120 and 122, but for the sake of clarity only two are shown in FIG. 1. IR modules 120 and 122 may be operative to emit infrared light for detection by wand 106. Wand 106 may be operative to detect the light emitted by IR modules 120 and 122, and determine its position and orientation relative to screen 102 by identifying its position and orientation relative to IR modules 120 and 122. Wand 106 may be operative to transmit the position and orientation information to electronic device 104, which may convert the position and orientation information into coordinates for the cursor or into an action to be performed (e.g., zoom in or scroll). In some embodiments, wand 106 may be operative to convert the position and orientation information into coordinates for the cursor or an action to be performed, and transmit the coordinates or action to electronic device 104.

In some embodiments, wand 106 may be operative to emit infrared light, and IR modules 120 and 122 may be operative to receive the light emitted by wand 106. IR modules 120 and 122 and electronic device 104 may then be operative to determine, based on the angle at which the light emitted by wand 106 is received, and based on the intensity of the received light, the position of wand 106 relative to IR modules 120 and 122.

In some embodiments, media system 100 may include a plurality of wands 106, for example one for each user. For the sake of clarity, only one wand 106 is shown in FIG. 1. Each wand may be operative to control a different cursor, or a different portion of the screen. In some embodiments, each wand may have a different priority such that when more then one wand is in use, the wand with the highest priority controls operations displayed on screen 102. In some embodiments, each wand 106 may be operative to provide a unique signal to electronic device 104, thus allowing electronic device 104 to identify the user of media system 100, and thus provide a user-specific media experience (e.g., load user-specific settings or preferences, or provide user-specific media).

Figure 2:
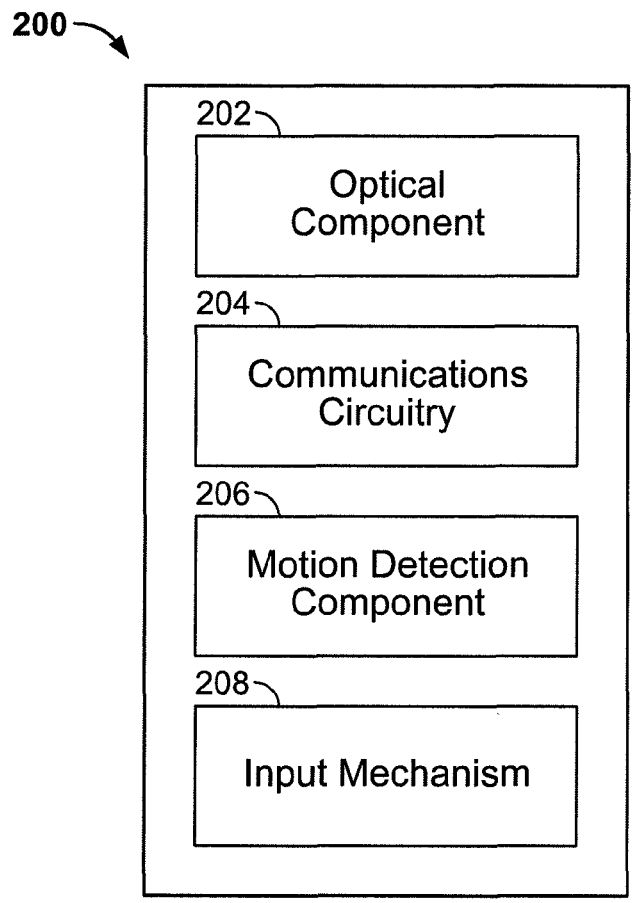
FIG. 2 is a schematic view of a wand in accordance with one embodiment of the invention.

FIG. 2 is a schematic view of a wand in accordance with one embodiment of the invention. Illustrative wand 200 may include optical component 202, communications circuitry 204, motion detection component 206 and input mechanism 208.

Optical component 202 may be operative to receive and process infrared light received from IR modules 120 and 122 (FIG. 1). In some embodiments, optical component 202 may include an infrared filter, a lens, an image pickup element and image processing circuitry (not shown). The infrared filter may be operative to prevent all light waves other than IR light from reaching the lens, which may be positioned directly behind the infrared filter. The lens may be operative to pick up the light that passed through the infrared filter and may provide the light to the image pickup element. The image pickup element may be operative to take an image of the light received from the lens, and may provide the image data to the image processing circuitry. In some embodiments, the image pickup element may include a solid-state imaging device such as, for example, a CMOS (complimentary metal-oxide semiconductor) sensor or a CCD (charge-coupled device). The image processing circuitry may be operative to process the image data received from the image pickup element to identify bright spots corresponding to the IR modules, and provide position information, orientation information, or both to communications circuitry 204.

Communications circuitry 204 may be operative to transmit position and orientation information and user inputs from wand 200 to the electronic device (e.g., electronic device 104, FIG. 1). In some embodiments, communications circuitry 204 may include a processor, memory, a wireless module and an antenna. The processor may be operative to control the wireless module for transmitting data stored or cached in the memory.

Communications circuitry 204 may transmit any suitable data. For example, the processor may be operative to transmit optical information received from optical component 202 (e.g., result data from the image processing circuitry), motion information received from motion detection component 206 (e.g., acceleration signals) and user inputs received from input mechanism 208. In some embodiments, the process may temporarily store the data in the memory to organize or process the relevant data prior to transmission by the wireless module. In some embodiments, the wireless module may transmit data at predetermined time intervals, for example every 5 ms. The wireless module may be operative to modulate the data to be transmitted on an appropriate frequency, and may transmit the data to electronic device 104. The wireless module may use any suitable communications protocol as described above in connection with wand 106, including for example Bluetooth.

In some embodiments, instead of or in addition to optical component 202, wand 200 may include motion detection component 206 that may be operative to detect the movement of wand 200 as a user moves the wand. Motion detection component 206 may include any suitable element for determining the change in orientation of the wand. For example, motion detection component 206 may include one or more three-axis acceleration sensors that may be operative to detect linear acceleration in three directions (i.e., the x or left/right direction, the y or up/down direction, and the z or forward/backward direction). As another example, motion detection component 206 may include one or more two-axis acceleration sensors which may be operative to detect linear acceleration only along each of x or left/right and y or up/down directions (or any other pair of directions). In some embodiments, the acceleration sensor may include an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer.

Because in some embodiments motion detection component 206 may include only linear acceleration detection devices, motion detection component 206 may not be operative to directly detect rotation, rotational movement, angular displacement, tilt, position, orientation, motion along a non-linear (e.g., arcuate) path, or any other non-linear motions. Using additional processing, however, motion detection component 206 may be operative to indirectly detect some or all of these non-linear motions. For example, by comparing the linear output of motion detection component 206 with a gravity vector (i.e., a static acceleration), motion detection component 206 may be operative to calculate the tilt of wand 200 with respect to the y-axis.

In some embodiments, motion detection component 206 may include one or more gyro-sensors or gyroscopes for detecting rotational movement. For example, motion detection component 206 may include a rotating or vibrating element. In some embodiments, motion detection component 206 used in wand 200 may be operative to detect motion of wand 200 in the x-y plane (e.g., left/right and up/down movements of wand 200) so as to move a cursor or other element displayed on the screen (e.g., on screen 102, FIG. 1). For example, movement of wand 200 in the x-direction detected by motion detection component 206 may be transmitted to the electronic device associated with wand 200 to cause a cursor or another element of a display to move in the x-direction. To move a cursor or an element of the screen in the z-direction (e.g., when advancing into the screen in 3-D displays, or for zooming a display), wand 200 may include a separate input mechanism (described below).

Input mechanism 208 may be any suitable mechanism for receiving user inputs. For example, input mechanism 208 may include a button, keypad, dial, a click wheel, or a touch screen. In some embodiments, the input mechanism may include a multi-touch screen such as that described in U.S. patent application Ser. No. 11/038,590, filed Jan. 18, 2005, which is incorporated by reference herein in its entirety. The input mechanism may emulate a rotary phone or a multi-button keypad, which may be implemented on a touch screen or the combination of a click wheel or other user input device and a screen.

In some embodiments, input mechanism 208 may include a button or other mechanism for activating optical component 202, motion detection circuitry 206, or both. For example, input mechanism 208 may include a mechanism for activating optical component 202 for the position of wand 200 to provide inputs to the electronic device (e.g., unless the user activates optical component 202 using the input mechanism, wand 200 may not transmit position information and movements of wand 200 may not control the position of a cursor on the screen). As another example, input mechanism 208 may include a mechanism for activating motion detection component 206 for the user's movements of wand 200 to provide inputs to the electronic device (e.g., unless the user activates motion detection component 206, wand 200 may ignore movements of wand 200 and not provide orientation information to the electronic device). In some embodiments, input mechanism 208 may include a scroll wheel, touch pad, joystick, or other mechanism for providing inputs in the z-direction. For example, when motion detection component 206 is operative to provide instructions for moving a cursor or other on-screen element in the x or y directions, input mechanism 208 may include a mechanism for providing instructions to move an on-screen element in the z-direction, or to perform other electronic device operations for which a user may provide an input in the z-direction.

Figure 3:
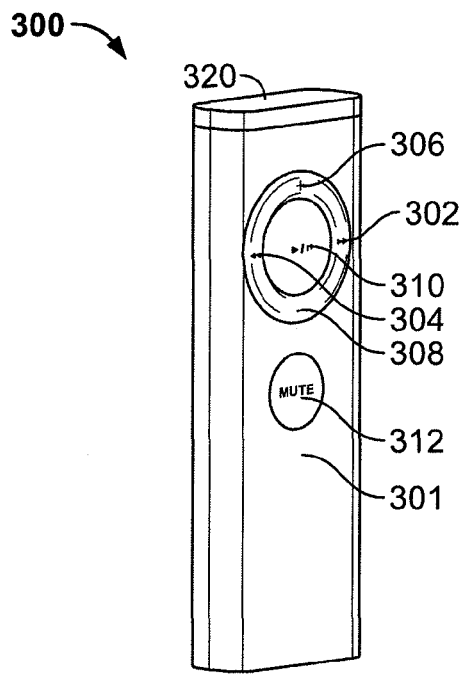
FIG. 3 is a perspective view of an illustrative wand in accordance with one embodiment of the invention.

FIG. 3 is a perspective view of an illustrative wand in accordance with one embodiment of the invention. Wand 300 may include input mechanism 301 and optical input portion 320. Input mechanism 301 may be any suitable mechanism, including any of the input mechanisms identified above in connection with input mechanism 208 of wand 200 (FIG. 2). In some embodiments, input mechanism 301 may include a plurality of buttons, each operative to perform one or more functions. In the example of FIG. 3, input mechanism 301 may include NEXT button 302, PREVIOUS button 304, UP button 306, DOWN button 308, SELECT button 310 and MENU button 312. In some embodiments, other buttons may include, for example, VOLUME UP, VOLUME DOWN, PLAY, and STOP buttons. In some embodiments, input mechanism 301 may include a mechanism for providing instructions to control electronic device operations in z-axis (e.g., to move a cursor in the z-axis, or to zoom a display). The input mechanism may include any suitable input mechanism such as, for example, a scroll wheel, a joystick, a touchpad, a click-wheel, or any other suitable mechanism.

Optical input portion 320 may be positioned on any suitable surface of wand 300. In some embodiments, optical input portion 320 may be positioned such that it is located on a side of wand 300 that faces away from the user (and towards the screen) when wand 300 is in use. This may allow a user to point wand 300 at the screen to control a cursor or other element displayed on the screen. Optical input portion 320 may include a filter, for example an IR filter operative to allow only infrared light transmitted by IR modules 120 and 122 (FIG. 1) to enter wand 300. As discussed above in connection with FIG. 2, wand 300 may determine its position relative to the screen based on the light received through optical input portion 320, and provide that information to an electronic device (e.g., electronic device 104, FIG. 1) using any suitable wireless communications protocol.

Figure 4:
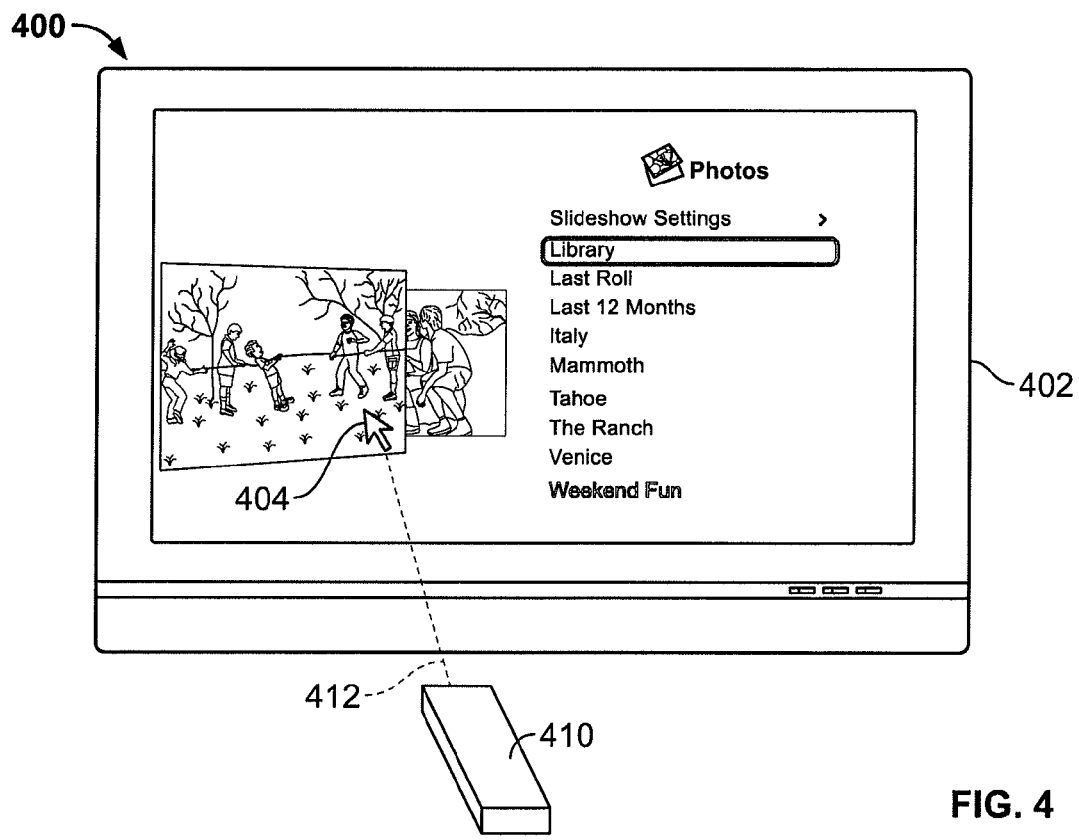
FIGS. 4 and 5 are illustrative display screens showing the movement of a cursor in response to the movement of a wand in accordance with one embodiment of the invention.
Figure 5:
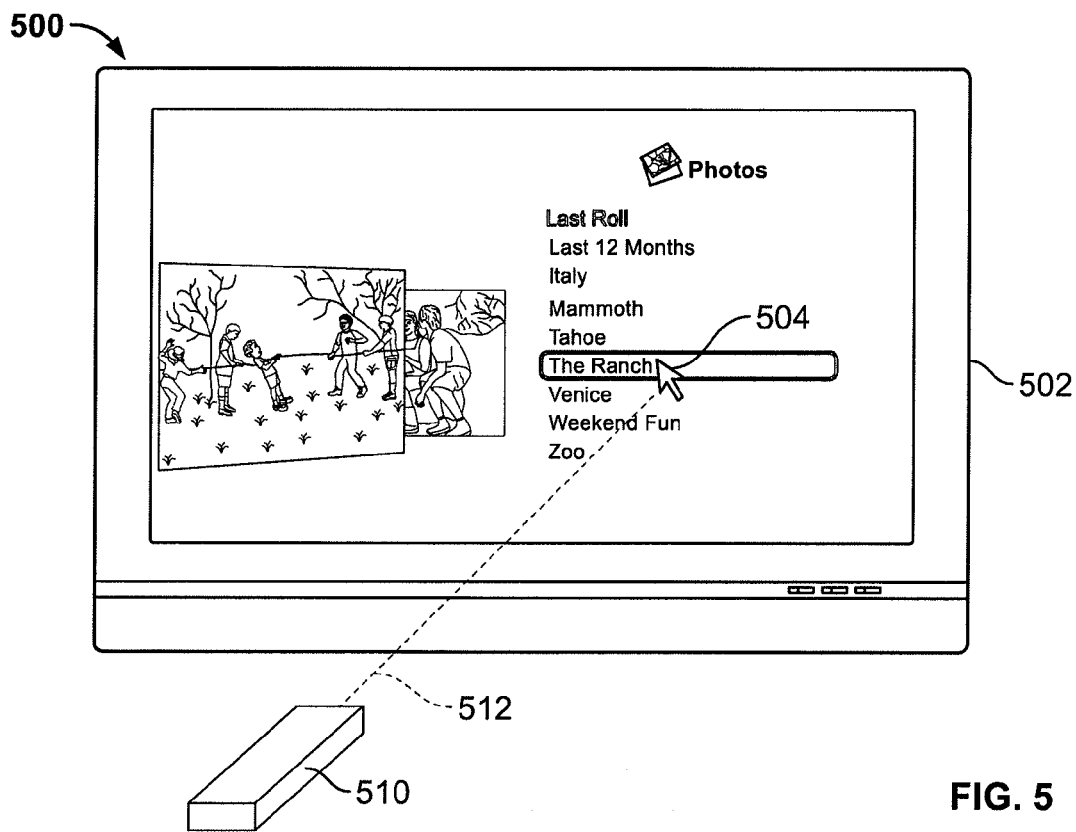

FIGS. 4 and 5 are illustrative display screens showing the movement of a cursor in response to the movement of a wand in accordance with one embodiment of the invention. Display screen 400 may include display 402 and cursor 404. Wand 410 may be oriented towards screen 400 such that the position of cursor 404 is directly aligned with the orientation in which wand 410 is held, identified by line 412. The electronic device that generates display 402 and the position of cursor 404 may determine the current position of cursor 404 from position and orientation information provided by wand 410. As described above, in some embodiments wand 410 may determine its position and orientation from the location and brightness of infrared light received from IR modules and from motion detection components (e.g., accelerometers or gyroscopes).

Display screen 500 may include display 502 and cursor 504. Display 502 may be the same as display 402 (FIG. 4), and cursor 504 may have moved to its current position from the position of cursor 404 (FIG. 4) in response to wand 510 moving to a new position. As wand 510 moves from the original position (i.e., wand 410, FIG. 4) to its new position, the orientation of the wand changes, and thus cursor 504 moves across screen 502 to its new position at the intersection of screen 502 and line 512, which extends from wand 510 along the orientation of wand 510.

Figure 6:
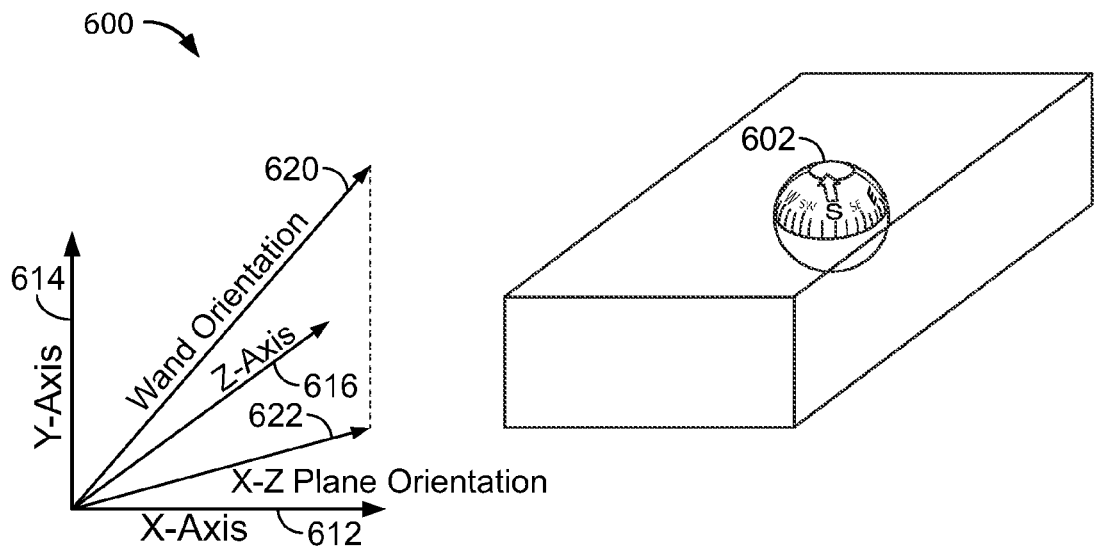
FIGS. 6 and 7 are schematic views of a wand that may include a compass in accordance with one embodiment of the invention.
Figure 7:
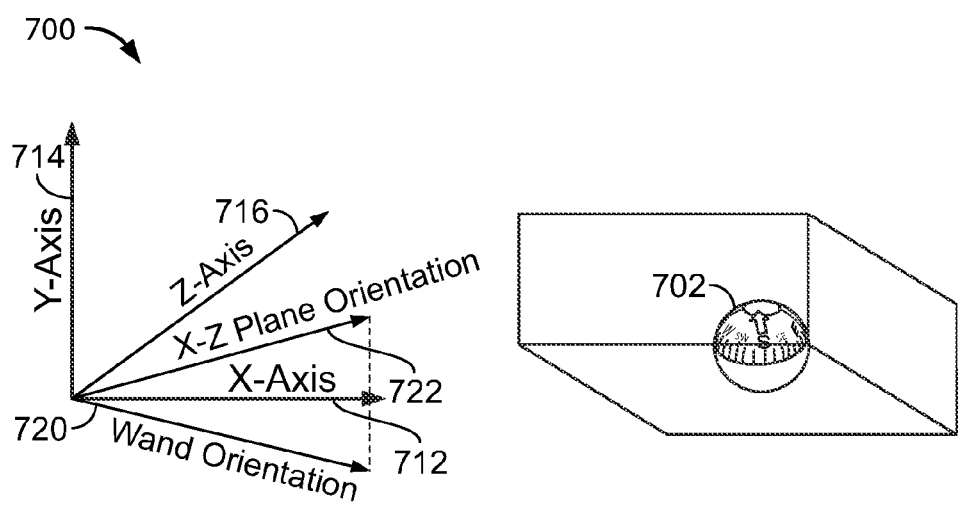

FIGS. 6 and 7 are schematic views of a wand that may include a compass (e.g., a magnetic compass) in accordance with one embodiment of the invention. In some embodiments, the wand may be operative to provide orientation inputs along only a single direction (e.g., the x or left/right direction). To increase the precision with which the wand determines its orientation, to reduce the reliance on received IR light, or both, illustrative wand 600 may include compass 602. Compass 602 may be placed in wand 600 such that compass 602 remains horizontal in the x-z plane, defined by x-axis 612 and z-axis 616, independent of the movement of wand 600 along y-axis 614. For example, compass 602 may include a ball, enclosed in liquid, that maintains its position relative to the gravity vector (which may be parallel to the y-axis).

As shown in FIG. 6, wand 600 is oriented along wand orientation 620, which may include components along each of x-axis 612, y-axis 614 and z-axis 616. The portion of wand orientation 620 in the x-z plane is identified by x-z plane orientation 622. The orientation of x-z plane orientation 622 may be quickly identified from the compass 602, for example as the current heading of wand 600.

When the user moves wand 600 to a new position, for example the position of wand 700 in FIG. 7, the wand moves to a new orientation, for example wand orientation 720. Wand orientation 720 may include components along each of x-axis 712, y-axis 714 and z-axis 716. Although the overall orientation of wand 700 appears different than that of wand 700, x-z plane orientation 722 and 622 (FIG. 6) may be the same, thus wands 600 (FIG. 6) and 700 may be pointing to the same portion of a screen. As with wand 600, wand 700 may quickly determine x-z plane orientation 722 using compass 702 (e.g., the heading of wand 700).

Figure 8:
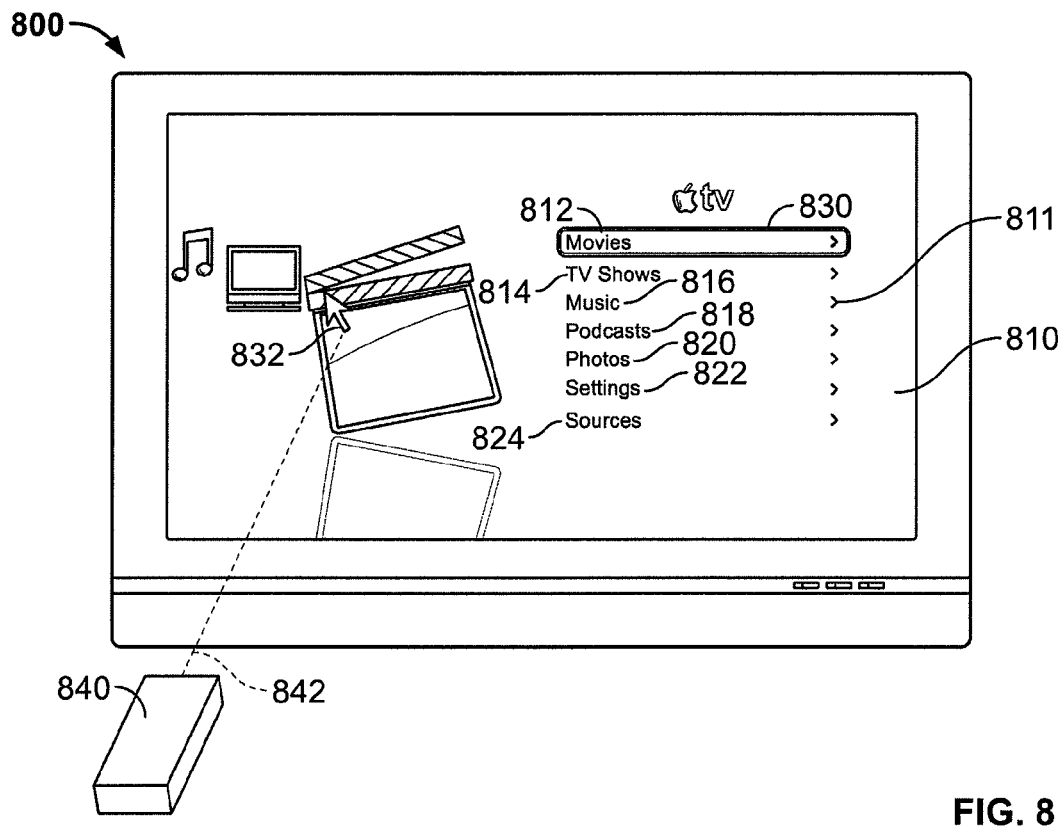
FIG. 8 is an illustrative display screen of a main menu in accordance with one embodiment of the invention.

The electronic device (e.g., electronic device 104, FIG. 1) associated with the wand (e.g., wand 106, FIG. 1) may be operative to provide any suitable interactive display on a screen (e.g., screen 102, FIG. 1). Using the wand, the user may control a cursor or other interfacing mechanism to select operations for the electronic device to perform. The electronic device may direct the screen to display any suitable display for providing one or more media system features to a user. FIG. 8 is an illustrative display screen of a main menu in accordance with one embodiment of the invention. Display screen 800 may include a plurality of options 810 for directing the electronic device to perform different functions. The options of display 800 may include, for example, Movies 812, TV Shows 814, Music 816, Podcasts 818, Photos 820, Settings 822 and Sources 824. Each of options 810 may include one or more sub-options, which may be displayed in response to a user selection of an option 810. The sub-options associated with each option may be displayed in any suitable manner including, for example, in a new display screen, a pop-up window or menu, a frame within display 800, or any other suitable manner. In some embodiments, display 800 may identify the availability of sub-options using arrows 811.

Display 800 may include highlight region 830 for selecting an option 810. The user may control the location of highlight region 830 using wand 840. For example, the user may point wand 840 at one option 810 to direct highlight region 830 to move to the selected option 810. In some embodiments, the electronic device may instead or in addition display a cursor, for example cursor 832, which the user may control by pointing wand 840 to the portion of the screen where the user would like cursor 832 displayed. Line 842 shows in FIG. 8 the orientation of wand 800, and cursor 832 at the intersection of screen 800 and line 842.

Figure 9:
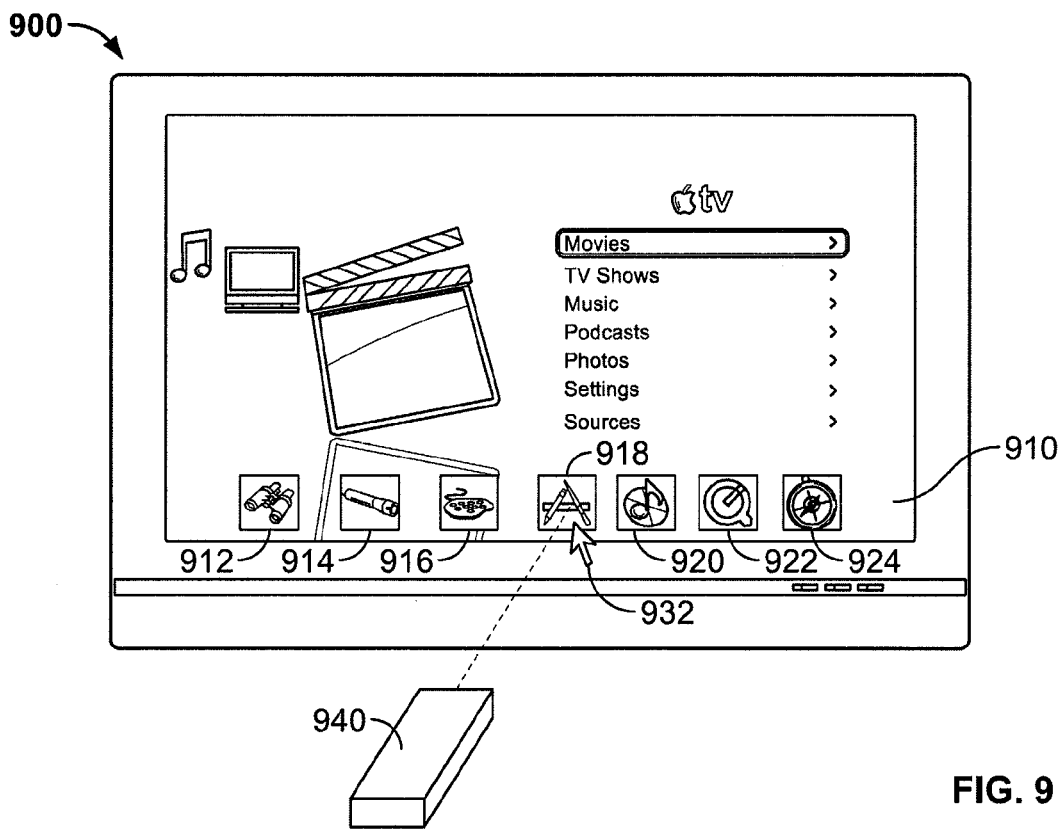
FIG. 9 is an illustrative display screen having additional selectable options in accordance with one embodiment of the invention.

FIG. 9 is an illustrative display screen having additional selectable options in accordance with one embodiment of the invention. Display screen 900 may include additional options 910 for allowing a user to access other options, features or applications available from the electronic device. The user may access options 910 in any suitable manner. For example, options 910 may be permanently displayed, appear in response to a user input on wand 940 (e.g., a user pressing MENU button 312, FIG. 3), appear in response to the user moving cursor 932 to a portion (e.g., the bottom) of the screen (and disappear when cursor 932 is moved away from the portion of the screen), or any other suitable approach for displaying options 910.

Options 910 may include options for any suitable feature, operation or application available from the electronic device associated with display screen 900. In the example of FIG. 9, the options displayed on display screen 900 may include ZOOM option 912, FLASHLIGHT option 914, KEYBOARD option 916, ILLUSTRATION option 918, iTUNES option 920, QUICKTIME option 922 and INTERNET option 924.

Figure 10:
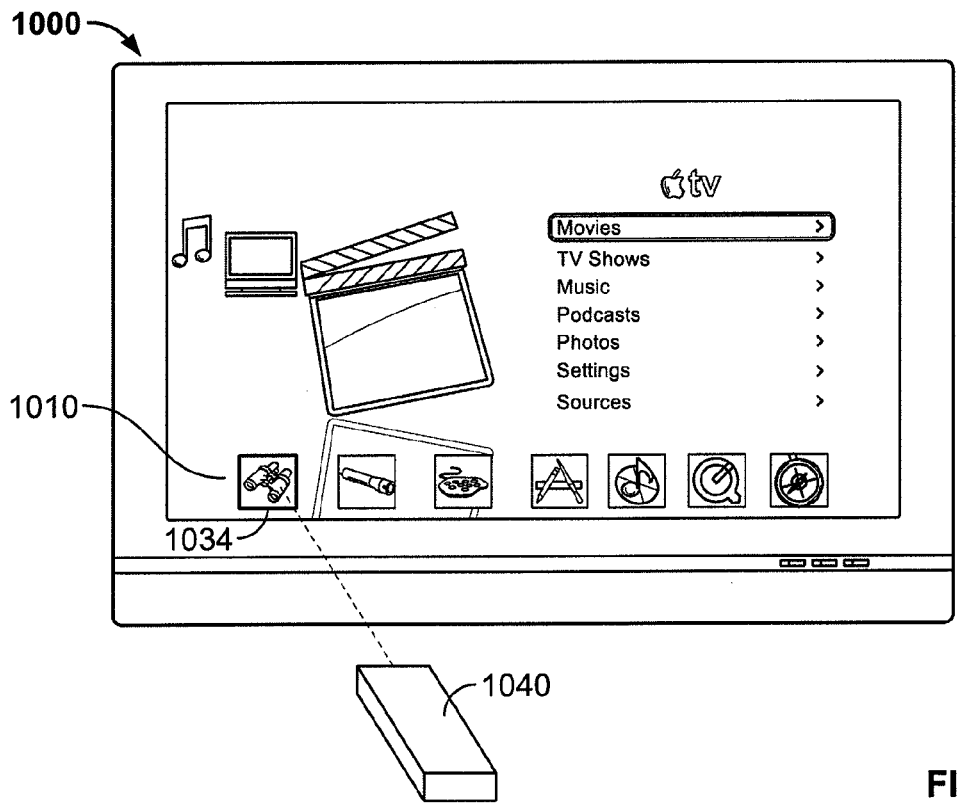
FIG. 10 is an illustrative display screen showing a selected option in accordance with one embodiment of the invention.

FIG. 10 is an illustrative display screen showing a selected option in accordance with one embodiment of the invention. Display screen 1000 may include options 1010 that the user may select by placing a cursor over the option. In response to receiving a user input from wand 1040 (e.g., a user pressing a button or providing another input on the input mechanism), or after leaving the cursor over the option for a given amount of time (e.g., 2 seconds), the electronic device may display highlight region 1034 over the option to inform the user that the option has been selected. In some embodiments, the electronic device may remove the cursor from screen 1000 in response to a user selecting an option 1010.

Figure 11:
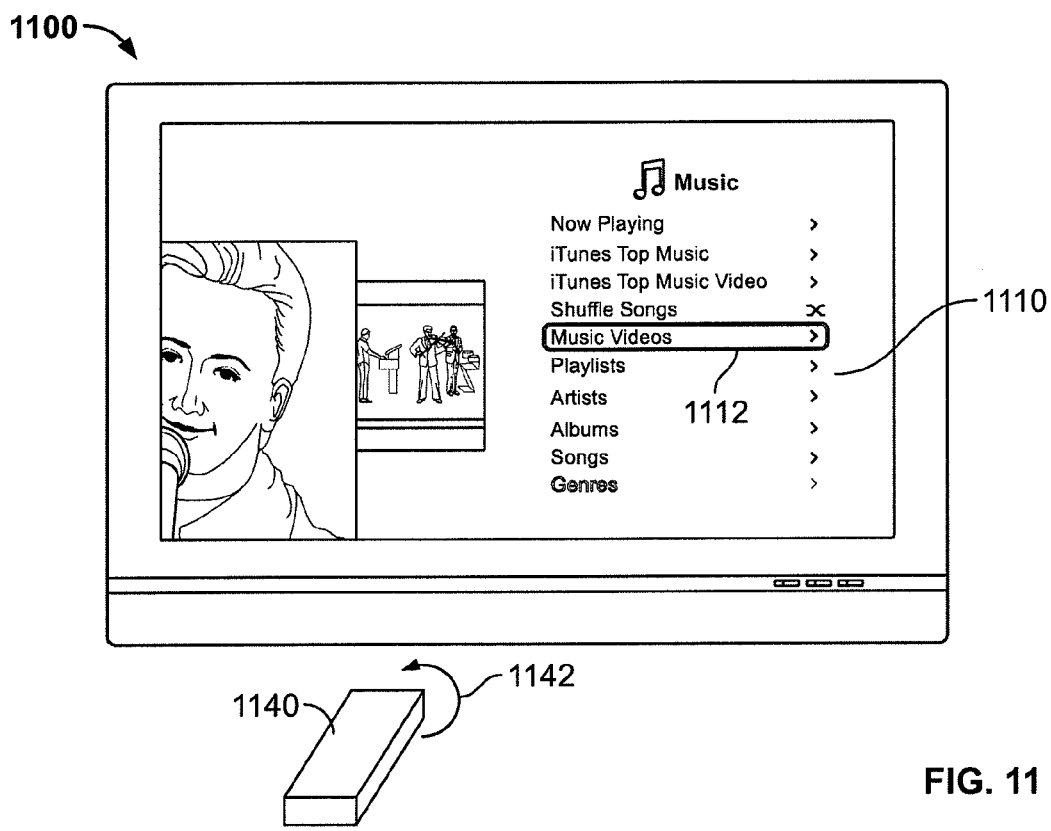
FIG. 11 is an illustrative display screen showing an approach for providing a user selection to the electronic device in accordance with one embodiment of the present invention.

FIG. 11 is an illustrative display screen showing an approach for providing a user selection to the electronic device in accordance with one embodiment of the present invention. Display screen 1100 may include options 1110 that the user may select with highlight region 1112. Once highlight region 1112 is placed over a particular option 1110, the user may provide a selection instruction using wand 1140. In some embodiments, the user may provide an input using an input mechanism (e.g., pressing a button). In some embodiments, the user may provide a selection input by moving wand 1140 in a particular manner. For example, the user may flick wand 1140 (e.g., move wand 1140 in circular pattern 1142), rotate wand 1140 in a particular manner (e.g., perform a 180° rotation of wand 1140), move wand 1140 a particular distance off screen 1100, or any other suitable movement of wand 1140.

In some embodiments, one or more particular operations of the electronic device may be associated with a particular movement of wand 1140. For example, flicking or snapping wand 1140 in one direction (e.g., to the left) may be operative to select an option, while flicking or snapping wand 1140 in another direction (e.g., to the right) may be operative to return to the main menu. In some embodiments, a particular movement of wand 1140 may be combined with one or more inputs on the input mechanism (e.g., pressing one or more buttons) to perform a particular electronic device operation.

Figure 12:
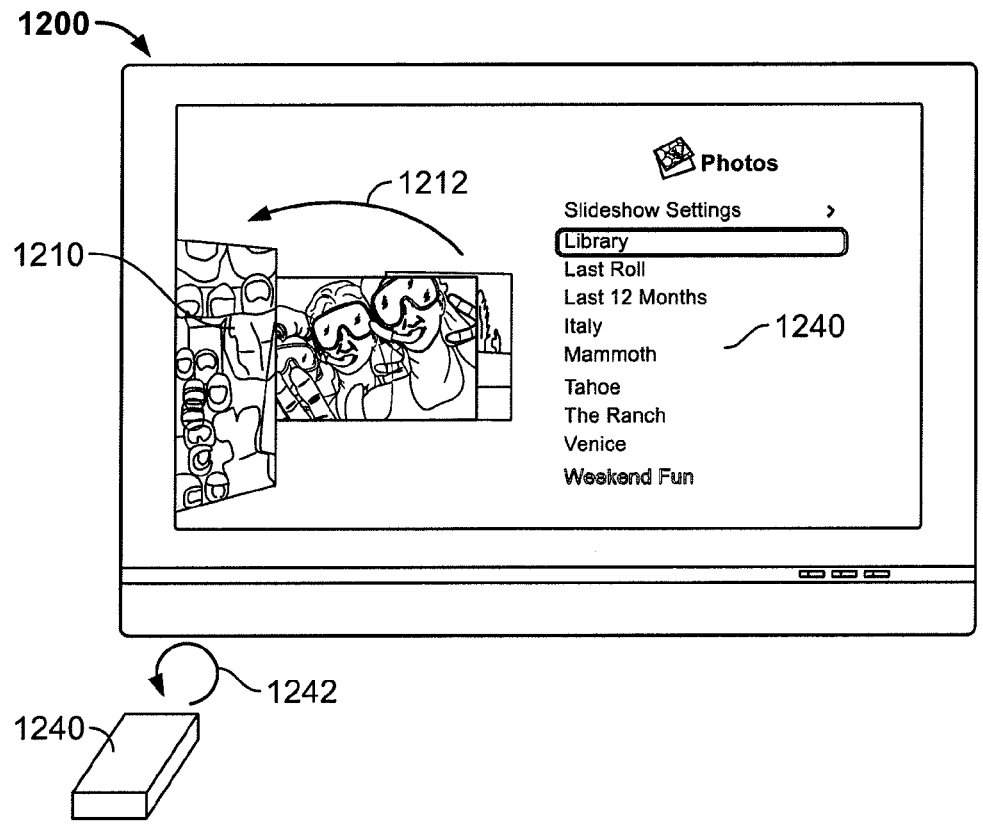
FIG. 12 is an illustrative display screen showing an approach for performing another electronic device operation in response to a particular movement of the wand in accordance with one embodiment of the invention.

FIG. 12 is an illustrative display screen showing an approach for performing another electronic device operation in response to a particular movement of the wand in accordance with one embodiment of the invention. Display screen 1200 may include carousel 1210 of selectable options (e.g., pictures. The user may move wand 1240 such that the user draws circular pattern 1242 on the screen to cause carousel 1210 to rotate along curve 1212, displaying different selectable options. In some embodiments, the electronic device may direct carousel 1210 to turn in a particular direction based on the direction in which wand 1240 is rotated (e.g., clockwise or counter-clockwise). In some embodiments, display screen 1200 may include additional options 1220, which may or may not be associated with one or more items of carousel 1210.

Figure 13:
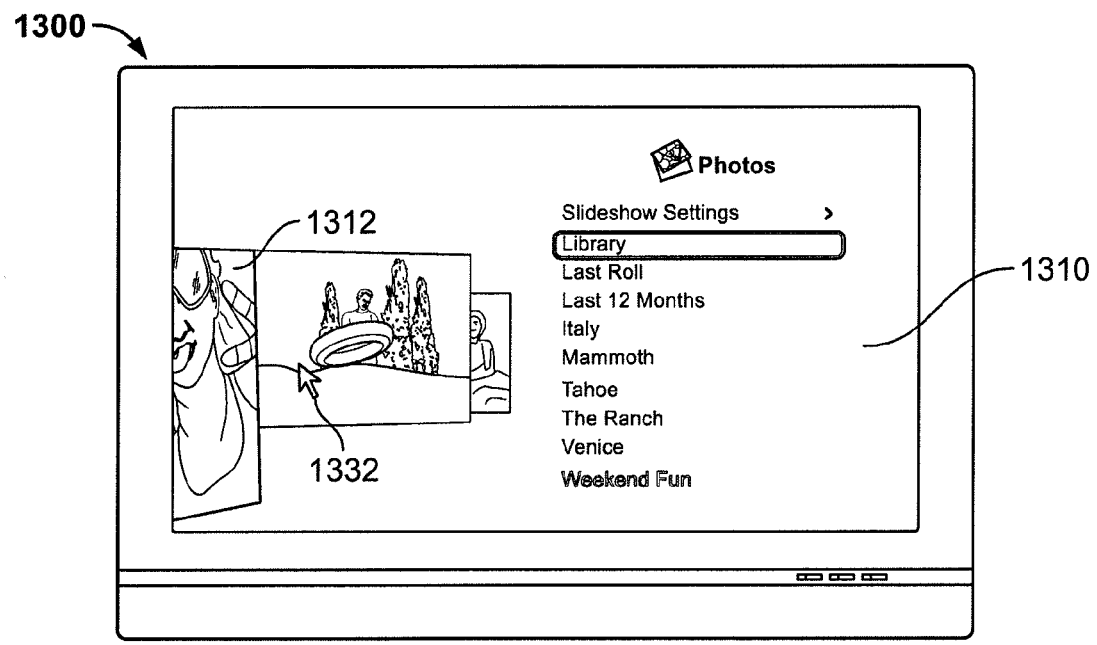
FIG. 13 is an illustrative display screen of a photo application in accordance with one embodiment of the invention.

The electronic device may provide a user of the media system with access to different applications or operations. In some embodiments, the applications may include a photo application. FIG. 13 is an illustrative display screen of a photo application in accordance with one embodiment of the invention. Display 1300 may include a plurality of options 1310 (e.g., menu options) associated with the photo application. One or more photographs available from the electronic device (e.g., received from a computer or digital camera, or stored locally on the electronic device) may be displayed in portion 1312 of display 1300. The user may select a photograph from portion 1312 for a larger view (e.g., full-screen) using cursor 1332.

Figure 14:
FIG. 14 is an illustrative display screen of a photograph selected by the user for display in full screen in accordance with one embodiment of the invention.

FIG. 14 is an illustrative display screen of a photograph selected by the user for display in full screen in accordance with one embodiment of the invention. Display 1400 may include single photograph 1402. In some embodiments, the photograph may be displayed as part of a slide show, or may be displayed for editing or modification. The amount of photograph 1402 shown in display 1400 may depend on the relative position of wand 1440 with respect to display 1400. For example, the amount of photograph 1402 shown may depend on the distance between wand 1440 and display 1400. For simplicity, the position of wand 1440 relative to display 1400 may be depicted by the position of wand 1440 relative to origin 1442.

Figure 15:
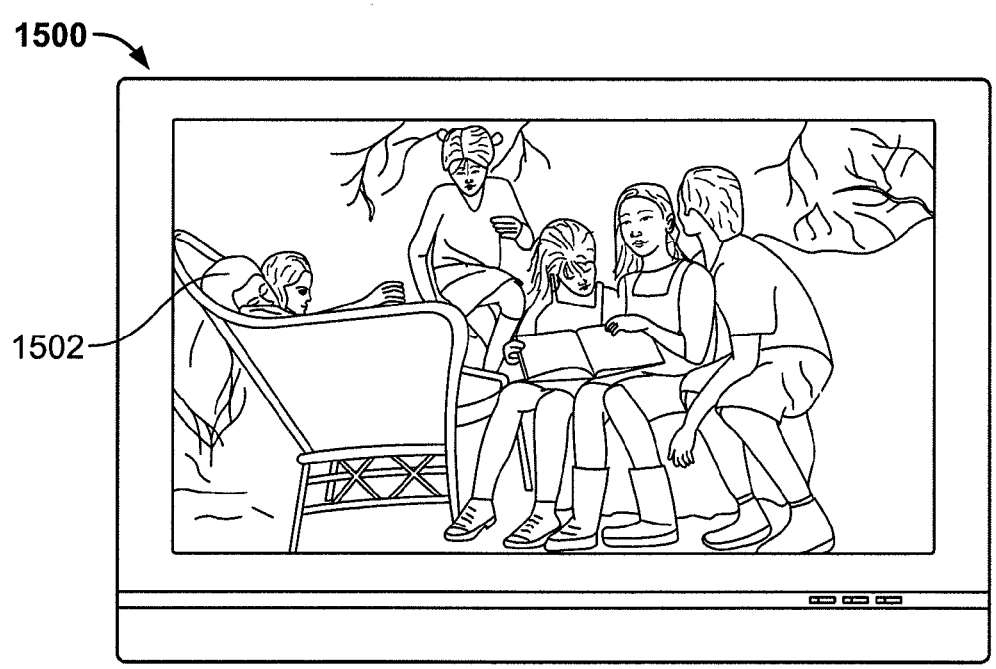
FIG. 15 is an illustrative display screen of a photograph in a zoomed out display in accordance with one embodiment of the invention.

FIG. 15 is an illustrative display screen of a photograph in a zoomed out display in accordance with one embodiment of the invention. Display 1500 may include photograph 1502, which may be the same as photograph 1402 (FIG. 14). To zoom out, the user may move wand 1540 away from screen 1500 such that the distance between wand 1540 and screen 1500 may be larger than the initial distance between wand 1440 (FIG. 14) and screen 1400 (FIG. 14). The larger distance between wand 1540 and screen 1500 may be depicted by the position of wand 1540 relative to origin 1542, which may be the same origin as origin 1442 (FIG. 14). In some embodiments, the user may provide an input in the z-direction (e.g., to zoom out) by providing an appropriate input with an input mechanism without moving wand 1540. For example, the user may roll a scroll wheel, provide an input on a touchpad, or move a joystick to provide an input in the z-direction and zoom out the image of screen 1500.

Figure 16:
FIG. 16 is an illustrative display screen of a photograph in a zoomed in display in accordance with one embodiment of the invention.
Figure 16:
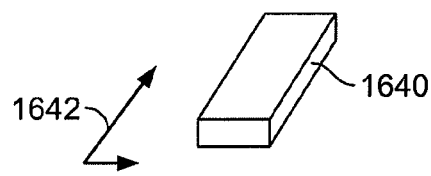

FIG. 16 is an illustrative display screen of a photograph in a zoomed in display in accordance with one embodiment of the invention. Display 1600 may include photograph 1602, which may be the same as photograph 1402 (FIG. 14). To zoom in, the user may move wand 1640 towards screen 1600 such that the distance between wand 1640 and screen 1600 may be shorter than the initial distance between wand 1440 (FIG. 14) and screen 1400 (FIG. 14). The shorter distance between wand 1640 and screen 1600 may be depicted by the position of wand 1640 relative to origin 1642, which may be the same origin as origin 1442 (FIG. 14). In some embodiments, the user may provide an input in the z-direction (e.g., to zoom in) by providing an appropriate input with an input mechanism without moving wand 1640. For example, the user may roll a scroll wheel, provide an input on a touchpad, or move a joystick to provide an input in the z-direction and zoom in the image of screen 1600.

Figure 17:
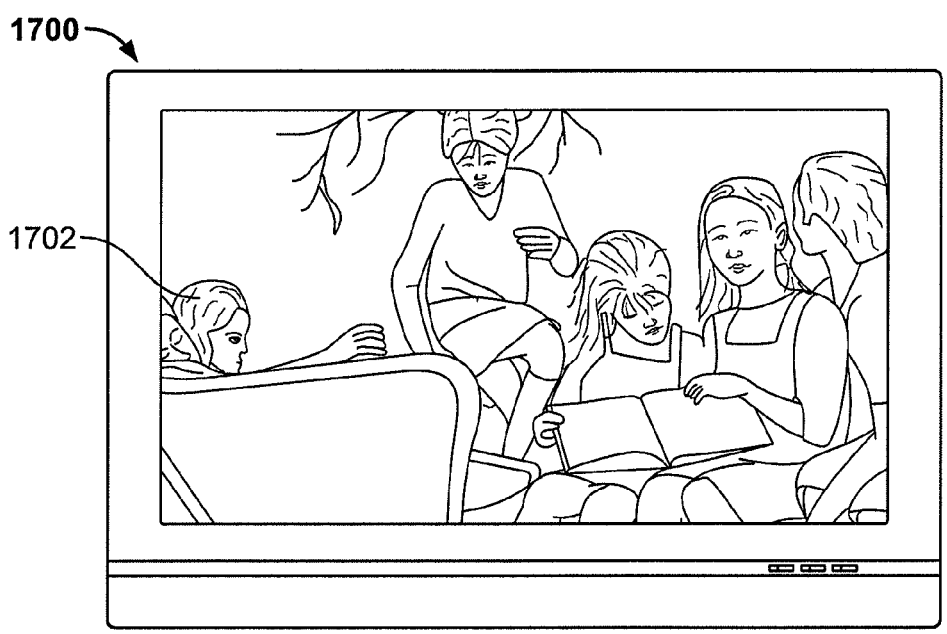
FIG. 17 is an illustrative display screen of a different portion of a photograph in a zoomed in display in accordance with one embodiment of the invention.
Figure 17:
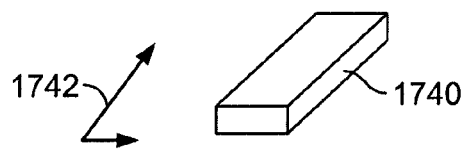

In some embodiments, the user may direct the electronic device to display other portions of a zoomed image by moving the wand. FIG. 17 is an illustrative display screen of a different portion of a photograph in a zoomed in display in accordance with one embodiment of the invention. Display 1700 may include photograph 1702, which may be the same as photograph 1602 (FIG. 16). Because photograph 1602 is zoomed in, the user cannot view the entire photograph. To view hidden portions of the photograph, the user may direct the electronic device to scroll the display of photograph 1602 to display photograph 1702. For example, wand 1740 may be oriented towards a side of screen 1700 (e.g., to the right) to cause screen 1700 to shift the display of photograph 1702 such that the portions of photograph 1702 that were previously hidden (e.g., portions to the left of photograph 1602) may be displayed. As shown in FIG. 17, wand 1740 may be rotated toward the right such that wand 1740 moves from the initial orientation of wand 1640 (FIG. 16) to the orientation of wand 1740. The relative orientations wands 1640 and 1740 may be depicted by the positions of wands 1640 and 1740 relative origins 1642 and 1742, respectively.

Figure 18:
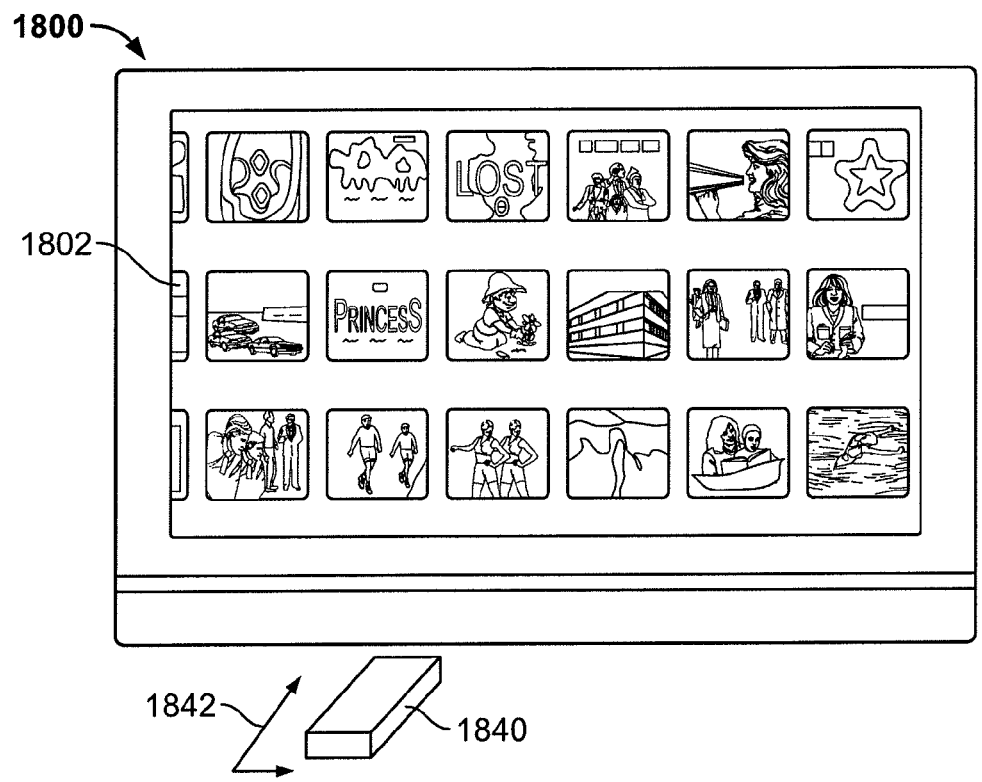
FIG. 18 is an illustrative display screen of a plurality of images in accordance with one embodiment of the invention.

In some embodiments, the zoom functionality of the electronic device may also be applied to any suitable display of a plurality of elements (e.g., options, icons or thumbnail images). For example, zoom functionality may be applied to a thumbnail listing of photographs. FIG. 18 is an illustrative display screen of a plurality of images in accordance with one embodiment of the invention. Display 1800 may include listing 1802 of images. In some embodiments, listing 1802 may be displayed as part of an album, a folder for organizing images, or as a set of icons for accessing electronic device operations. As with a single photograph, the amount of listing 1802 shown in display 1800 may depend on the relative position of wand 1840 with respect to display 1800. For example, the amount of listing 1802 displayed may depend on the distance between wand 1840 and display 1800. For simplicity, the position of wand 1840 relative to display 1800 may be depicted by the position of wand 1840 relative to origin 1842. In some embodiments, the amount of listing 1802 shown in display 1800 may depend on an input provided with wand 1840 to control operations or instructions in the z-direction.

Figure 19:
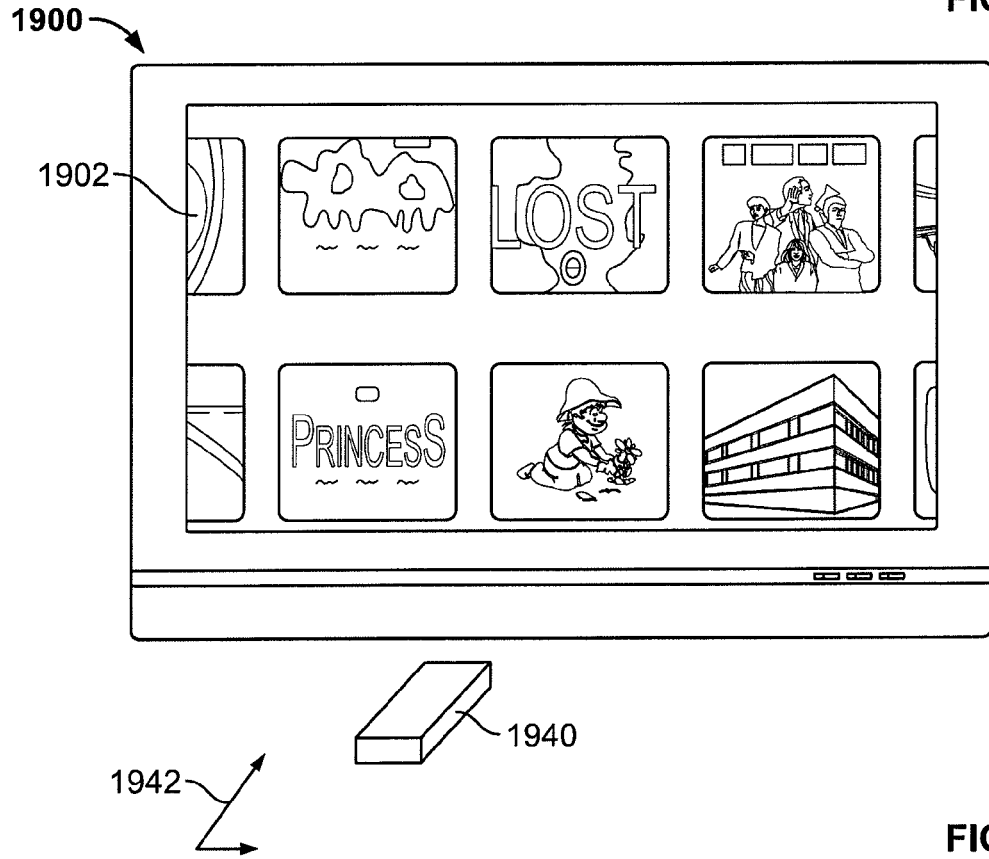
FIG. 19 is an illustrative display screen of a plurality of images in a zoomed in display in accordance with one embodiment of the invention.

FIG. 19 is an illustrative display screen of a plurality of images in a zoomed in display in accordance with one embodiment of the invention. Display 1900 may include listing 1902 of images, which may be the same as listing 1802 (FIG. 18). To zoom in, the user may move wand 1940 towards screen 1900 such that the distance between wand 1940 and screen 1900 may be shorter than the initial distance between wand 1840 (FIG. 18) and screen 1800 (FIG. 18). The shorter distance between wand 1940 and screen 1900 may be depicted by the position of wand 1940 relative to origin 1942, which may be the same origin as origin 1842 (FIG. 18). To zoom out, a user may move wand away from screen 1900 such that the distance between wand 1940 and screen 1900 is larger than the initial distance between wand 1840 and screen 1800 (e.g., similarly to the process described in connection with screen 1500, FIG. 15). In some embodiments, the user may provide an appropriate input with an input mechanism without moving wand 1840 to direct the display to zoom in or zoom out. For example, the user may roll a scroll wheel, provide an input on a touchpad, or move a joystick to provide an input in the z-direction and zoom the image of displays 1800 and 1900.

To avoid zooming at undesirable moments (e.g., while playing back music or a video), the electronic device may provide zoom functionality only in response to a user selecting a zoom option. For example, the user may access a zoom mode by selecting ZOOM option 912 (FIG. 9). As another example, the user may provide an input on an input mechanism of the wand prior to or while the user moves the wand to activate the zoom functionality (e.g., twist wand and move forward or back to zoom, or press a button and move forward or back to zoom). In some embodiments, zoom functionality may be available only for specific display screens. For example, zoom functionality may be available only for viewing photographs, listings of images or icons, for viewing paused video, and lists of selectable options. In such a case, the electronic device may be operative to ignore movement of the wand along the z-axis or forward/backward direction when the display screen is not one for which zooming is available.

Figure 20:
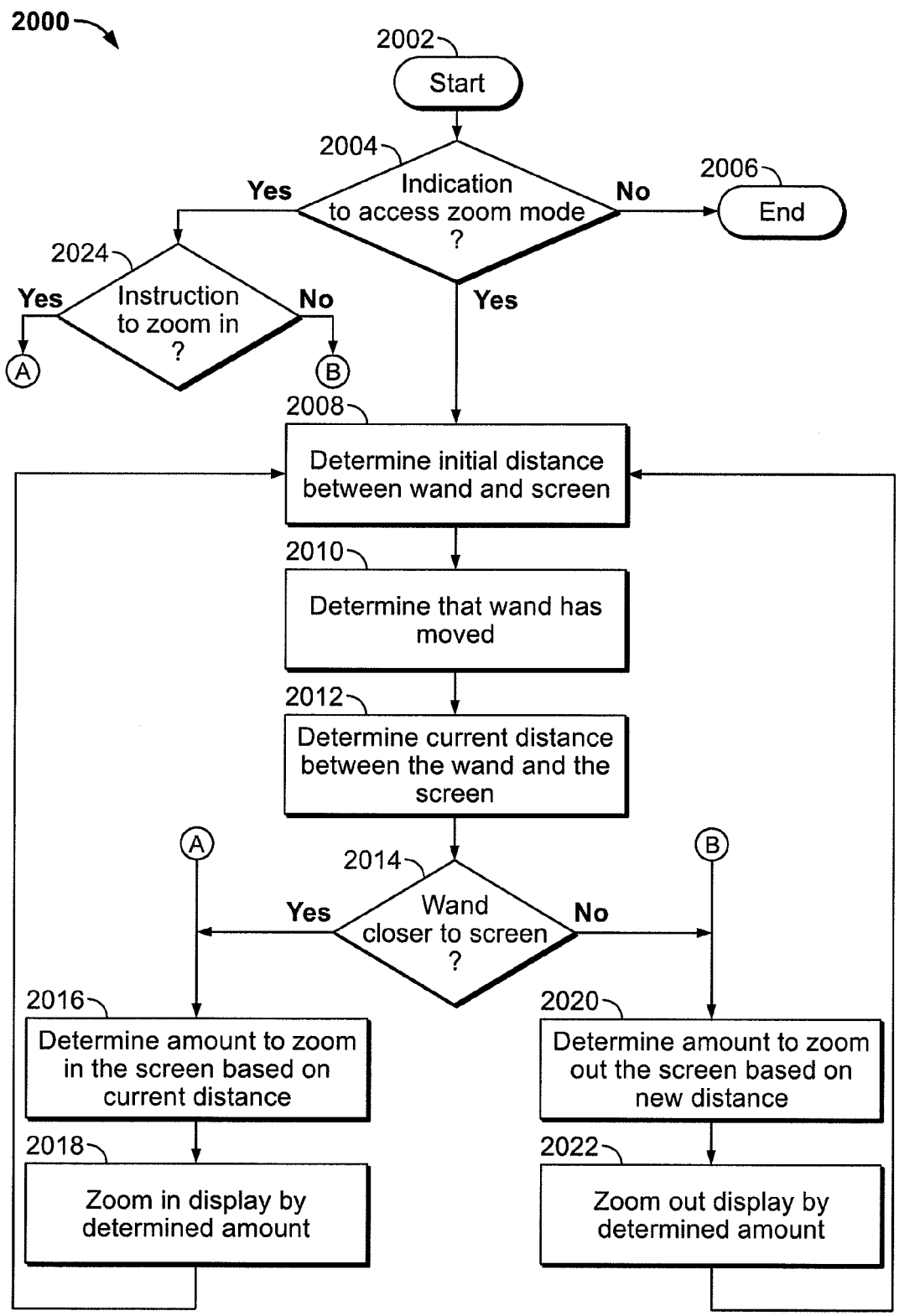
FIG. 20 is a flowchart of an illustrative process for providing zoom functionality in accordance with one embodiment of the invention.

FIG. 20 is a flowchart of an illustrative process for providing zoom functionality in accordance with one embodiment of the invention. Process 2000 begins at step 2002. At step 2004, the media system may determine whether the user has provided an indication to access the zoom mode. For example, electronic device 104 (FIG. 1) may determine whether the user is viewing a screen for which a zooming function is available. As another example, electronic device 104 may determine whether the user has provided a user input (e.g., using input mechanism 208, FIG. 2, or by moving wand 106, FIG. 1, in a specific manner) to access the zoom mode. If the electronic device determines that the user has not provided an indication to access the zoom mode, process 2000 may move to step 2006 and ends.

If, at step 2004, the media system instead determines that the user has provided an indication to access the zoom mode, process 2000 may move to step 2008. At step 2008, the media system may determine the initial distance between the wand and the screen. For example, wand 106 may determine its distance relative screen 102 (FIG. 1) (e.g., relative to IR modules 120 and 122, FIG. 1) using optical component 202 (FIG. 2), and transmit the determined initial distance to electronic device 104 using communications circuitry 204 (FIG. 2). As another example, electronic device 104 may directly determine the distance between wand 106 and screen 102 using, for example, IR modules 120 and 122 to receive infrared light emitted by wand 106, and to compute the relevant distance based on the received light.

At step 2010, the media system may determine that the wand has moved. For example, wand 106 may determine its current distance relative to screen 102, and compare the current distance to the initial distance identified at step 2008. If wand 106 determines that the current distance is different than the initial distance, wand 106 may determine that the wand has moved. As another example, wand 106 may determine, using motion detection component 206 (FIG. 2), whether wand 106 has been subject to any accelerations that indicate wand movement. If motion detection component 206 identifies an acceleration event, wand 106 may determine that the wand has moved.

At step 2012, the media system may determine the current distance between the wand and the screen. For example, wand 106 may determine its distance relative screen 102 (e.g., relative to IR modules 120 and 122) using optical component 202, and transmit the determined current distance to electronic device 104 using communications circuitry 204.

At step 2014, the media system may determine whether the wand is closer to the screen. For example, electronic device 104 may compare the initial distance determined at step 2008 and the current distance determined at step 2012, and may determine whether the current distance is smaller than the initial distance. If the media system determines that the wand is closer to the screen, process 2000 may move to step 2016.

At step 2016, the media system may determine the amount to zoom in the display on the screen based on the current distance. For example, electronic device 104 may compare the difference between the initial distance and the current distance to an average maximum expected distance variation (e.g., the length of a user's arm, indicating movement from an extended arm to an arm against the user's body), and zoom in the image displayed on screen 102 based on the ratio of the difference between initial and current distance and the maximum expected distance variation. As another example, the media system may zoom in the display using any other suitable relationship between the new distance and the zoom ratio (e.g., a non-linear relationship). In some embodiments, the media system may zoom in the display based on the speed at which the distance between the wand and the screen changes.

At step 2018, the media system may zoom in the display of the screen by the amount determined at step 2016. For example, if the media system determines to zoom an image in 200% based on the current distance determined at step 2012, electronic device 104 may direct screen 102 to display an image zoomed in 200%. Process 2000 may then move back to step 2008, where the media system may continue to monitor changes in distance between the wand and the screen.

If, at step 2014, the media system instead determines that the wand is not closer to the screen, process 2000 may move to step 2020. At step 2020, the media system may determine the amount to zoom out the display on the screen based on the current distance. For example, electronic device 104 may compare the difference between the initial distance and the current distance with an average maximum expected distance variation (e.g., the length of a user's arm, indicating movement from an extended arm to an arm against the user's body), and zoom out the image displayed on screen 102 based on the ratio of the difference between initial and current distance and the maximum expected distance variation. As another example, the media system may zoom out the display using any other suitable relationship between the current distance and the zoom ratio (e.g., a non-linear relationship). In some embodiments, the media system may zoom out the display based on the speed at which the distance between the wand and the screen changes.

At step 2022, the media system may zoom out the display of the screen by the amount determined at step 2020. For example, if the media system determines to zoom an image out 50% based on the current distance determined at step 2012, electronic device 104 may direct screen 102 to display an image zoomed out 50%. Process 2000 may then move back to step 2008, where the media system may continue to monitor changes in distance between the wand and the screen.

In some embodiments, steps 2008, 2010 2012 and 2014 of process 2000 may be replaced by step 2024. At step 2024, the media system may determine whether the user has provided an instruction with an input mechanism to zoom in. For example, wand 106 may determine whether a user has provided an input in the z-direction (e.g., with input mechanism 208). If the media system determines that the user has provided an input to zoom in, process 2000 may move to step 2016, described above. If, at step 2024, the media system instead determines that the user has not provided an input to zoom out, process 2000 may move to step 2020, described above.

Figure 21:
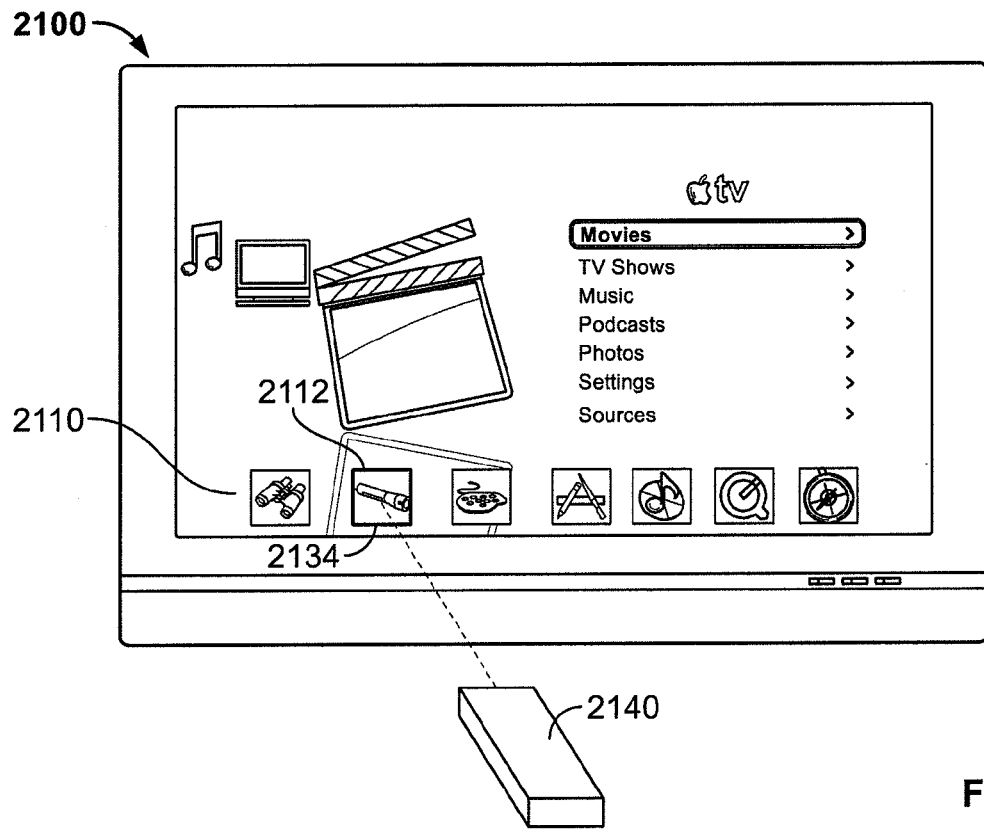
FIG. 21 is an illustrative display screen of user selection of a flashlight application in accordance with one embodiment of the invention.

In some embodiments, the media system may provide the user with a flashlight application. FIG. 21 is an illustrative display screen of user selection of a flashlight application in accordance with one embodiment of the invention. Display 2100, which may be similar or identical to display screen 1000 (FIG. 10), may include options 2110 that the user may select by placing a cursor (not shown) over a particular option (e.g., flashlight option 2112). In some embodiments, the user may select flashlight option 2112 by pointing to option 2112 using wand 2140 to place the cursor over option 2112, and provide an indication to select the option (e.g., pressing a button or providing another input on the input mechanism, moving wand 2140 in a particular manner, or leaving the cursor over option 2112 for a given amount of time). Display 2100 may include highlight region 2134 over option 2112 to indicate that the option has been selected.

Figure 22:
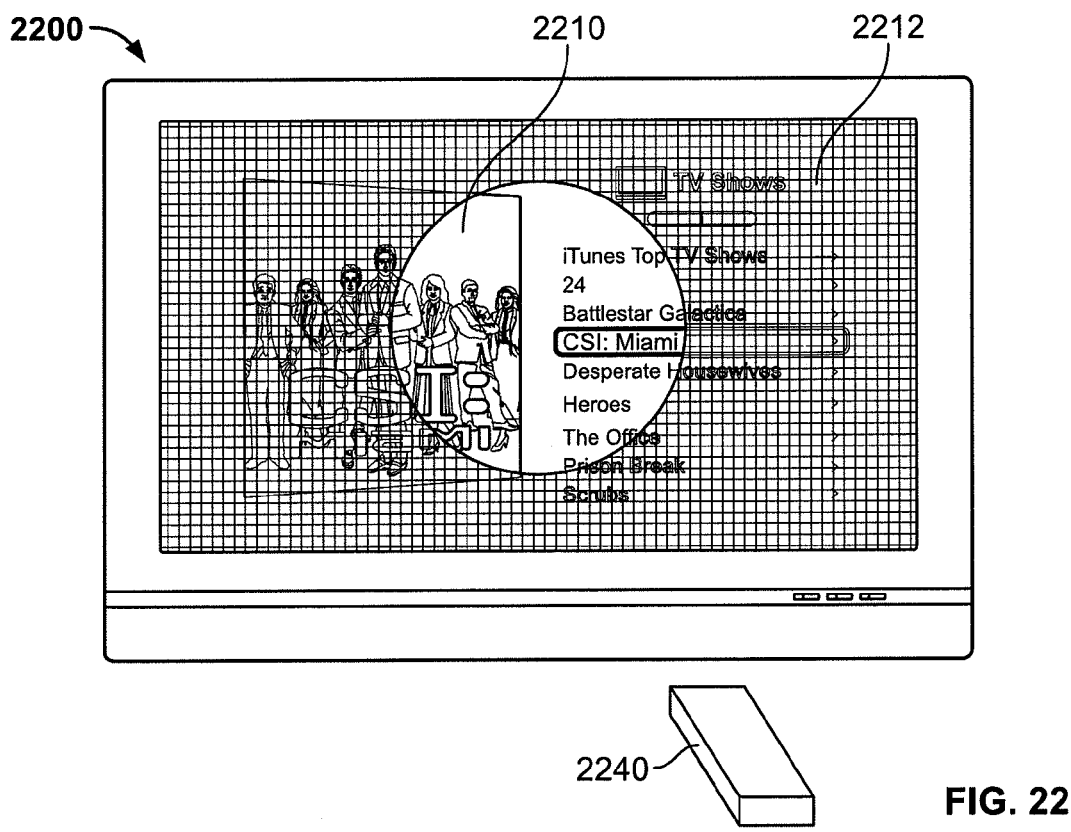
FIG. 22 is an illustrative display screen of the flashlight application in accordance with one embodiment of the invention.

FIG. 22 is an illustrative display screen of the flashlight application in accordance with one embodiment of the invention. Display 2200 may include flashlight beam 2210, which may light up a portion of screen 2200 while leaving dark portion 2212 in shadows. Flashlight beam 2210 may be displayed on the portion of screen 2200 that is aligned with the orientation of wand 2240 such that the user may have the impression that wand 2240 is a flashlight that illuminates only a portion of screen 2200. Flashlight beam 2210 may have any suitable shape, including for example circular, rectangular, square, or an arbitrary shape (e.g., shaped like a particular, object, for example a logo).

Figure 23:
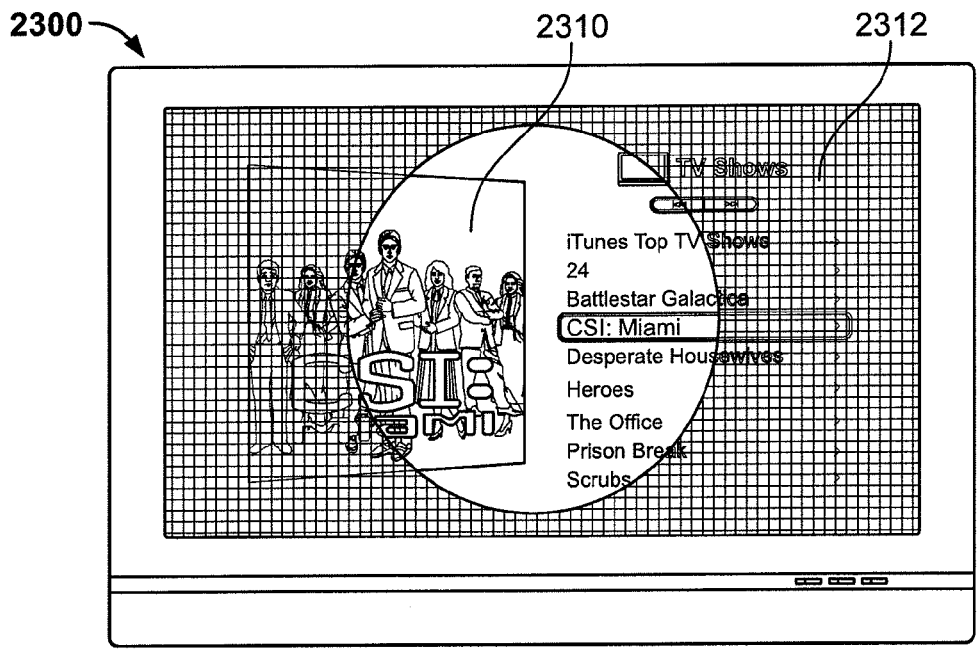
FIG. 23 is an illustrative display screen of the flashlight application when a user pulls the wand away from the screen in accordance with one embodiment of the invention.

FIG. 23 is an illustrative display screen of the flashlight application when a user pulls the wand away from the screen in accordance with one embodiment of the invention. To give the user the impression that wand 2340 is a flashlight, when the user pulls wand 2340 away from screen 2300 and the distance between wand 2340 and screen 2300 increases, the flashlight beam displayed on screen 2300 may be larger. As shown in FIG. 23, flashlight beam 2310 may be larger than flashlight beam 2210 (FIG. 22) because wand 2340 has been pulled away from screen 2300, and dark portion 2312 may be smaller than dark portion 2212 (FIG. 22). The position of wand 2340 relative to screen 2300 may be depicted by the position of wand 2340 relative to origin 2342. In some embodiments, the user may provide an appropriate input with an input mechanism without moving wand 2340 to direct the display to change the size of flashlight beam 2310. For example, the user may roll a scroll wheel, provide an input on a touchpad, or move a joystick to provide an input in the z-direction and change the size of flashlight beam 2310.

Figure 24:
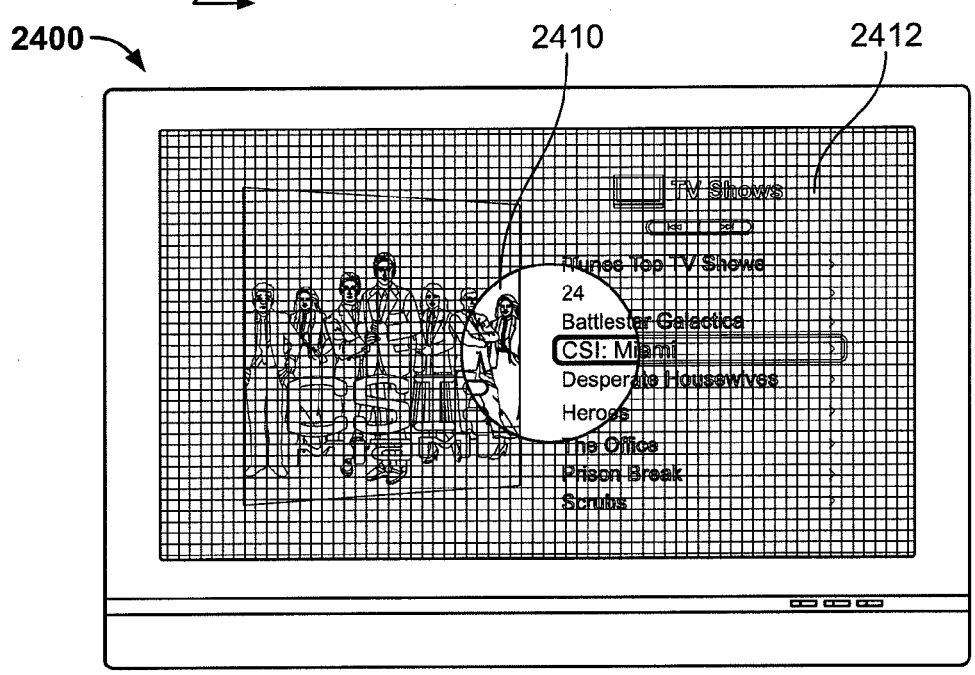
FIG. 24 is an illustrative display screen of a flashlight application when a user pushes the wand to the screen in accordance with one embodiment of the invention.

FIG. 24 is an illustrative display screen of a flashlight application when a user pushes the wand to the screen in accordance with one embodiment of the invention. When the user approaches wand 2440 to screen 2400, as depicted by the position of wand 2440 relative to origin 2442, which may be the same as origin 2342 (FIG. 23), flashlight beam 2310 may be reduced (e.g., with respect to flashlight beams 2210, FIG. 22 and 2310, FIG. 23) such that dark portion 2412 is enlarged (e.g., with respect to dark portions 2212, FIG. 22 and 2312, FIG. 23). This behavior for flashlight beam 2410 may give a user the impression that wand 2440 is a flashlight. In some embodiments, the user may provide an appropriate input with an input mechanism without moving wand 2440 to direct the display to change the size of flashlight beam 2410 (e.g., in addition to or instead of changing the distance between wand 2440 and screen 2400).

Figure 25:
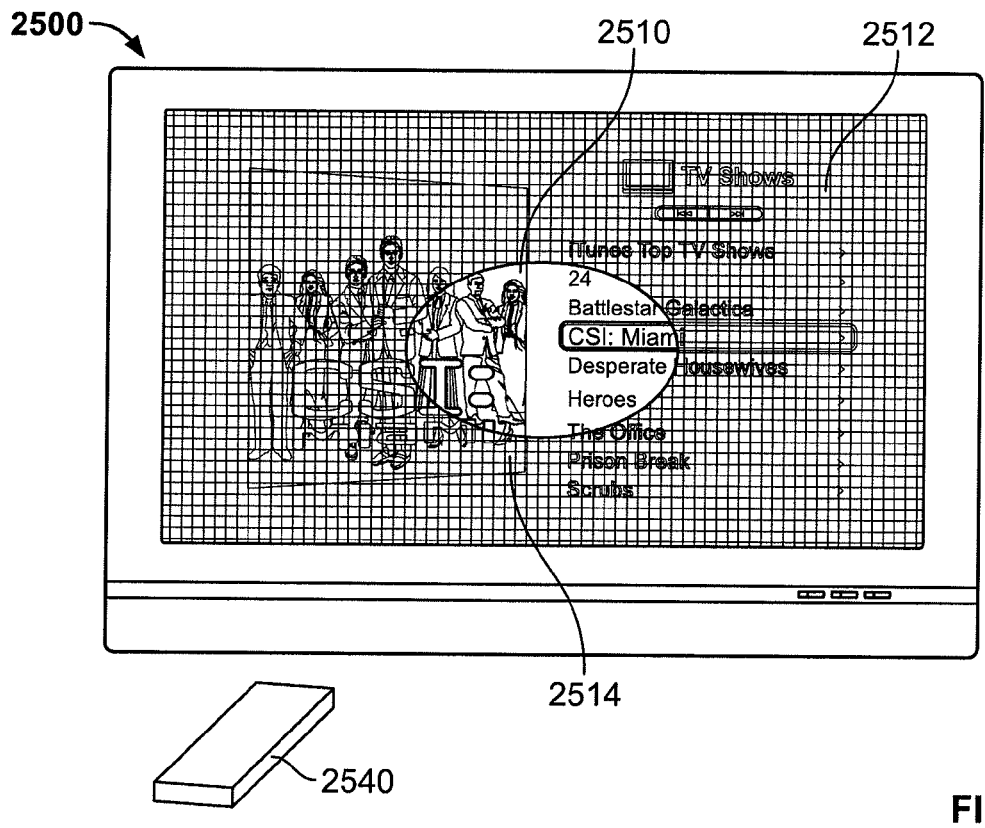
FIG. 25 is an illustrative display screen of a flashlight application when a user points the wand at an angle towards the screen in accordance with one embodiment of the invention.

FIG. 25 is an illustrative display screen of a flashlight application when a user points the wand at an angle towards the screen in accordance with one embodiment of the invention. Display screen 2500 may include flashlight beam 2510 and dark portion 2512. In some embodiments, flashlight beam 2510 may be an elliptical shape to illustrate the angle at which wand 2540 points at screen 2500. For example, the characteristic lengths of flashlight beam 2510 (e.g., the lengths of the two axes defining the ellipsis) may be related to the angle at which wand 2540 points to screen (e.g., to the angle between the of the x-z component of the wand orientation and the z-axis). In some embodiments, screen 2500 may include shadows 2514. Shadows 2514 may be displayed to provide the effect of an oblique light source, where wand 2540 may provide the oblique light source. In some embodiments, the shape of flashlight beam 2510 and the shadows 2514 displayed may be related to the movement of wand 2540 away from the center of screen 2500 (e.g., the angle of the oblique light source may be related to the movement of wand 2540).

Figure 26:
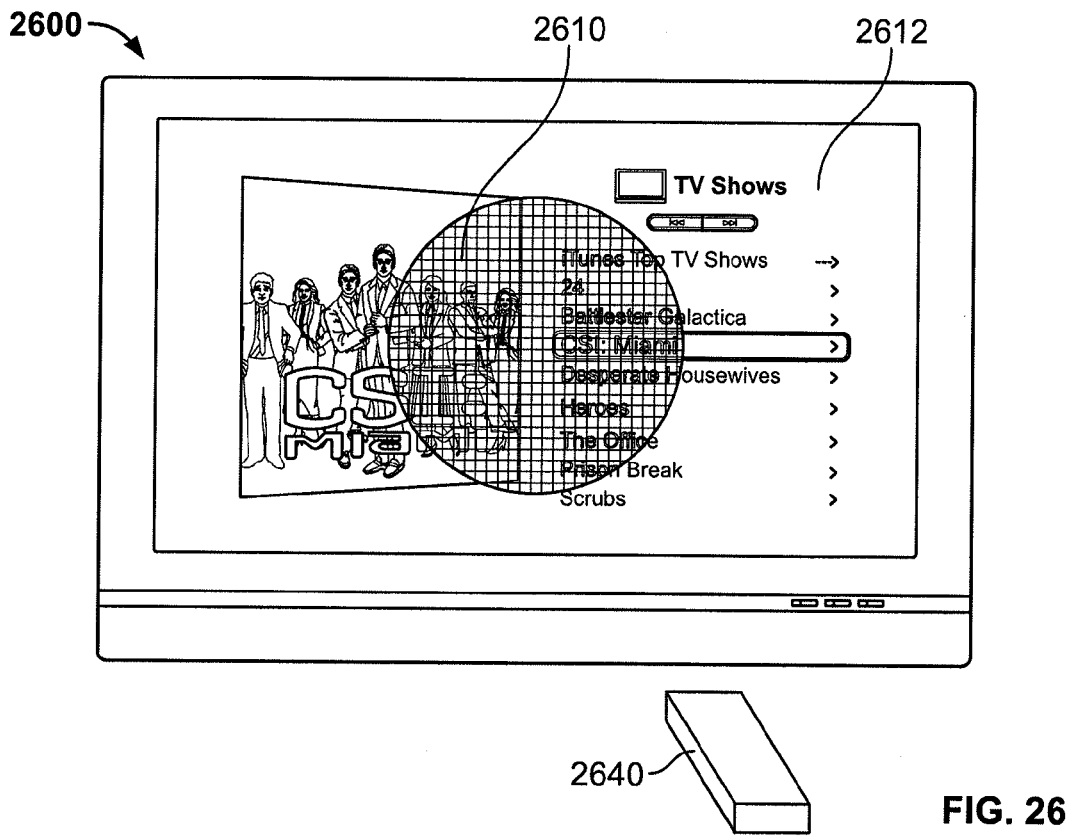
FIG. 26 is an illustrative display screen of a flashlight application in which the flashlight beam is dark in accordance with one embodiment of the invention.

In some embodiments, the flashlight application may provide the user with a reverse flashlight display. For example, a user may use a reverse flashlight to hide specific information displayed on a screen while showing other information (e.g., to guests or other users). This approach may be useful, for example, to hide confidential information while showing non-confidential information, or as part of a presentation. FIG. 26 is an illustrative display screen of a flashlight application in which the flashlight beam is dark in accordance with one embodiment of the invention. Display 2600 may include flashlight beam 2610, which may darken a portion of screen 2600 while leaving remaining portion 2612 illuminated. Flashlight beam 2610 may be displayed on the portion of screen 2600 that is aligned with the orientation of wand 2640 such that the user may have the impression that wand 2640 is a flashlight. In some embodiments, the user may move wand 2640 towards and away from screen 2600 to cause the size of flashlight beam 2610 to reduce and grow, respectively (e.g., as described in connection with FIGS. 23 and 24). In some embodiments, the user may provide an appropriate input with an input mechanism without moving wand 2640 to direct the display to change the size of flashlight beam 2610.

Figure 27:
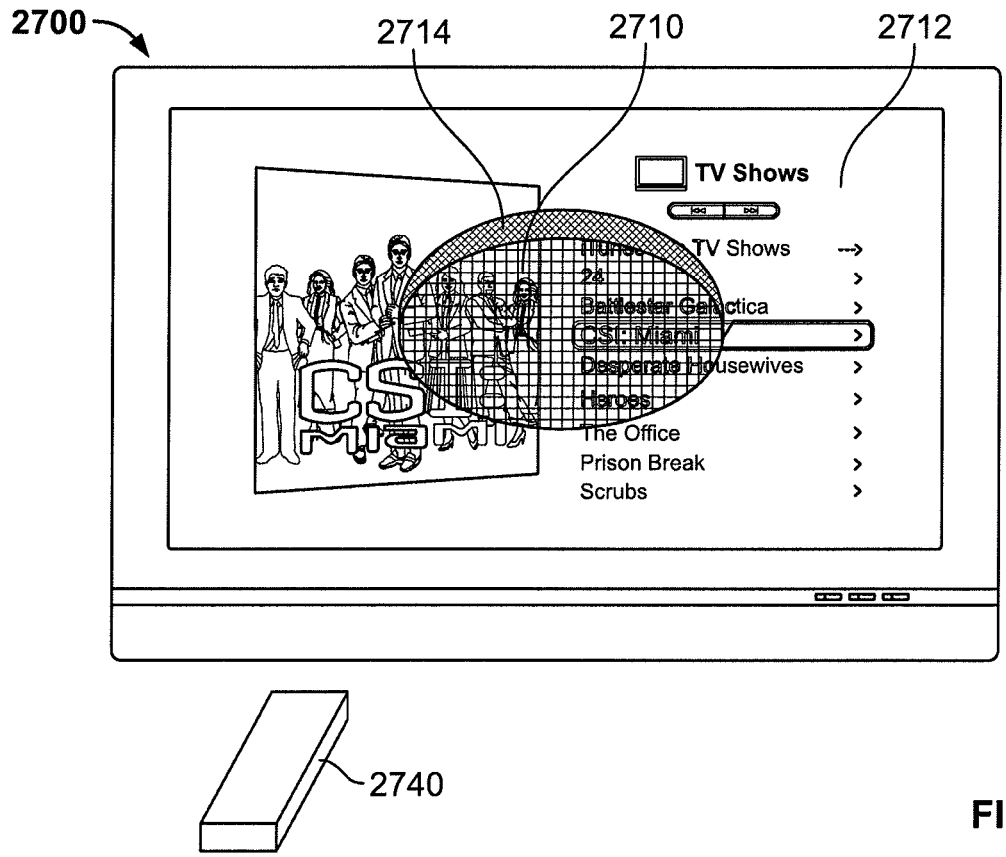
FIG. 27 is an illustrative display screen of a flashlight application in which the flashlight beam is dark and in which the wand is held at an angle to the screen in accordance with one embodiment of the invention.

FIG. 27 is an illustrative display screen of a flashlight application in which the flashlight beam is dark and in which the wand is held at an angle to the screen in accordance with one embodiment of the invention. Display screen 2700 may include dark flashlight beam 2710 and lit portion 2712. In some embodiments, flashlight beam 2710 may be an elliptical shape to illustrate the angle at which wand 2740 points at screen 2700. For example, the characteristic lengths of flashlight beam 2710 (e.g., the lengths of the two axes defining the ellipsis) may be related to the angle at which wand 2740 points to screen (e.g., to the angle between the of the x-z component of the wand orientation and the z-axis). As another example, the shape of flashlight beam 2710 may be related to the user's motion of wand 2740 (e.g., motion in the x-direction directs the electronic device to change the angle in the x-direction from which it appears a flashlight is pointing to screen 2700). In some embodiments, screen 2700 may include shadows 2714. Shadows 2714 may be displayed to provide the effect of an oblique light source, where wand 2740 may provide the oblique light source.

Figure 28:
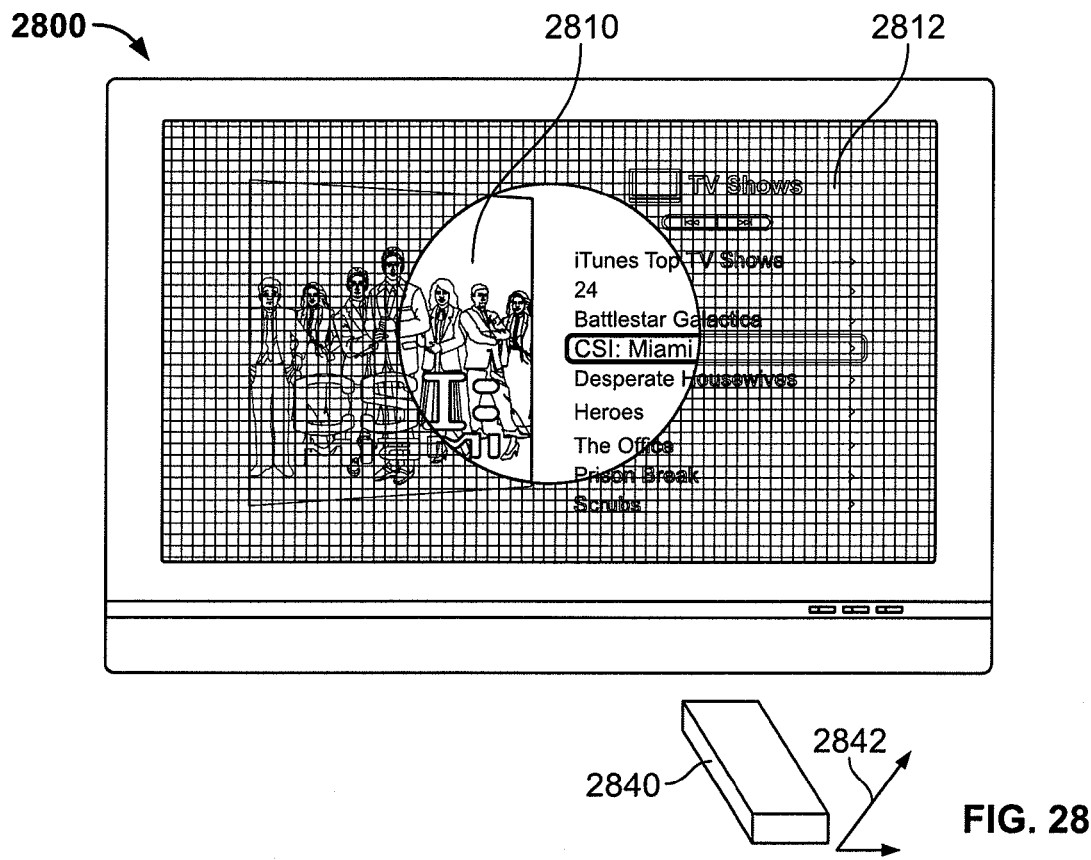
FIGS. 28 and 29 are illustrative displays of a flashlight application as a user moves the wand to change to orientation of flashlight beam in accordance with one embodiment of the invention.
Figure 29:
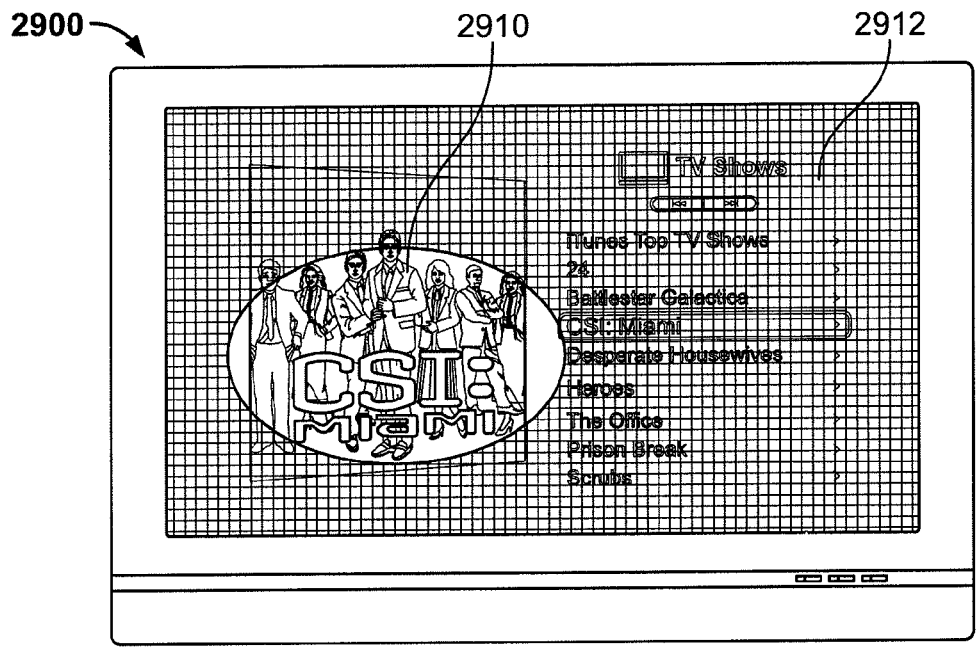

FIGS. 28 and 29 are illustrative displays of a flashlight application as a user moves the wand to change to orientation of flashlight beam in accordance with one embodiment of the invention. Display screen 2800 may include flashlight beam 2810 and dark portion 2812. Wand 2840 may be oriented to the center of display 2800, such that beam 2810 is substantially circular and located near the center of the screen. The orientation of wand 2840 may be indicated relative to origin 2842.

When the user moves wand 2840, as shown by the orientation of wand 2940 in FIG. 29, display screen 2900 may include flashlight beam 2910 and dark portion 2912. In some embodiments, flashlight beam 2910 may be an elliptical shape to illustrate the angle at which wand 2940 points at screen 2900. For example, the characteristic lengths of flashlight beam 2910 (e.g., the lengths of the two axes defining the ellipsis) may be related to the angle at which wand 2940 points to screen (e.g., to the angle between the of the x-z component of the wand orientation and the z-axis). As another example, the shape of flashlight beam 2910 may be related to the user's motion of wand 2940. In some embodiments, beam 2910 may be positioned on screen 2900 to illustrate the orientation at which wand 2940 points at screen 2900. For example, beam 2910 may be positioned such that a user has the impression that wand 2940 is a flashlight (e.g., the position of beam 2910 is consistent with the orientation of wand 2940).

Figure 30:
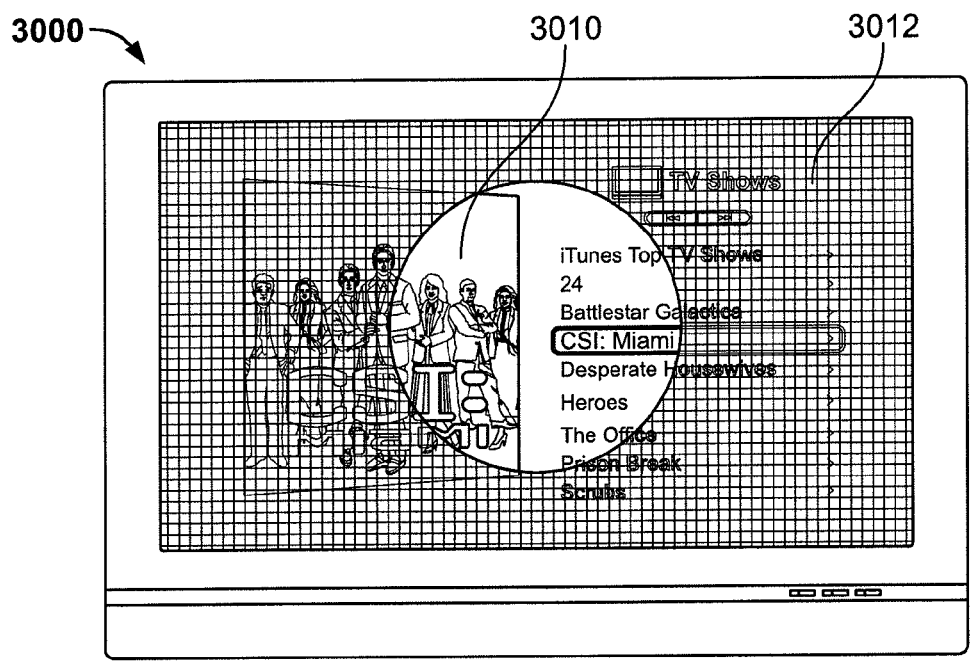
FIGS. 30 and 31 are other illustrative displays of a flashlight application as a user moves the wand to change to orientation of flashlight beam in accordance with one embodiment of the invention.
Figure 31:
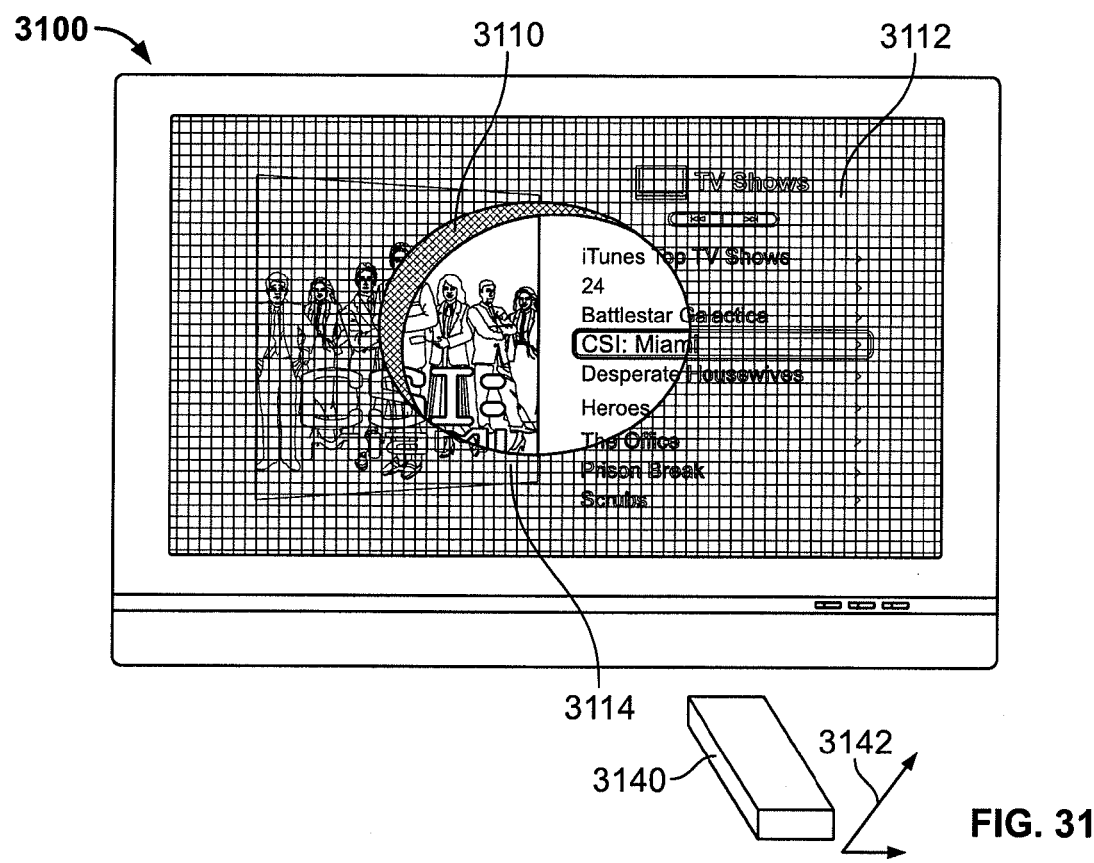

FIGS. 30 and 31 are other illustrative displays of a flashlight application as a user moves the wand to change to orientation of flashlight beam in accordance with one embodiment of the invention. Display screen 3000 may include flashlight beam 3010 and dark portion 3012. Wand 3040 may be oriented to the center of display 3000, such that beam 3010 is substantially circular and located near the center of the screen. The orientation of wand 3040 may be indicated relative to origin 3042.

When the user moves wand 3040, as shown by the orientation of wand 3140 in FIG. 31, display screen 3100 may include flashlight beam 3110 and dark portion 3112. In some embodiments, flashlight beam 3110 may be an elliptical shape to illustrate the angle at which wand 3140 points at screen 3100 (e.g., relative to origin 3142, which may be the same as origin 3042). For example, the characteristic lengths of flashlight beam 3110 (e.g., the length of the two axes defining the ellipsis) may be related to the angle at which wand 3140 points to screen (e.g., to the angle between the of the x-z component of the wand orientation and the z-axis). As another example, the shape of flashlight beam 3110 may be related to the user's motion of wand 3140. In some embodiments, beam 3110 may remain positioned near the center of screen 3100, but beam 3110 may include shadows 3114 to illustrate the orientation at which wand 3140 points at screen 3100. For example, shadows 3114 may be displayed such that they would be the shadows displayed if a user were to use wand 3100 as a flashlight pointed at the center of screen 3100 from the current angle (e.g., shadows 3114 and beam 3110 are consistent with the orientation of wand 3140).

The user may switch between flashlight application functions (e.g., shadows, beam movement, and beam shape) in any suitable manner. For example, the user may provide a particular input using the input mechanism of the wand to activate one or more function. As another example, the user may hold or move the wand in a particular manner to activate or de-activate one or more function (e.g., snap the wand to add shadows to the flashlight).

Figure 32:
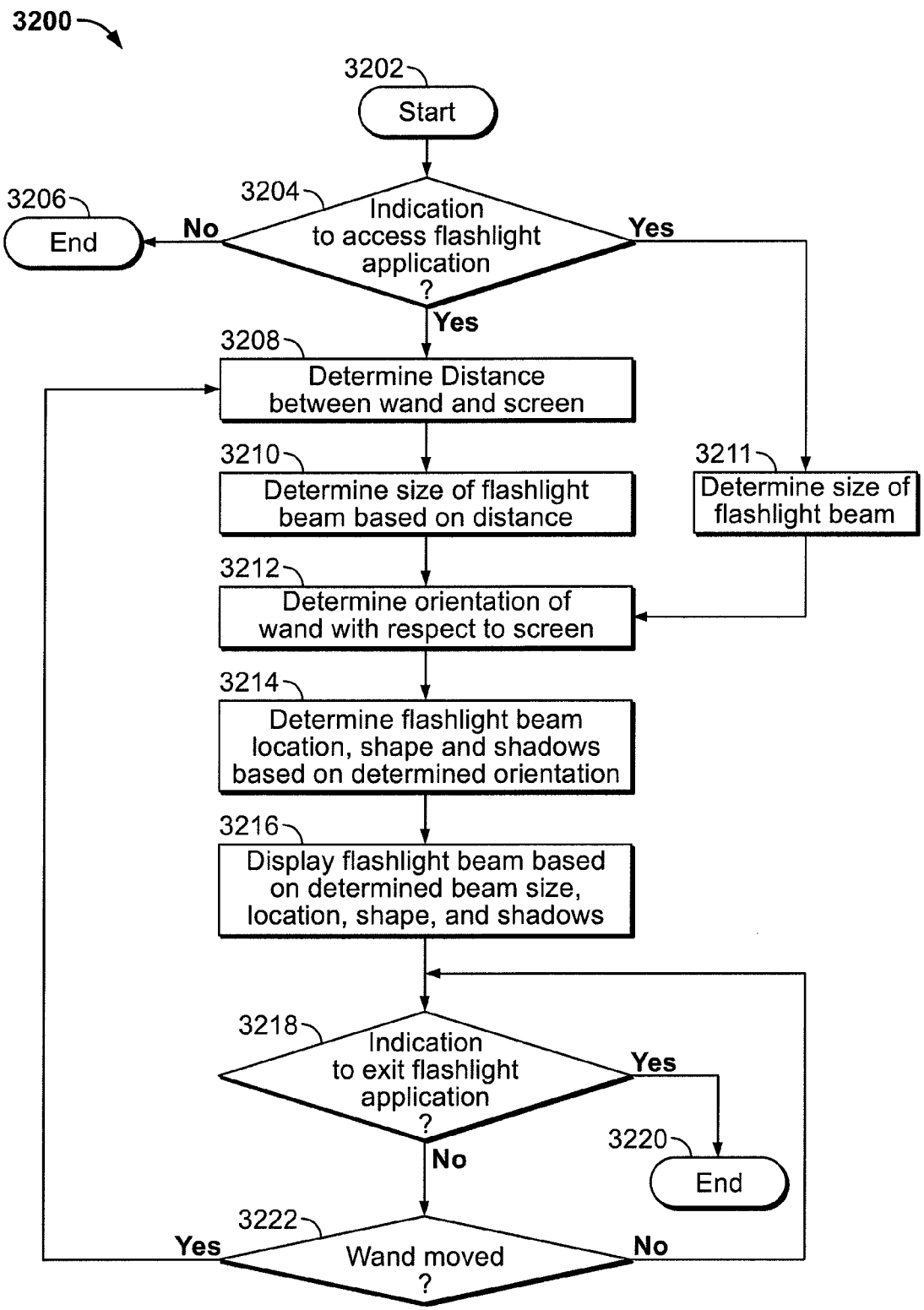
FIG. 32 is a flowchart of an illustrative process for a flashlight application in accordance with one embodiment of the invention.

FIG. 32 is a flowchart of an illustrative process for a flashlight application in accordance with one embodiment of the invention. Process 3200 begins at step 3202. At step 3204, the media system may determine whether the user has provided an indication to access the flashlight application. For example, electronic device 104 (FIG. 1) may determine whether the user has provided an indication (e.g., using input mechanism 208, FIG. 2, or by moving wand 106, FIG. 1, in a specific manner) to access the flashlight application. If the media system determines that the user has not provided an indication to access the flashlight application, process 3200 may move to step 3206 and end.

If, at step 3204, the media system instead determines what the user has provided an indication to access the flashlight application, process 3200 may move to step 3208. At step 3208, the media system may determine the distance between the wand and the screen. For example, wand 106 may detect its position relative to IR modules 120 and 122 (FIG. 1), and determine the distance between wand 106 and screen 102 (FIG. 1) based on the determined position. Wand 106 may transmit the determined distance to electronic device 104 using any suitable approach.

At step 3210, the media system may determine the size of the flashlight beam to display on the screen based on the distance determined at step 3208. For example, electronic device 104 may determine the size of the flashlight beam based on the ratio of the size of screen 102 and the determined distance. In some embodiments, other approaches for correlating the determined distance and the size of the flashlight beam may be used.

In some embodiments, process 3200 may replace steps 3208 and 3210 with step 3211. At step 3211, the media system may determine the size of the flashlight beam to display based on user inputs. For example, electronic device 104 may receive user inputs from wand 106 operative to provide instructions for movement in the z-axis.

At step 3212, the media system may determine the orientation of the wand with respect to the screen. For example, wand 106 may detect its position relative to IR modules 120 and 122, and determine its orientation relative to the IR modules. Wand 106 or electronic device 104 may then determine the orientation of wand 106 with respect to screen 102 based on the relative positions of screen 102 and IR modules 120 and 122. In some embodiments, wand 106 may instead or in addition use information received from motion detection component 206 (FIG. 2) to determine the orientation of wand 106. Wand 106 may transmit to electronic device 104 its orientation relative to screen 102 using any suitable approach.

At step 3214, the media system may determine the flashlight beam location, shape and shadows based on the orientation determined at step 3212. For example, electronic device 104 may determine the flashlight beam location based on the orientation at which wand 106 points to screen 102 (e.g., the flashlight beam is aligned with the orientation of wand 106). As another example, electronic device 104 may determine the flashlight beam shape based on the angle at which wand 106 points to screen 102. If the flashlight beam shape is an ellipse, electronic device 104 may determine the ratio of the principal axes based on the determined orientation. As still another example, electronic device 104 may determine the darkness and gradation of shadows displayed around the flashlight beam based on the orientation determined at step 3212 or on information received related to the movement of wand 106.

At step 3216, the media system may display a flashlight that has the size, shape and shadows determined at steps 3210 and 3214 and at the position determined at step 3214. For example, electronic device 104 may direct screen 102 to display a flashlight beam at the position determined at step 3214 and that has the size, shape and shadows determined at steps 3210 and 3214.

At step 3218, the media system may determine whether the user has provided an indication to exit the flashlight application. For example, electronic device 104 may determine whether the user has provided an indication (e.g., using input mechanism 208 or by moving wand 106 in a specific manner) to exit the flashlight application. If the media system determines that the user has provided an indication to exit the flashlight application, process 3200 may move to step 3220 and ends.

If, at step 3218, the media system instead determines that the user has not provided an indication to exit the flashlight application, process 3200 may move to step 3222. At step 3222, the media system may determine whether the wand has moved. For example, wand 106 may determine, using motion detection component 208, whether wand 106 was moved. As another example, wand 106 may compare its prior position and orientation relative to IR modules 120 and 122 with its current position and orientation relative to IR modules 120 and 122 to determine whether wand 106 was moved. If the media system determines that wand 106 has not moved, process 3200 may return to step 3218, and the media system may monitor user interactions.

If at step 3222, the media system instead determines that wand 106 has moved, process 3200 may move to step 3208 to determine the new current position, size, shape and shadows for the flashlight beam.

In some embodiments, the user of media system 100 may use wand 106 to scroll through screens displayed by electronic device 104.

Figure 33:
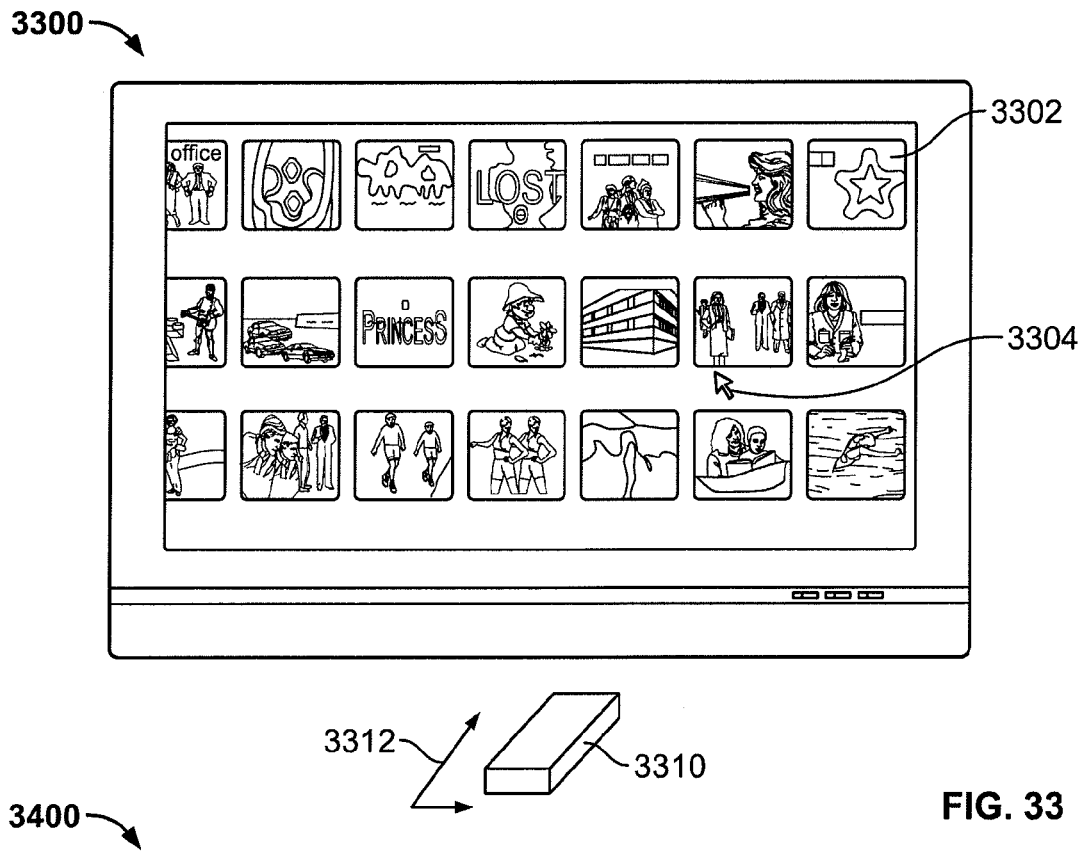
FIG. 33 is an illustrative display screen that a user may cause to scroll in any direction in accordance with one embodiment of the invention.

FIG. 33 is an illustrative display screen that a user may cause to scroll in any direction in accordance with one embodiment of the invention. Display screen 3300 may include images 3302 available for selection by a user. Wand 3310 may be operative to control the movement of cursor 3304 for selecting one or more images 3302 or for causing display screen 3300 to scroll. In some embodiments, the user may move wand 3310 to cause cursor 3304 to move. The orientation of wand 3310 with respect to screen 3300 may be indicated relative to origin 3312. In some embodiments, images 3302, or other displayed objects, may be part of a set (e.g., a photo album).

Figure 34:
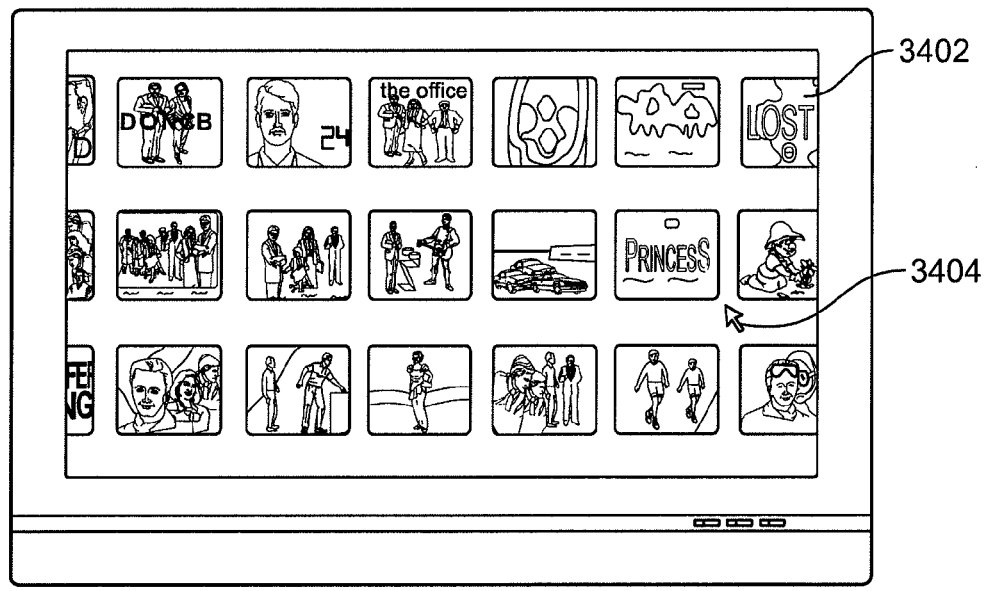
FIGS. 34 and 35 are illustrative display screens of displays that may be scrolled horizontally in the left and right directions, respectively, in accordance with one embodiment of the invention.
Figure 35:
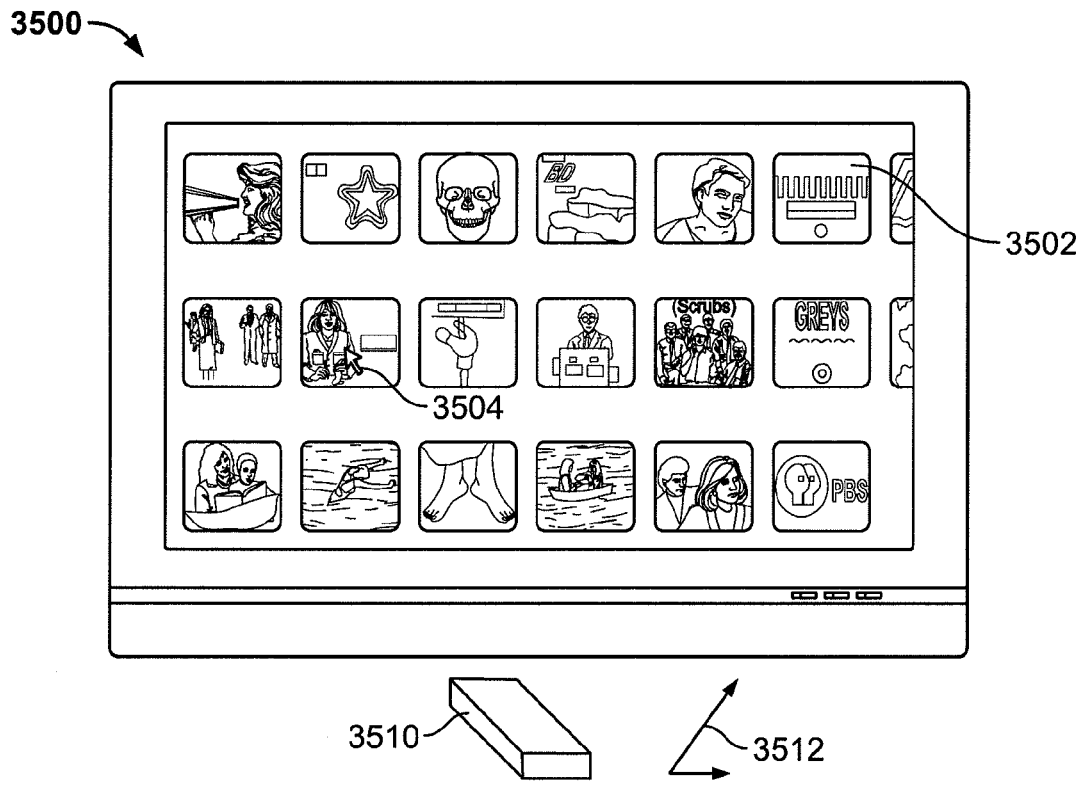

FIGS. 34 and 35 are illustrative display screens of displays that may be scrolled horizontally in the left and right directions, respectively, in accordance with one embodiment of the invention. Display screen 3400 may include images 3402, which may include some images identical to images 3302 (FIG. 33). Similarly, display screen 3500 may include images 3502, which may include some images identical to images 3302. Wand 3410 may be operative to control the movement of cursor 3404 for selecting one or more images 3402, and wand 3510 may be operative to control the movement of cursor 3504 for selecting one or more images 3502.

To view images that are not initially on screen 3400 or screen 3500, the user may orient wand 3410 and wand 3510, respectively, such that cursors 3404 and 3504, respectively, point to the side of screens 3400 and 3500, respectively. For example, to scroll initial images 3302 to the right, the user may move wand 3410 such that it is oriented more to the right than wand 3310 (e.g., as indicated relative to origins 3312 and 3412, which may be the same origins), causing cursor 3404 to move to the right and images 3302 to scroll to the right, displaying images 3402. As another example, to scroll initial images 3302 to the left, the user may move wand 3510 such that it is oriented more to the left than wand 3310 (e.g., as indicated relative to origins 3312 and 3512, which may be the same origins), causing cursor 3504 to move to the left and images 3302 to scroll to the left, displaying images 3502. In some embodiments, the user may move wands 3410 and 3510 such that motion detection components within the wands detect the left and right motion, respectively, and transmit the motion to the electronic device controlling the display of images 3402 and 3502. In such a case, the user may scroll the display of images without pointing to a specific portion of the screen.

Figure 36:
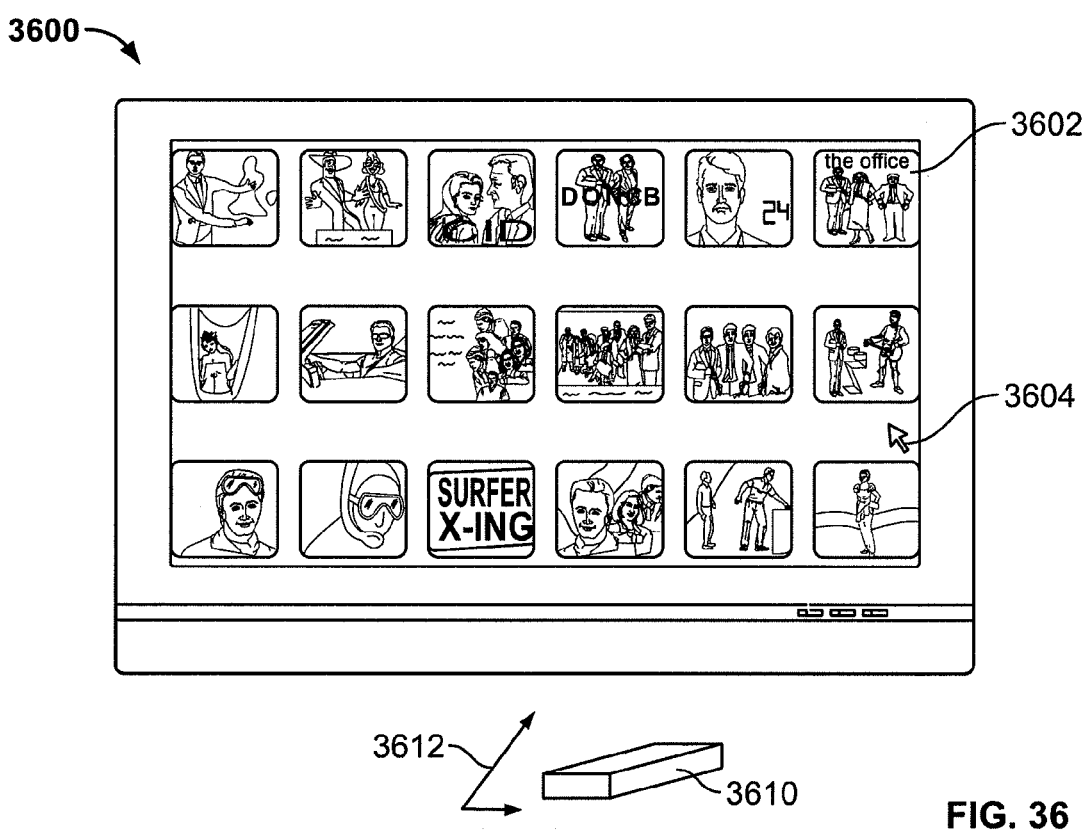
FIGS. 36 and 37 may be illustrative display screens of displays that are paged horizontally in the left and right directions, respectively, in accordance with one embodiment of the invention.
Figure 37:
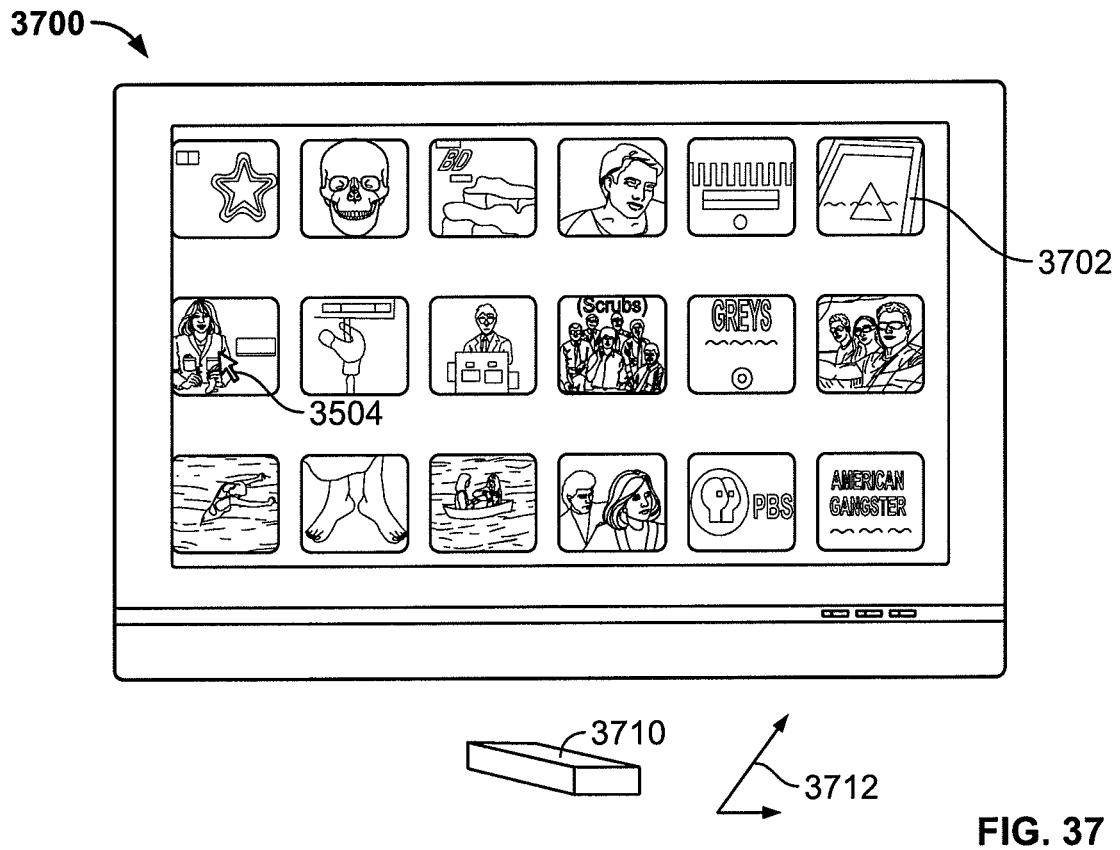

FIGS. 36 and 37 are illustrative display screens of displays that may be paged horizontally in the left and right directions, respectively, in accordance with one embodiment of the invention. Display screen 3600 may include images 3602, which may include images different than images 3302 (FIG. 33). Similarly, display screen 3700 may include images 3702, which may include images different than images 3302. Wand 3610 may be operative to control the movement of cursor 3604 for selecting one or more images 3602, and wand 3710 may be operative to control the movement of cursor 3704 for selecting one or more images 3702.

To view images that are not initially on screen 3600 or screen 3700, the user may orient wand 3610 and wand 3710, respectively, such that cursors 3604 and 3704, respectively, point to the edge or off the edge of screens 3600 and 3700, respectively. For example, to page initial images 3302 to the right (e.g., replace all of images 3302 with the next set of images located to the right of images 3302), the user may move wand 3610 such that it is oriented more to the right than wand 3310 and at or off the right edge of screen 3600 (e.g., as indicated relative to origins 3312 and 3612, which may be the same origins), causing cursor 3604 to move to the right edge of screen 3600 and images 3302 to page to the right, displaying images 3602. As another example, to page initial images 3302 to the left (e.g., to replace all of images 3302 with the next set of images located to the left of images 3302), the user may move wand 3710 such that it is oriented more to the left than wand 3310 and at or off the left edge of screen 3700 (e.g., as indicated relative to origins 3312 and 3712, which may be the same origins), causing cursor 3704 to move to the left edge of screen 3700 and images 3302 to page to the left, displaying images 3702.

In some embodiments, the user may move wands 3610 and 3710 such that motion detection components within the wands detect the left and right motion, respectively, and transmit the motion to the electronic device controlling the display of images 3402 and 3502. To distinguish instructions for scrolling and paging, the media system may determine, from the transmitted motion information, whether the motion exceeded a particular motion (e.g., large motions indicate paging, smaller motions indicate scrolling). In some embodiments, the user may direct the display to page by providing an input in addition to moving the wand (e.g., pressing a button and moving the wand). In such a case, the user may page the display of images without pointing to a specific portion of the screen. To indicate to the user that the media system is paging the displays on screens 3600 and 3700 (e.g., and not scrolling the displays), cursors 3604 and 3704 may be different from cursor 3304 (FIG. 33). In some embodiments, the media system may rapidly scroll through images displayed on screens 3600 and 3700 instead of paging through images.

Figure 38:
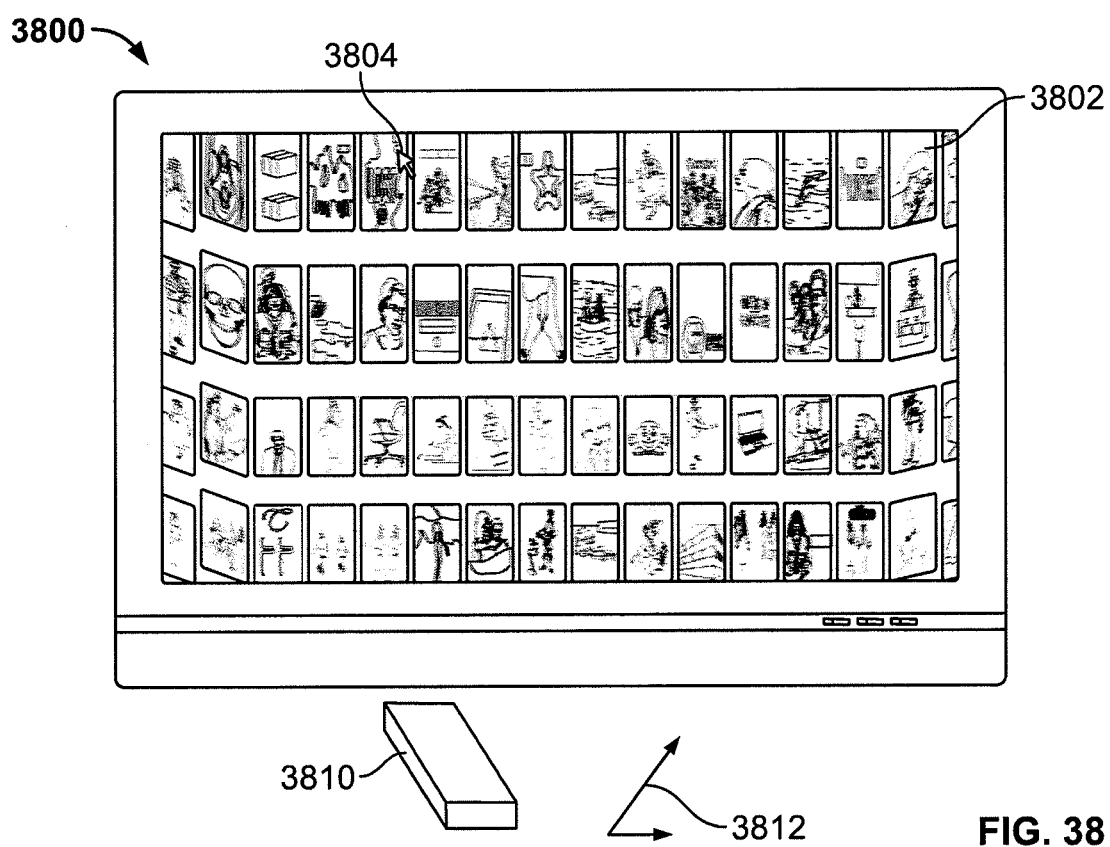
FIGS. 38 and 39 are illustrative display screens of displays that may be scrolled vertically in the up and down directions, respectively, in accordance with one embodiment of the invention.
Figure 39:
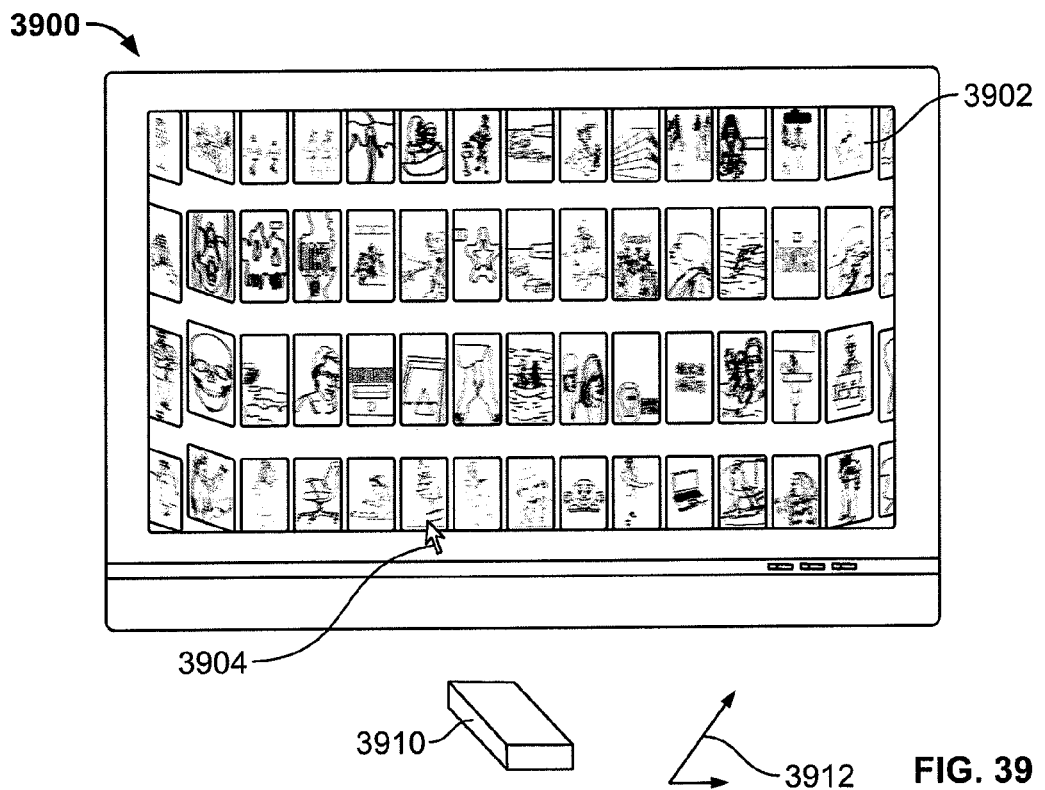

FIGS. 38 and 39 are illustrative display screens of displays that may be scrolled vertically in the up and down directions, respectively, in accordance with one embodiment of the invention. Display screen 3800 may include images 3802, which may include some images identical to images 3302 (FIG. 33). Similarly, display screen 3900 may include images 3902, which may include some images identical to images 3302. Wand 3810 may be operative to control the movement of cursor 3804 for selecting one or more images 3802, and wand 3910 may be operative to control the movement of cursor 3904 for selecting one or more images 3902.

To view images that are not initially on screen 3800 or screen 3900, the user may orient wand 3810 and wand 3910, respectively, such that cursors 3804 and 3904, respectively, point to the top and bottom of screens 3800 and 3900, respectively. For example, to scroll initial images 3902 up, the user may move wand 3810 such that it is oriented more upwards than wand 3310 (e.g., as indicated relative to origins 3312 and 3812, which may be the same origins), causing cursor 3804 to move up and images 3302 to scroll up, displaying images 3802. As another example, to scroll initial images 3302 down, the user may move wand 3910 such that it is oriented more downwards than wand 3310 (e.g., as indicated relative to origins 3312 and 3912, which may be the same origins), causing cursor 3904 to move down and images 3302 to scroll down, displaying images 3902. In some embodiments, the user may move wands 3810 and 3910 such that motion detection components within the wands detect the up and down motion, respectively, and transmit the motion to the electronic device controlling the display of images 3802 and 3902. In such a case, the user may scroll the display of images without pointing to a specific portion of the screen.

Figure 40:
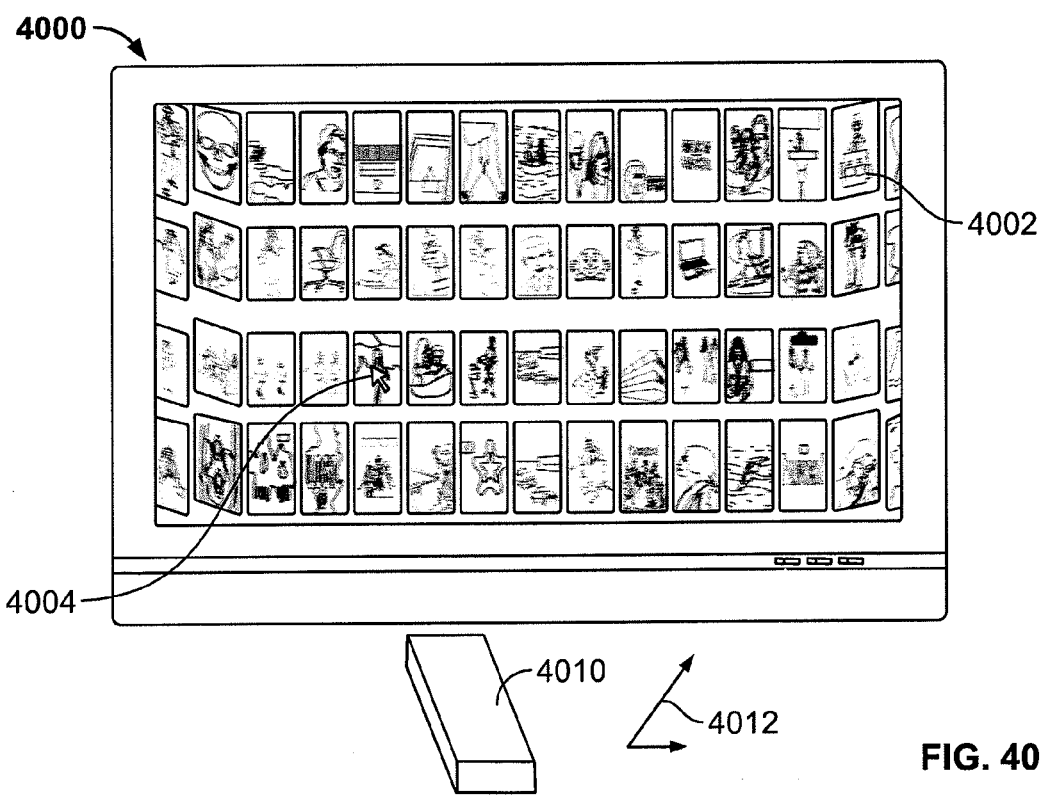
FIGS. 40 and 41 are illustrative display screens of displays that may be paged vertically up and down, respectively, in accordance with one embodiment of the invention.
Figure 41:
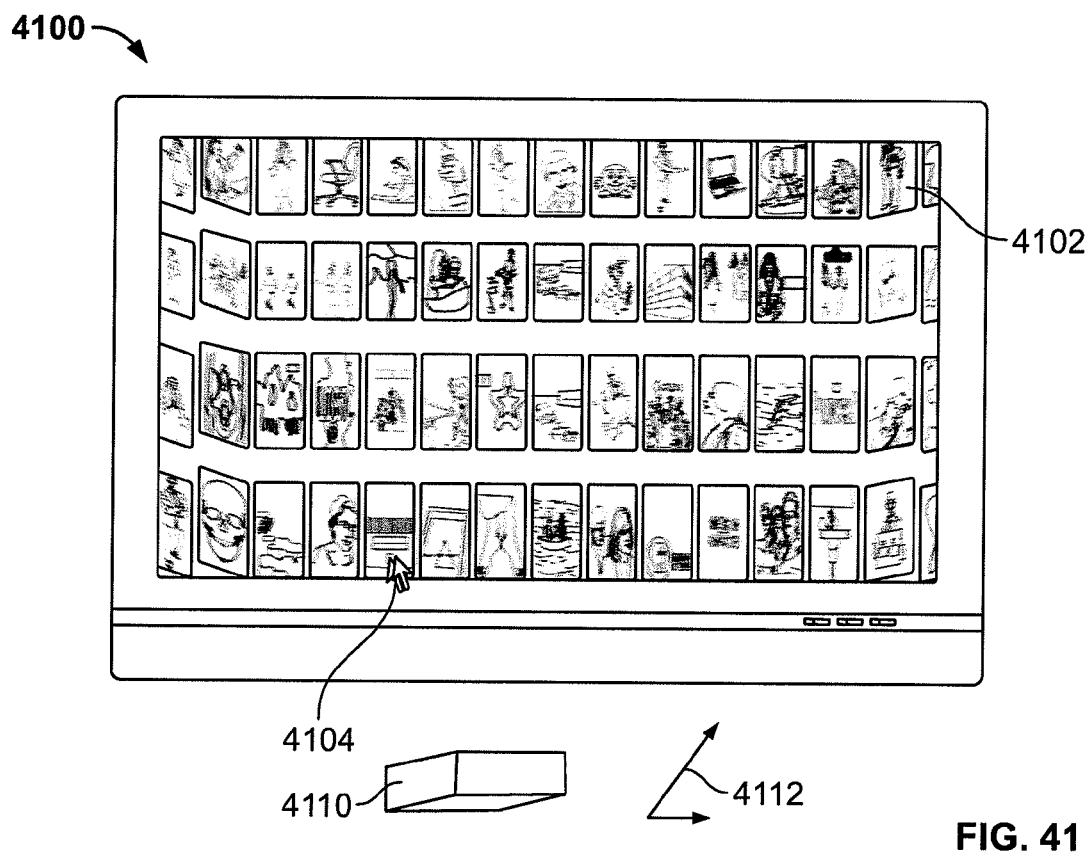

FIGS. 40 and 41 are illustrative display screens of displays that may be paged vertically up and down, respectively, in accordance with one embodiment of the invention. Display screen 4000 may include images 4002, which may include images different than images 3302 (FIG. 33). Similarly, display screen 4100 may include images 4102, which may include images different than images 3302. Wand 4010 may be operative to control the movement of cursor 4004 for selecting one or more images 4002, and wand 4110 may be operative to control the movement of cursor 4104 for selecting one or more images 4102.

To view images that are not initially on screen 4000 or screen 4100, the user may orient wand 4010 and wand 4110, respectively, such that cursors 4004 and 4104, respectively, point to the edge or off the top and bottom of screens 4000 and 4100, respectively. For example, to page up initial images 3302 (e.g., replace all of images 3302 with the next set of images located above images 3302), the user may move wand 4010 such that it is oriented more upwards than wand 3310 and at or off the top edge of screen 4000 (e.g., as indicated relative to origins 3312 and 4012, which may be the same origins), causing cursor 4004 to move to the top edge of screen 4000 and images 3302 to page up, displaying images 4002. As another example, to page down initial images 3302 (e.g., replace all of images 3302 with the next set of images located below images 3302), the user may move wand 4110 such that it is oriented more downwards than wand 3310 and at or off the bottom edge of screen 4100 (e.g., as indicated relative to origins 3312 and 4112, which may be the same origins), causing cursor 4104 to move to the bottom edge of screen 4100 and images 3302 to page down, displaying images 4102.

In some embodiments, the user may move wands 4010 and 4110 such that motion detection components within the wands detect the up and down motion, respectively, and transmit the motion to the electronic device controlling the display of images 3402 and 3502. To distinguish instructions for scrolling and paging, the media system may determine, from the transmitted motion information, whether the motion exceeded a particular motion (e.g., large motions indicate paging, smaller motions indicate scrolling). In some embodiments, the user may direct the display to page by providing an input in addition to moving the wand (e.g., pressing a button and moving the wand). In such a case, the user may page the display of images without pointing to a specific portion of the screen. To indicate to the user that the media system is paging the displays on screens 4000 and 4100, cursors 4004 and 4104 may be different from cursor 3304 (FIG. 33). In some embodiments, the media system may rapidly scroll through images displayed on screens 4000 and 4100 instead of paging through images.

Figure 42:
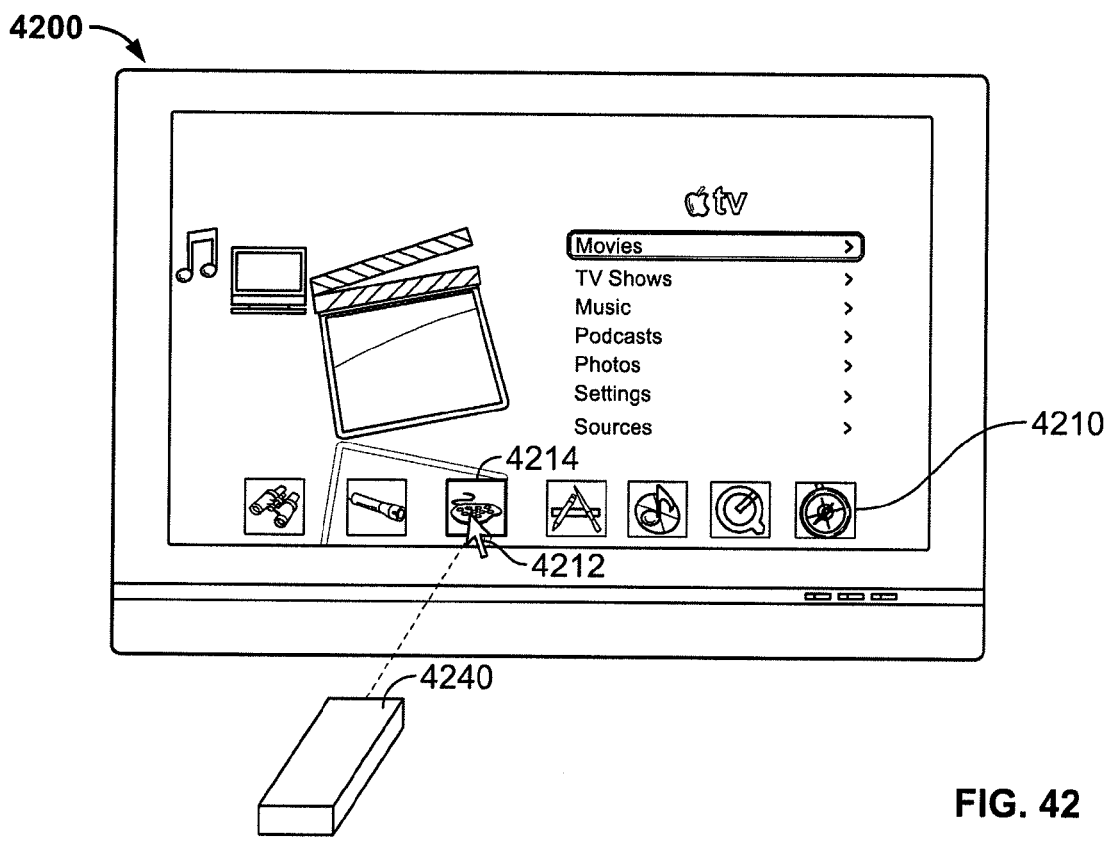
FIG. 42 is an illustrative display screen for selecting a keyboard application in accordance with one embodiment of the invention.

In some embodiments, the user may use the scrolling functionality of the media system to enter characters using a virtual keyboard displayed on the screen. The user may use the virtual keyboard application for any suitable purpose, including for example, entering search terms, navigating to an Internet address, logging in to the electronic device, writing a note (e.g., an e-mail or a reminder), creating a folder or album (e.g., a photo album) or any other suitable purpose. FIG. 42 is an illustrative display screen for selecting a keyboard application in accordance with one embodiment of the invention. Display screen 4200 may include selectable options 4210 that the user may select by placing cursor 4212 over a particular option (e.g., by pointing wand 4240 at the particular option). When a user provides an indication to select an option, the electronic device may display highlight region 4214 to indicate to the user that the option has been selected. The user may select the option in any suitable manner including, for example, providing a selection on an input mechanism (e.g., pressing a button), or moving wand 4240 in a particular manner (e.g., flicking wand 4240, rotating wand 4240 in a particular manner, or moving wand 4240 a particular distance off screen 4200).

Figure 43:
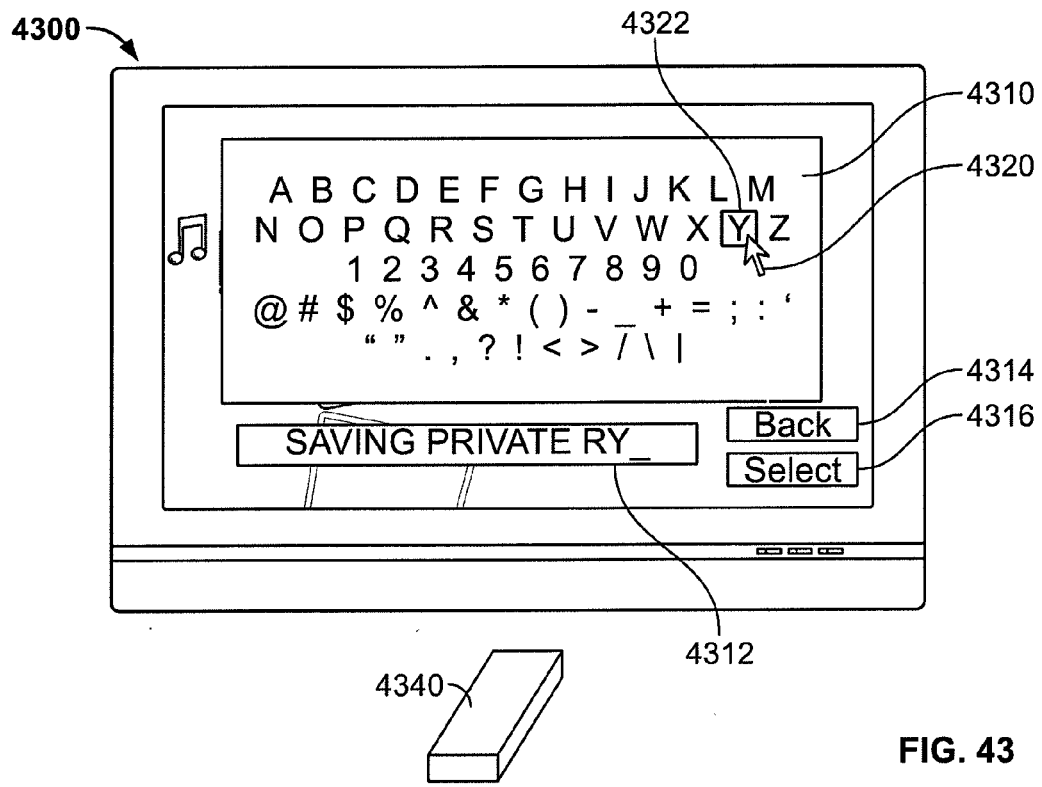
FIG. 43 is an illustrative display screen of a keyboard application in accordance with one embodiment of the invention.

FIG. 43 is an illustrative display screen of a keyboard application in accordance with one embodiment of the invention. Display screen 4300 may include virtual keyboard 4310 and input box 4312. Virtual keyboard 4310 may include any suitable set of characters, including for example all letters and numbers. In some embodiments, the characters may be disposed as in a computer keyboard (e.g., in a QWERTY layout), or the characters may be listed alphabetically. In some embodiments, virtual keyboard 4310 may include one or more options to access additional characters that are not initially displayed (e.g., a SHIFT or FUNCTION key), or the user may provide an input using wand 4340 (e.g., press a button on the wand) to access additional characters.

A user may select a character (e.g., a letter or a number) by placing cursor 4320 over a character (e.g., by pointing wand 4340 at the character), and providing a selection input using wand 4340. For example, the user may use an input mechanism (e.g., press a button), or move wand 4340 in a particular manner (e.g., flick wand 4340, rotate wand 4340 in a particular manner, or move wand 4340 a particular distance off screen 4300). In some embodiments, the electronic device may indicate that a character has been selected by placing highlight region 4322 over the character.

As the user selects characters from virtual keyboard 4310, the selected characters may be displayed in input box 4312. The user may place a cursor at any position in input box 4312 by pointing wand 4340 at the selected position. To erase a mistaken entry, the user may select BACK option 4314, or may provide any other suitable input with wand 4340 (e.g., press a button on wand 4340, or move wand 4340 in a particular manner). When the user has entered a complete input in input box 4340, the user may select SELECT option 4316, or may provide any other suitable input with wand 4340 (e.g., press a button on wand 4340, or move wand 4340 in a particular manner).

Figure 44:
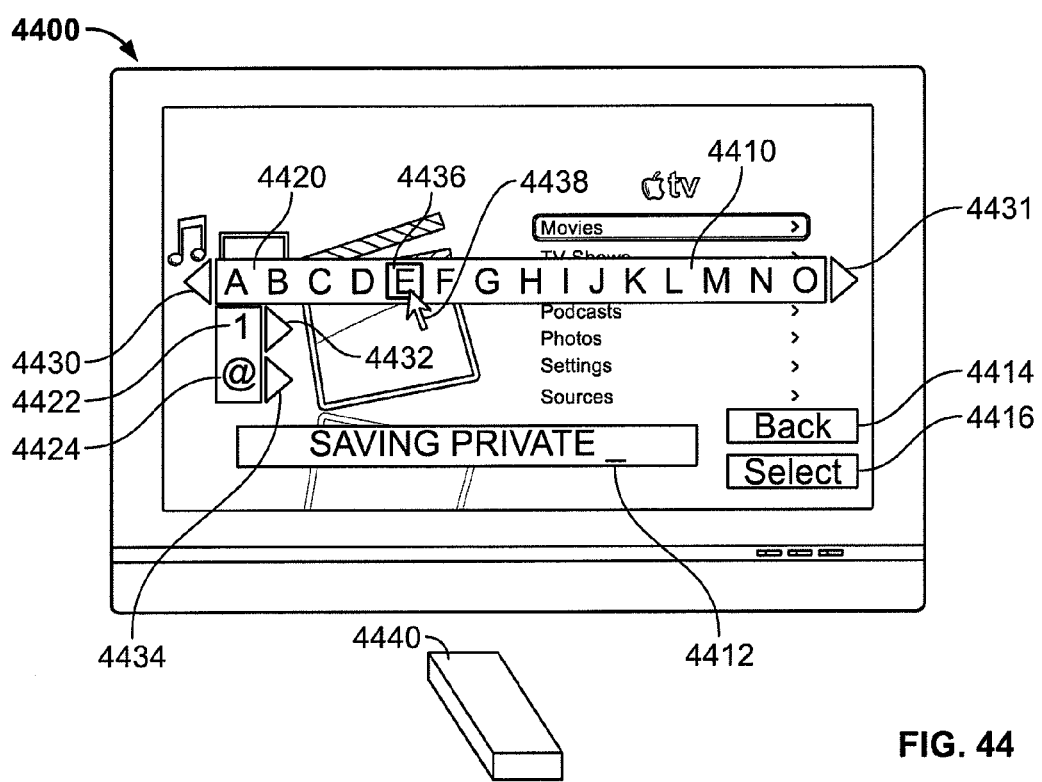
FIG. 44 is another illustrative display screen of a keyboard application in accordance with one embodiment of the invention.

FIG. 44 is another illustrative display screen of a keyboard application in accordance with one embodiment of the invention. Display screen 4400 may include virtual keyboard 4410 and input box 4412. Virtual keyboard 4410 may include a plurality of lines 4420, 4422 and 4424 of different characters that a user may select to input. For example, line 4420 may include letters, line 4422 may include numbers, and line 4424 may include punctuation marks and other characters. In some embodiments, to reduce the visual clutter, only one of lines 4420, 4422 and 4424 may be displayed at a time.

The user may select a character on the displayed line 4420, 4422 or 4424 by pointing wand 4440 at a particular character to place cursor 4438 over the character. To access other characters not displayed on a particular line, the user may select one of arrows 4430 and 4431 to scroll line 4420 to the left or to the right. In some embodiments, the user may simply place cursor 4438 at the left or right edge of the screen to scroll line 4420.

To access a line that is not currently displayed (e.g., lines 4422 and 4424), the user may place cursor 4438 on one of lines 4422 and 4424, or arrows 4432 and 4434 to cause associated line 4422 and 4424, respectively, to be displayed. In some embodiments, the user may select one of lines 4422 and 4424, or arrows 4432 and 4434 to cause the associated lines to be displayed. When a new line is displayed, the previously displayed line may be reduced to limit the visual clutter on screen 4400.

A user may select a character (e.g., a letter or a number) or a line (e.g., lines 4420, 4422 and 4424) by placing cursor 4438 over a character or a line (e.g., by pointing wand 4440 at the character or line), and providing a selection input using wand 4440. For example, the user may use an input mechanism (e.g., press a button), or move wand 4440 in a particular manner (e.g., flick wand 4440, rotate wand 4440 in a particular manner, or move wand 4440 a particular distance off screen 4400). In some embodiments, the electronic device may indicate that a character or line has been selected by placing highlight region 4436 over the character.

As the user selects characters from virtual keyboard 4410, the selected characters may be displayed in input box 4412. The user may place a cursor at any position in input box 4412 by pointing wand 4440 at the selected position. To erase a mistaken entry, the user may select BACK option 4414, or may provide any other suitable input with wand 4440 (e.g., press a button on wand 4440, or move wand 4400 in a particular manner). When the user has entered a complete input in input box 4440, the user may select SELECT option 4416, or may provide any other suitable input with wand 4440.

Figure 45:
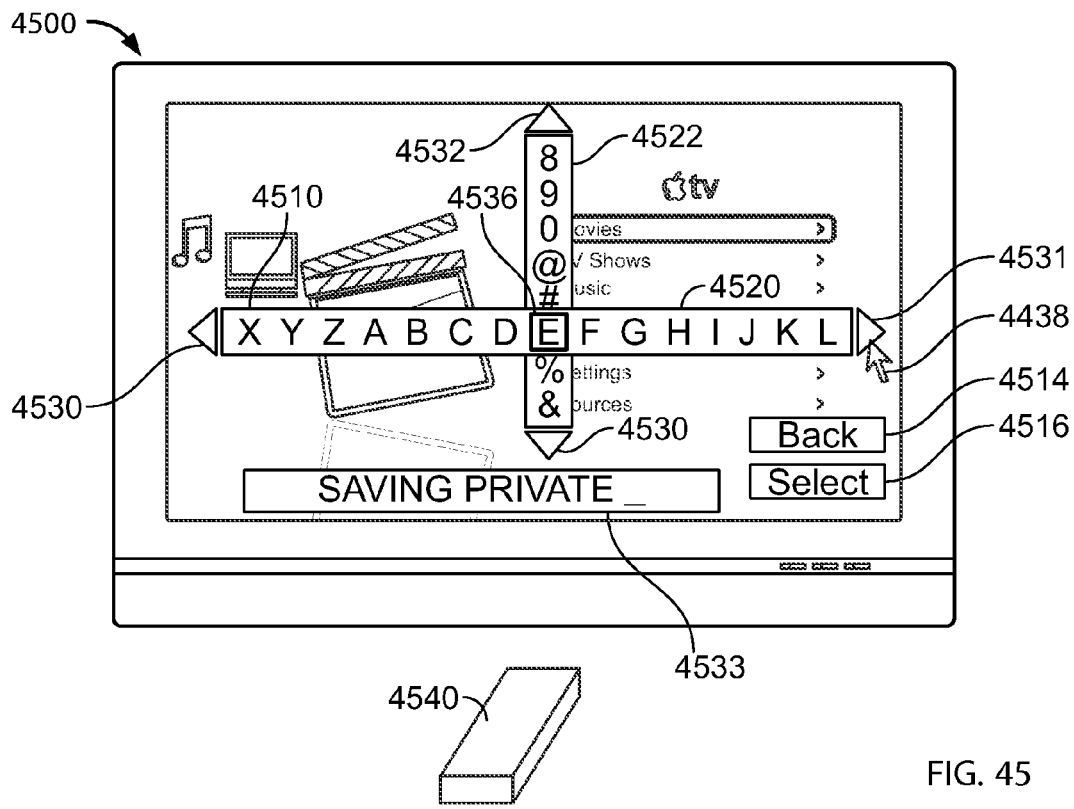
FIG. 45 is still another illustrative display screen of a keyboard application in accordance with one embodiment of the invention.

FIG. 45 is still another illustrative display screen of a keyboard application in accordance with one embodiment of the invention. Display screen 4500 may include virtual keyboard 4510 and input box 4512. Virtual keyboard 4510 may include intersecting lines 4420 and 4422, each having different characters that a user may input. For example, line 4420 may include letters, and line 4422 may include numbers, punctuation marks and other characters.

The user may select a character on the displayed line 4420 or 4422 by first selecting a line, and then selecting a character on the line. To select a line, the user may point wand 4440 at a line (e.g., to place cursor 4538 on the line). The electronic device may indicate that a particular line has been selected and that the user may select characters from the line by placing a highlight region around the line (e.g., a highlight region is displayed around line 4520). The user may then place cursor 4538 over characters of the selected line to select the characters. In some embodiments, the user may select a character by scrolling the selected line such that the selected character is placed in static highlight region 4536.

To scroll line 4520, the user may place cursor 4538 over one of arrows 4530 and 4531, and to scroll line 4522, the user may place cursor 4538 over one of arrows 4532 and 4533. In some embodiments, the user may place cursor 4538 at the left or right edge of the screen to scroll line 4520, and place cursor 4538 at the top or bottom edge of the screen to scroll line 4522.

A user may select a character (e.g., a letter or a number) or a line (e.g., line 4520 or 4522) by placing cursor 4538 over a character or a line (e.g., by pointing wand 4540 at the character or line), and providing a selection input using wand 4540. For example, the user may use an input mechanism (e.g., press a button), or move wand 4540 in a particular manner (e.g., flick wand 4540, rotate wand 4540 in a particular manner, or move wand 4540 a particular distance off screen 4500). In some embodiments, the electronic device may indicate that a character or line has been selected by placing highlight region 4536 over the character.

As the user selects characters from virtual keyboard 4510, the selected characters may be displayed in input box 4512. The user may place a cursor at any position in input box 4512 by pointing wand 4540 at the selected position. To erase a mistaken entry, the user may select BACK option 4514, or may provide any other suitable input with wand 4540 (e.g., press a button on wand 4540, or move wand 4540 in a particular manner). When the user has entered a complete input in input box 4512, the user may select SELECT option 4516, or may provide any other suitable input with wand 4540.

Figure 46:
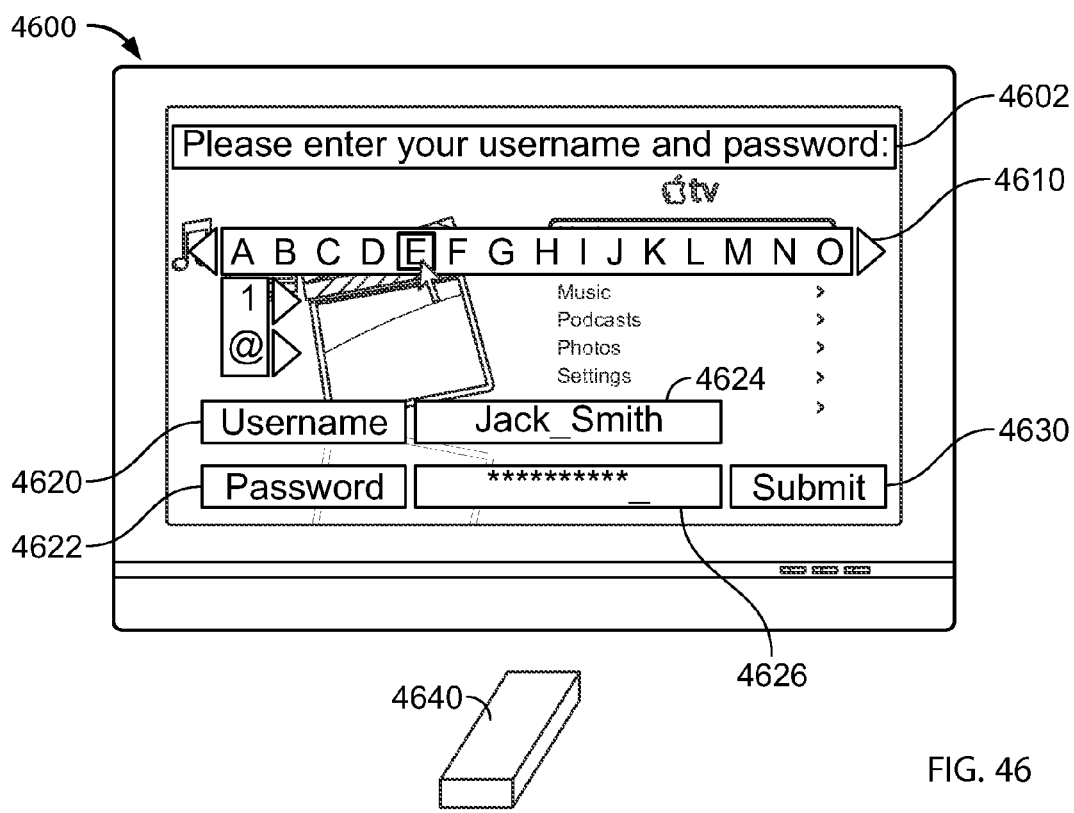
FIG. 46 is an illustrative display screen of a keyboard application used to authenticate a user in accordance with one embodiment of the invention.

FIG. 46 is an illustrative display screen of a keyboard application used to authenticate a user in accordance with one embodiment of the invention. Display screen 4600 may include prompt 4602 for the user to enter authentication information. For example, prompt 4602 may direct the user to enter username and password information. Display screen 4600 may include virtual keyboard 4610 for the user to enter the requested authentication information. Virtual keyboard 4610 may be any suitable virtual keyboard, including any of or combinations of the virtual keyboards described above in connection with FIGS. 43, 44 and 45.

Display screen 4600 may include Username tag 4620 for identifying Username field 4624. The user may enter a username in Username field 4624 by selecting characters from virtual keyboard 4610 with wand 4640. Display screen 4600 may include Password tag 4622 for identifying Password field 4626. The user may enter a username in Username field 4626 by selecting characters from virtual keyboard 4610 with wand 4640. In some embodiments, the user may manipulate the characters entered on Username field 4624 and Password field 4626 similar to the manipulations of characters entered in input boxes 4312, 4412 and 4512 of FIGS. 43, 44, and 45, respectively. Once the user has finished entering username and password information, the user may select Submit option 4630 to provide the authentication information to the electronic device (e.g., to login to the media system).

Figure 47:
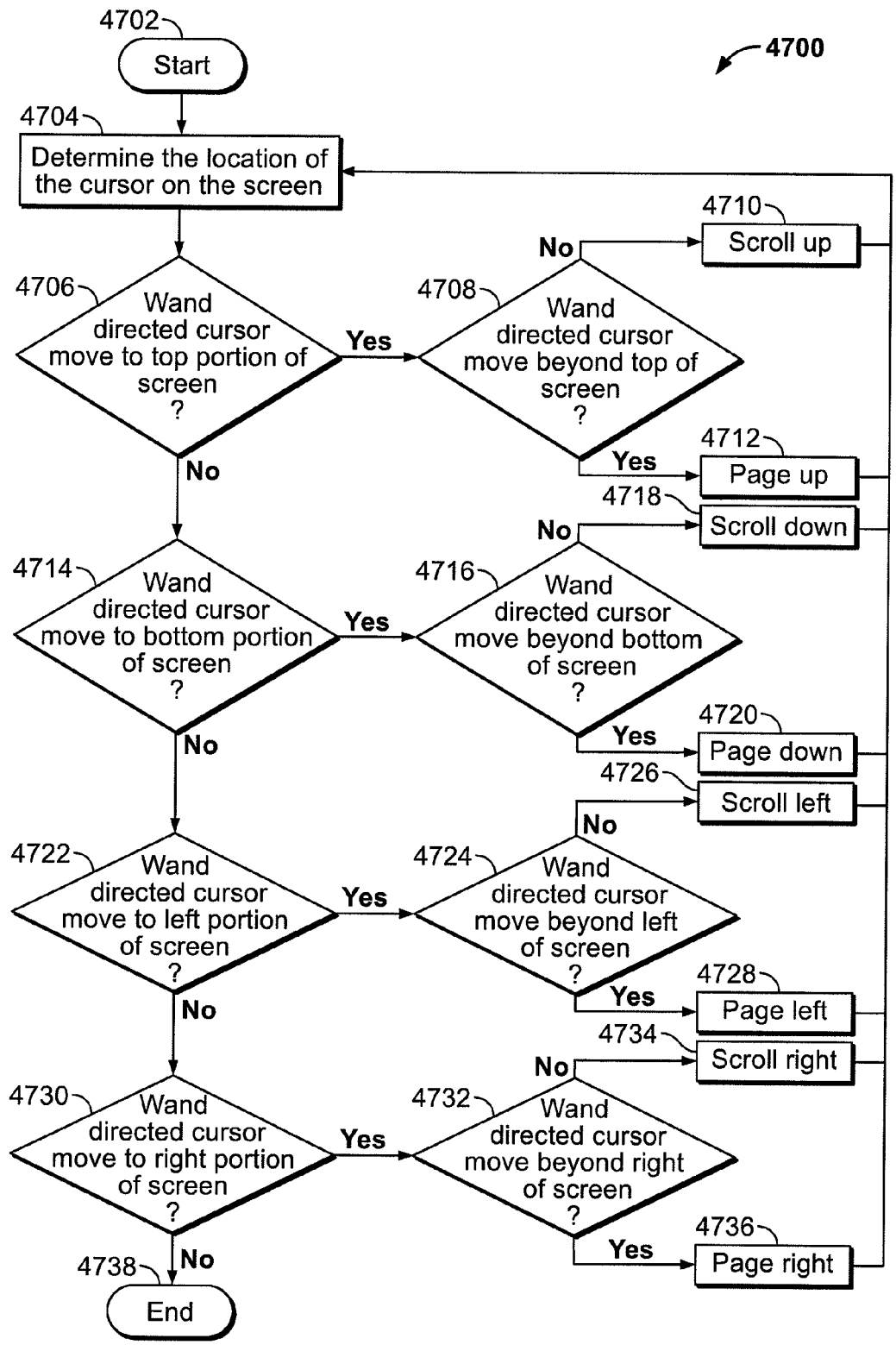
FIG. 47 is a flowchart of an illustrative process for scrolling display screens in accordance with one embodiment of the invention.

FIG. 47 is a flowchart of an illustrative process for scrolling display screens in accordance with one embodiment of the invention. Process 4700 begins at step 4702. At step 4704, the media system may determine the location of the cursor on the screen. For example, electronic device 104 (FIG. 1) may determine the current position on screen 102 (FIG. 1) at which it has displayed the cursor. Electronic device 104 may determine where to display a cursor in a plurality of manners. For example, wand 106 (FIG. 1) may determine its position and orientation relative to screen 102 (FIG. 1) by determining its position and orientation relative to IR modules 120 and 122 (FIG. 1), and transmit the position and orientation information for electronic device 104 to place the cursor at the portion of the screen to which wand 106 points. In some embodiments, wand 106 may determine its orientation using motion detection component 208 (FIG. 2). Wand 106 may be operative to transmit its orientation information to electronic device 104 for electronic device 104 to update the position of the cursor on screen 102 based on the movements determined from the motion detection component (e.g., move wand up to direct the cursor to move up).

At step 4706, the media system may determine whether the wand directed the cursor to the top portion of the screen. For example, electronic device 104 may determine, based on the position and/or orientation information received from wand 106 at step 4704, whether wand 106 is directed the cursor to move to the top portion of the screen. If the media system determines that the directed the cursor to move to the top portion of the screen, process 4700 may move to step 4708.

At step 4708, the media system may determine whether the wand directed the cursor to move beyond the top edge of the screen. For example, electronic device 104 may determine, based on the position and/or orientation information received from wand 106 at step 4704, whether wand 106 directed the cursor to move beyond the top edge of the screen. If the media system determines that the wand did not direct the cursor to move beyond the top edge of the screen, process 4700 may move to step 4710. At step 4710, the media system may scroll up the display of the screen. For example, electronic device 104 may scroll up the display of screen 102, for example at a rate that is related to the distance from the center of the screen to the cursor corresponding to the position of the wand, or at a rate that is related to the amplitude, speed or acceleration of the movement of the wand.

If, at step 4708, the media system instead determines that the wand directed the cursor to move beyond the top edge of the screen, process 4700 may move to step 4712. At step 4712, the media system may page up the display of the screen. For example, electronic device 104 may page up the display of screen 102, for example at a rate that is related to the distance off the screen that the wand is pointing, or at a rate that is related to the amplitude, speed or acceleration of the movement of the wand.

If, at step 4706, the media system instead determines that the wand did not direct the cursor to move to the top portion of the screen, process 4700 may move to step 4714. At step 4714, the media system may determine whether the wand directed the cursor to move to the bottom portion of the screen. For example, electronic device 104 may determine, based on the position and/or orientation information received from wand 106 at step 4704, whether wand 106 directed the cursor to move to the bottom portion of the screen. If the media system determines that the wand directed the cursor to move to the bottom portion of the screen, process 4700 may move to step 4716.

At step 4716, the media system may determine whether the wand directed the cursor to move beyond the bottom edge of the screen. For example, electronic device 104 may determine, based on the position and orientation information received from wand 106 at step 4704, whether wand 106 directed the cursor to move beyond the bottom edge of the screen. If the media system determines that the wand did not directed the cursor to move beyond the bottom edge of the screen, process 4700 may move to step 4718. At step 4718, the media system may scroll down the display of the screen. For example, electronic device 104 may scroll down the display of screen 102, for example at a rate that is related to the distance from the center of the screen to the cursor corresponding to the position of the wand, or at a rate that is related to the amplitude, speed or acceleration of the movement of the wand.

If, at step 4716, the media system instead determines that the wand directed the cursor to move beyond the bottom edge of the screen, process 4700 may move to step 4720. At step 4720, the media system may page down the display of the screen. For example, electronic device 104 may page down the display of screen 102, for example at a rate that is related to the distance off the screen that the wand is pointing, or at a rate that is related to the amplitude, speed or acceleration of the movement of the wand.

If, at step 4714, the media system instead determines that the wand did not direct the cursor to move to the bottom portion of the screen, process 4700 may move to step 4722. At step 4722, the media system may determine whether the wand directed the cursor to move to the left portion of the screen. For example, electronic device 104 may determine, based on the position and orientation information received from wand 106 at step 4704, whether wand 106 directed the cursor to move to the left portion of the screen. If the media system determines that the wand directed the cursor to move to the left portion of the screen, process 4700 may move to step 4724.

At step 4724, the media system may determine whether the wand directed the cursor to move beyond the left edge of the screen. For example, electronic device 104 may determine, based on the position and/or orientation information received from wand 106 at step 4704, whether wand 106 directed the cursor to move beyond the left edge of the screen. If the media system determines that the wand did not direct the cursor to move beyond the left edge of the screen, process 4700 may move to step 4726. At step 4726, the media system may scroll left the display of the screen. For example, electronic device 104 may scroll left the display of screen 102, for example at a rate that is related to the distance from the center of the screen to the cursor corresponding to the position of the wand, or at a rate that is related to the amplitude, speed or acceleration of the movement of the wand.

If, at step 4724, the media system instead determines that the wand directed the cursor to move to the left edge of the screen, process 4700 may move to step 4728. At step 4728, the media system may page left the display of the screen. For example, electronic device 104 may page left the display of screen 102, for example at a rate that is related to the distance off the screen that the wand is pointing, or at a rate that is related to the amplitude, speed or acceleration of the movement of the wand.

If, at step 4722, the media system instead determines that the wand did not direct the cursor to move to the left portion of the screen, process 4700 may move to step 4730. At step 4730, the media system may determine whether the wand directed the cursor to move to the right portion of the screen. For example, electronic device 104 may determine, based on the position and/or orientation information received from wand 106 at step 4704, whether wand 106 directed the cursor to move to the right portion of the screen. If the media system determines that the wand directed the cursor to move to the right portion of the screen, process 4700 may move to step 4732.

At step 4732, the media system may determine whether the wand directed the cursor to move beyond the right edge of the screen. For example, electronic device 104 may determine, based on the position and/or orientation information received from wand 106 at step 4704, whether wand 106 directed the cursor to move beyond the right edge of the screen. If the media system determines that the wand did not direct the cursor to move beyond the right edge of the screen, process 4700 may move to step 4734. At step 4734, the media system may scroll right the display of the screen. For example, electronic device 104 may scroll right the display of screen 102, for example at a rate that is related to the distance from the center of the screen to the cursor corresponding to the position of the wand, or at a rate that is related to the amplitude, speed or acceleration of the movement of the wand.

If, at step 4732, the media system instead determines that the wand directed the cursor to move beyond the right edge of the screen, process 4700 may move to step 4736. At step 4736, the media system may page right the display of the screen. For example, electronic device 104 may page right the display of screen 102, for example at a rate that is related to the distance beyond the screen that the wand is pointing, or at a rate that is related to the amplitude, speed or acceleration of the movement of the wand.

If, at step 4730, the media system instead determines that the wand directed the cursor to move to the right portion of the screen, process 4700 may move to step 4738 and ends.

Figure 48:
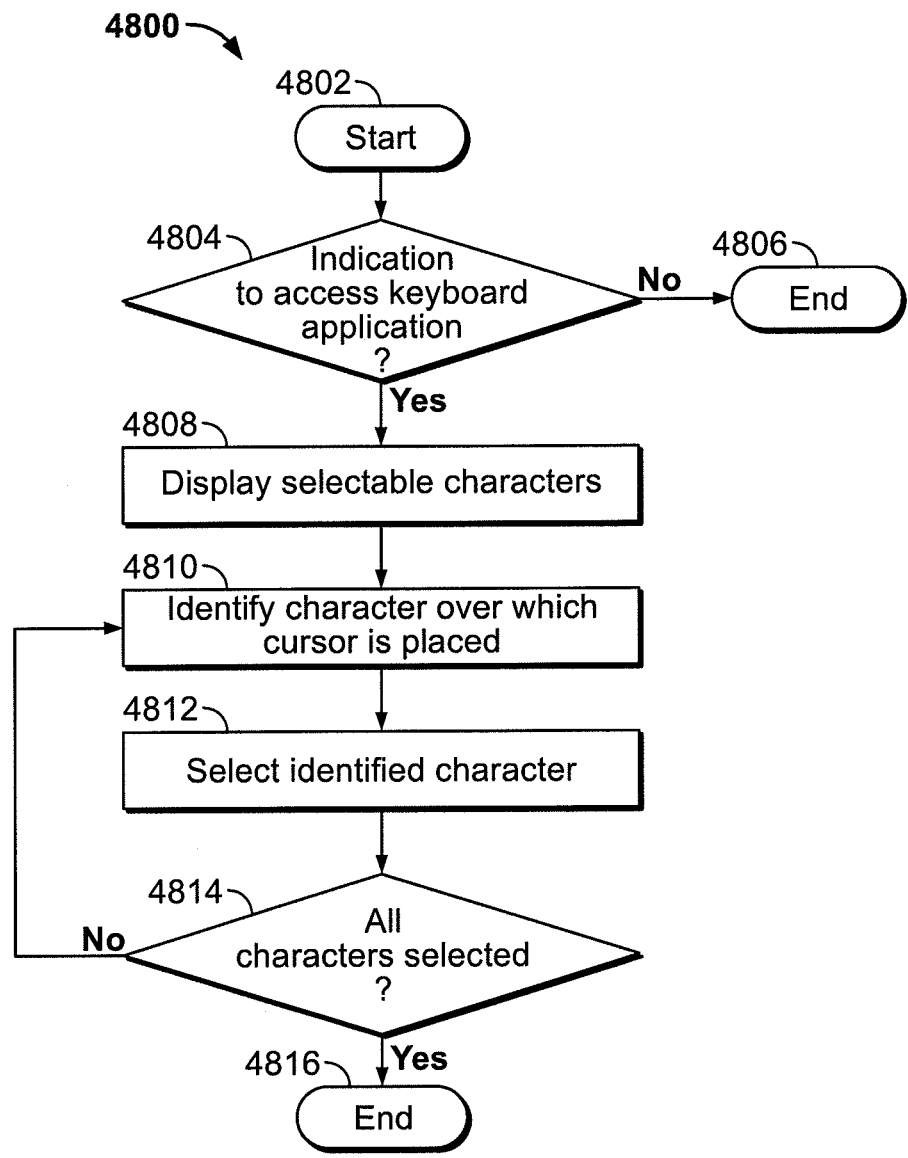
FIG. 48 is a flowchart of an illustrative process for selecting characters with a keyboard application in accordance with one embodiment of the invention.

FIG. 48 is a flowchart of an illustrative process for selecting characters with a keyboard application in accordance with one embodiment of the invention. Process 4800 begins at step 4802. At step 4804, the media system may determine whether the an indication to access the keyboard application has been provided. For example, electronic device 104 (FIG. 1) may determine whether the user provided an indication with wand 106 (FIG. 1) to access the keyboard application (e.g., providing an input with input mechanism 208, FIG. 2, or holding or moving wand 106 in a particular manner). As another example, electronic device 104 may automatically request the keyboard application in response to an indication to access one or more electronic device functions (e.g., request the keyboard application for a user to login, or to purchase content).

If the media system determines that no indication to access the keyboard application has been provided, process 4800 may move to step 4806 and end. If, at step 4804, the media system instead determines that an indication to access the keyboard application has been provided, process 4800 may move to step 4808. At step 4808, the media system may display selectable characters. For example, electronic device 104 may display a virtual keyboard that may include a plurality of selectable characters on screen 102 (FIG. 1). Electronic device 104 may display the characters in any suitable order, and in any suitable structure (e.g., different characters may be provided in different displays, for example in response to a SHIFT key).

At step 4810, the media system may identify the character over which a cursor is placed. For example, the media system may identify the character over which a cursor controlled by wand 106 is placed. In some embodiments, the cursor may be displayed on the portion of the screen to which wand 106 points. Wand 106 may determine its position and orientation relative to screen 102 by determining its position and orientation relative to IR modules 120 and 122 (FIG. 1). In some embodiments, wand 106 may determine its orientation using motion detection component 208 (FIG. 2). Wand 106 may be operative to transmit its position and orientation information to electronic device 104 for electronic device 104. Using the position and orientation information received from wand 106, electronic device 104 may determine the portion of the screen to which wand 106 points, and thus the position of the cursor.

In some embodiments, electronic device 104 may receive an indication from wand 106 of movement of the wand (e.g., movement identified by motion detection component 208). Electronic device 104 may move the cursor based on the received indications of movement of wand 106, independent of the actual orientation of wand 106 (i.e., independent of where wand 106 actually points).

At step 4812, the media system may receive a selection of the identified character. For example, electronic device 104 may receive a user selection on an input mechanism (e.g., pressing a button), or may identify a user selection from a particular movement of wand 106 (e.g., flicking wand 106, rotating wand 106 in a particular manner, or moving wand 106 a particular distance off screen 102).

At step 4814, the media system may determine whether all of the characters have been selected. For example, electronic device 104 may determine whether the user has selected an on-screen SUBMIT or SELECT option, or whether the user has otherwise indicated that all of the characters have been selected (e.g., a selection on an input mechanism, or a particular movement of wand 106). As another example, electronic device 104 may determine whether the user has selected the proper number of characters (e.g., the user has entered the four numbers for a four-digit pin). If the media system determines that all of the characters have not been selected, process 4800 may return to step 4810, and identify the next character to which the wand is pointing.

If, at step 4814, the media system instead determines that all characters have been selected, process 4800 may move to step 4816 and end.

Figure 49:
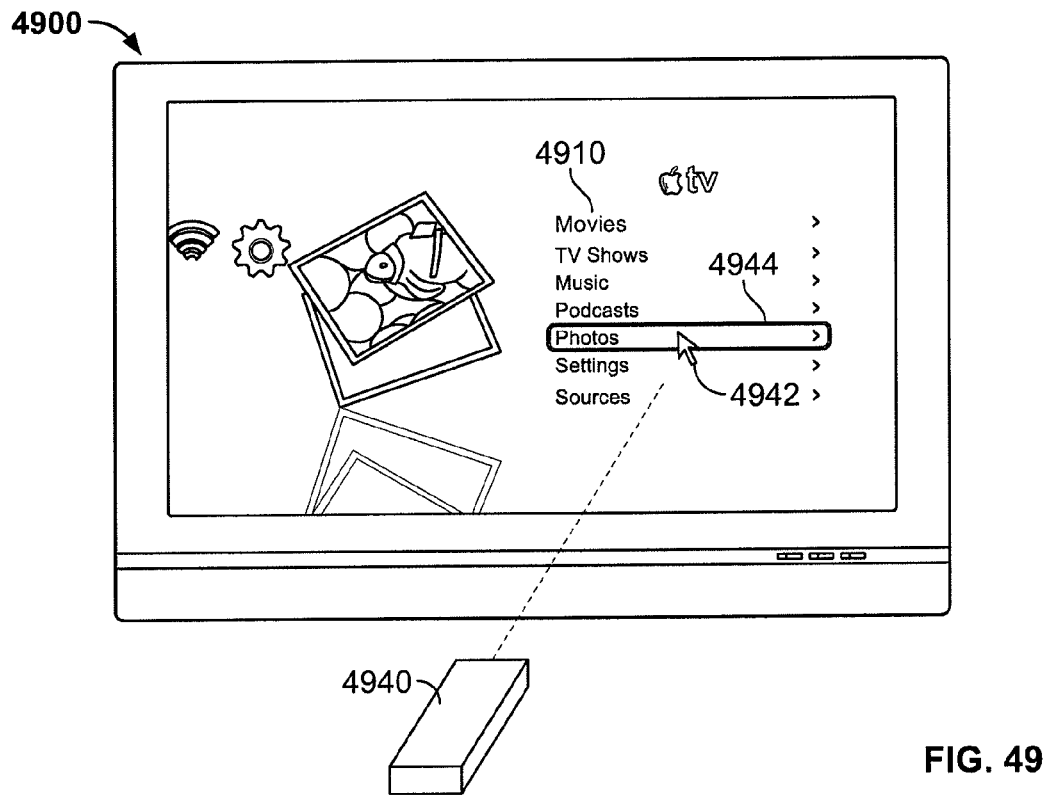
FIG. 49 shows an illustrative display for accessing an image application in accordance with one embodiment of the invention.

In some embodiments, the user may access photographs or other images using an image application. FIG. 49 shows an illustrative display for accessing an image application in accordance with one embodiment of the invention. Display screen 4900 may include options 4910 for accessing functions of the media system. Options 4910 may include, for example, options to access media system applications (e.g., a video application, a music application, or an image application), media system settings, and set-up options (e.g., to set-up sources for content).

The user may select an option 4910 by placing cursor 4942 over the option with wand 4940 and providing an indication for selecting the option. For example, the user may provide any suitable input with wand 4940 (e.g., provide an input using input mechanism 208, FIG. 2) or move wand 4940 in a particular manner (e.g., flick wand 4940, move wand 4940 in a circular manner, or point wand 4940 at a particular portion of screen 4900) to provide a selection instruction. The media system may indicate that an option 4910 has been selected by placing highlight region 4944 over the selected option. In some embodiments, the user may control the position of highlight region 4944 instead of or in addition to controlling cursor 4942.

Figure 50:
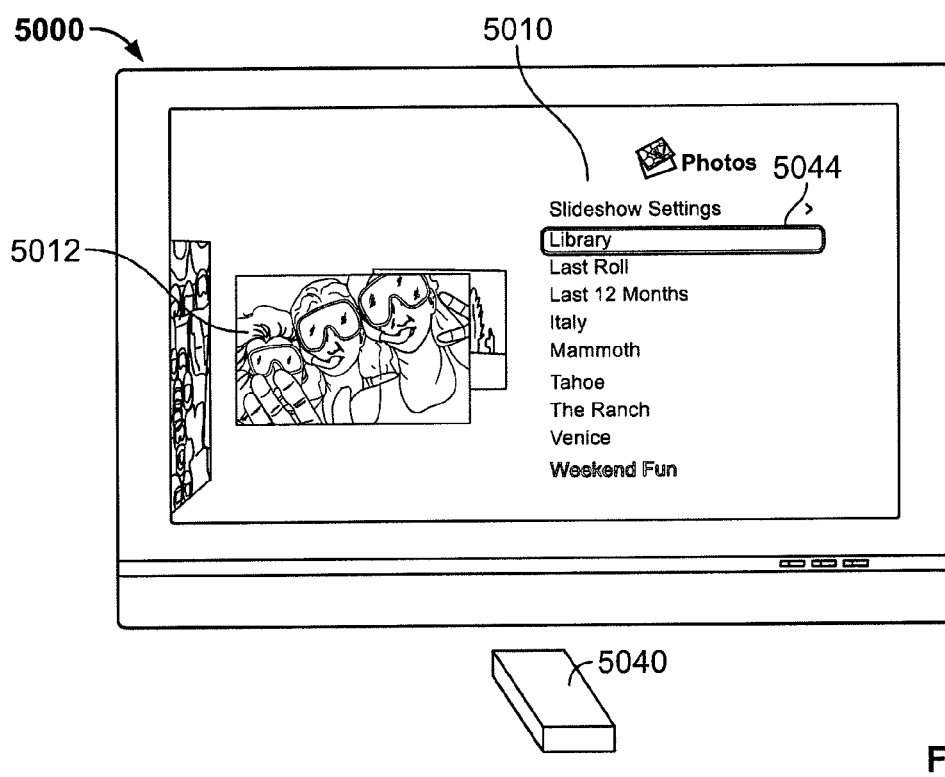
FIG. 50 is an illustrative display screen of an image application in accordance with one embodiment of the invention.

FIG. 50 is an illustrative display screen of an image application in accordance with one embodiment of the invention. Display 5000 may include album options 5010 and images 5012. Album options 5010 may include a listing of photo albums created by the user, or available to the media system from one or more host devices (e.g., photo albums stored on a remote computer that is coupled to the media system).

Images 5012 may include preview images associated with each of the album options 5010. The media system may automatically change the displayed image 5012 to correspond to the album option 5010 that is currently highlighted by highlight region 5044, or the media system may only change the displayed image 5012 in response to a user instruction while highlight region 5044 is over an album option 5010 (e.g., only change the displayed image 5012 when the user provides a PREVIEW instruction with wand 5040).

Figure 51:
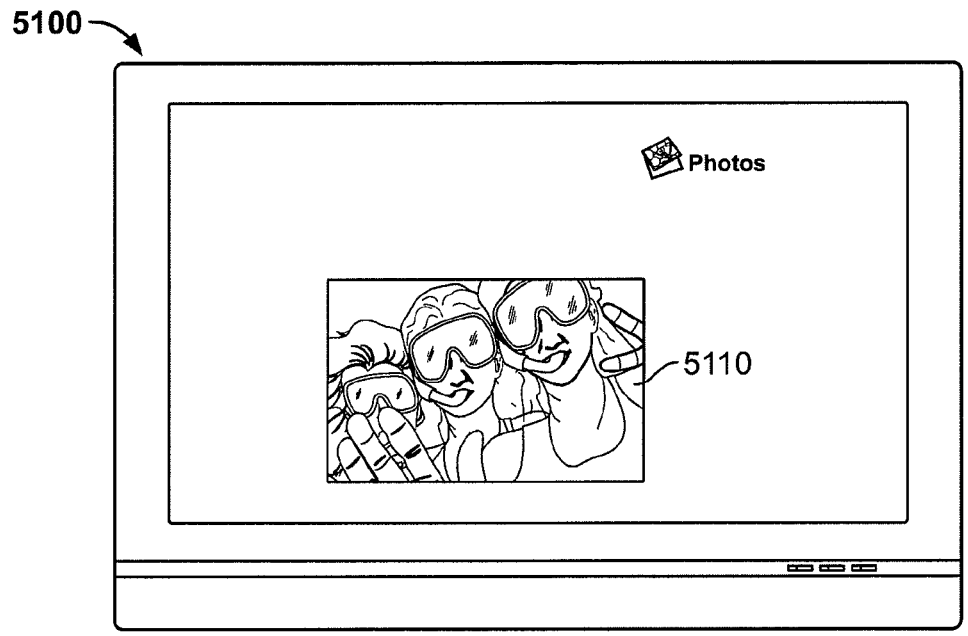
FIGS. 51 and 52 are illustrative display screens of an image application in which an image may be zoomed in accordance with one embodiment of the invention.
Figure 51:
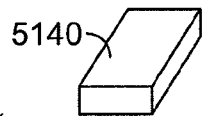
Figure 52:
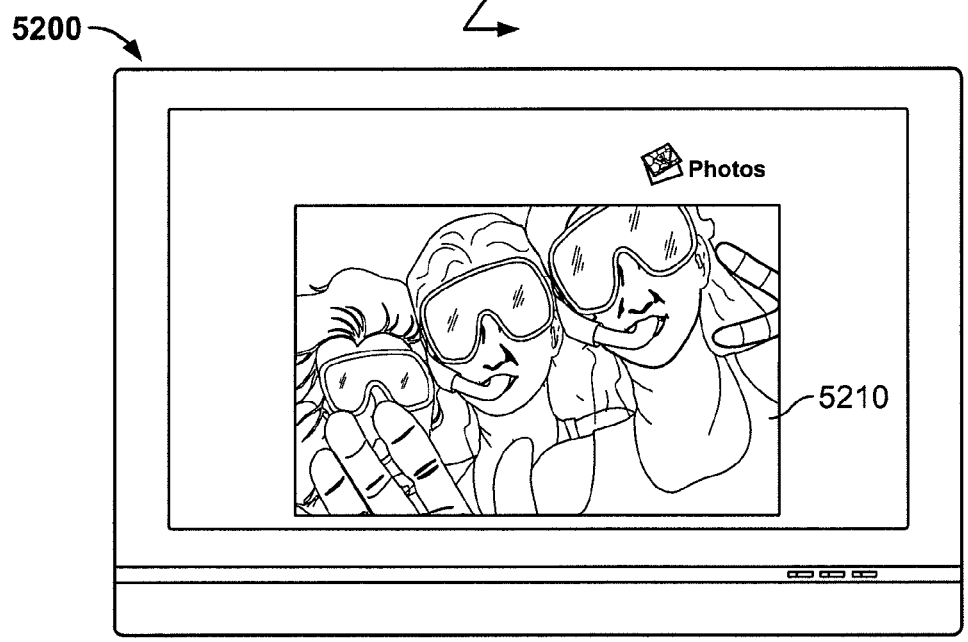
Figure 52:
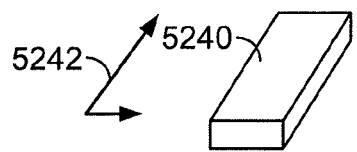

FIGS. 51 and 52 are illustrative display screens of an image application in which an image may be zoomed in accordance with one embodiment of the invention. Display 5100 may include image 5110, which may be an image from a selected album (e.g., an album selected using an album option 5010, FIG. 50). Display screen 5200 may include image 5210, which may be an image from a selected album (e.g., selected using an album option 5010). As described above in connection with FIGS. 14-17, the user may zoom images 5110 and 5210 in or out, as shown by the relative size of images 5110 and 5210, and by the positions of wands 5140 and 5240 relative to origins 5142 and 5242, respectively. In some embodiments, origins 5142 and 5242 may be the same origins. In some embodiments, the user may control the zooming of images 5110 and 5210 using an input mechanism operative to provide instructions in the z-axis (e.g., a scroll wheel or touch pad for the z-axis).

Figure 53:
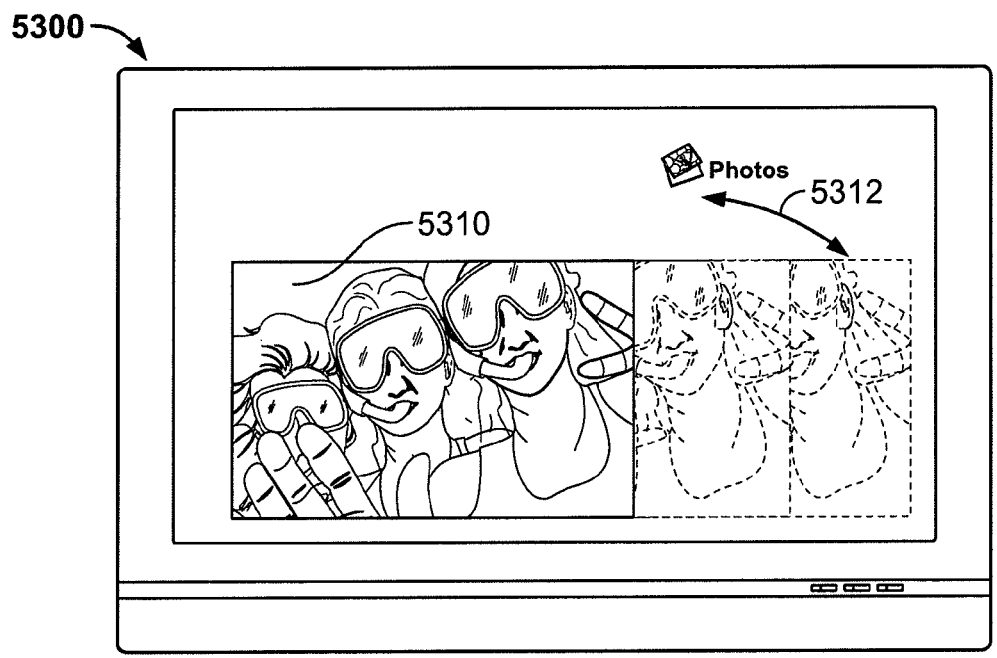
FIG. 53 is an illustrative display screen in which a user may move an image in an image application in accordance with one embodiment of the invention.

FIG. 53 is an illustrative display screen in which a user may move an image in an image application in accordance with one embodiment of the invention. Display screen 5300 may include image 5310, which the user may move in display screen 5300 in any suitable manner. For example, the user may select image 5310 using wand 5340, and drag image 5310 by moving wand 5340.

The user may select image 5310 in any suitable manner. For example, the user may provide a SELECT input with wand 5340 (e.g., provide an input using input mechanism 208, FIG. 2) or move wand 5340 in a particular manner (e.g., flick wand 5340, move wand 5340 in a circular manner, or point wand 5340 at a particular portion of screen 5300) to select image 5310. If a plurality of images are displayed on screen 5300, the user may select a particular image by placing a cursor over the particular image and providing a SELECT instruction. In some embodiments, the media system may indicate that an image has been selected by placing a cursor over the image, or by placing a highlight region over the image.

To move selected image 5310, the user may move wand 5340 such that image 5310 follows the movements of wand 5340 (e.g., relative to origin 5342). For example, if the user moves wand along line 5344, as shown by consecutive wands 5340a, 5430b and 5430c, image 5310 may move along line 5312, which may be co-linear with or proportional to line 5344.

Figure 54:
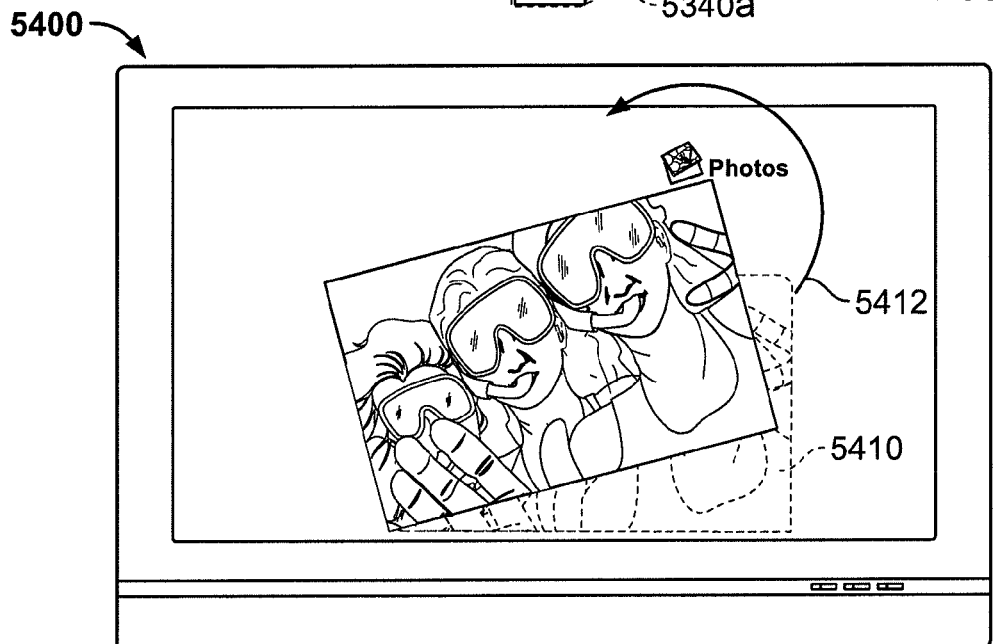
FIG. 54 is an illustrative display screen in which a user may rotate an image in an image application in accordance with one embodiment of the invention.

FIG. 54 is an illustrative display screen in which a user may rotate an image in an image application in accordance with one embodiment of the invention. Display screen 5400 may include image 5410, which the user may rotate on display screen 5400 in any suitable manner. For example, the user may select image 5410 using wand 5440, and rotate image 5410 by moving wand 5440.

The user may select image 5410 in any suitable manner. For example, the user may provide a SELECT input with wand 5440 (e.g., provide an input using input mechanism 208, FIG. 2) or move wand 5440 in a particular manner (e.g., flick wand 5440, move wand 5440 in a circular manner, or point wand 5440 at a particular portion of screen 5400) to select image 5410. If a plurality of images are displayed on screen 5400, the user may select a particular image by placing a cursor over the particular image and providing a SELECT instruction. In some embodiments, the media system may indicate that an image has been selected by placing a cursor over the image, or by placing a highlight region over the image.

To rotate selected image 5410, the user may move wand 5440 such that image 5410 follows the movements of wand 5440 (e.g., relative to origin 5442). For example, if the user rotates wand along line 5444, as shown by consecutive wands 5440a and 5440b, image 5410 may rotate as shown by line 5412, which may be co-linear with or proportional to line 5444.

Figure 55:
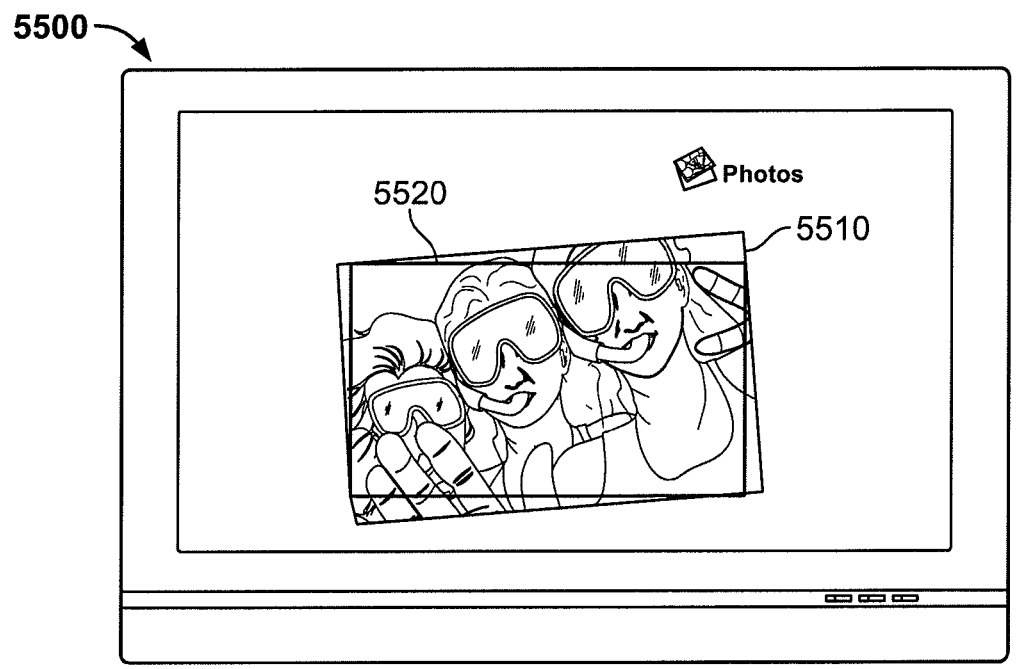
FIGS. 55 and 56 are illustrative display screens for cropping an image with an image application in accordance with one embodiment of the invention.
Figure 56:
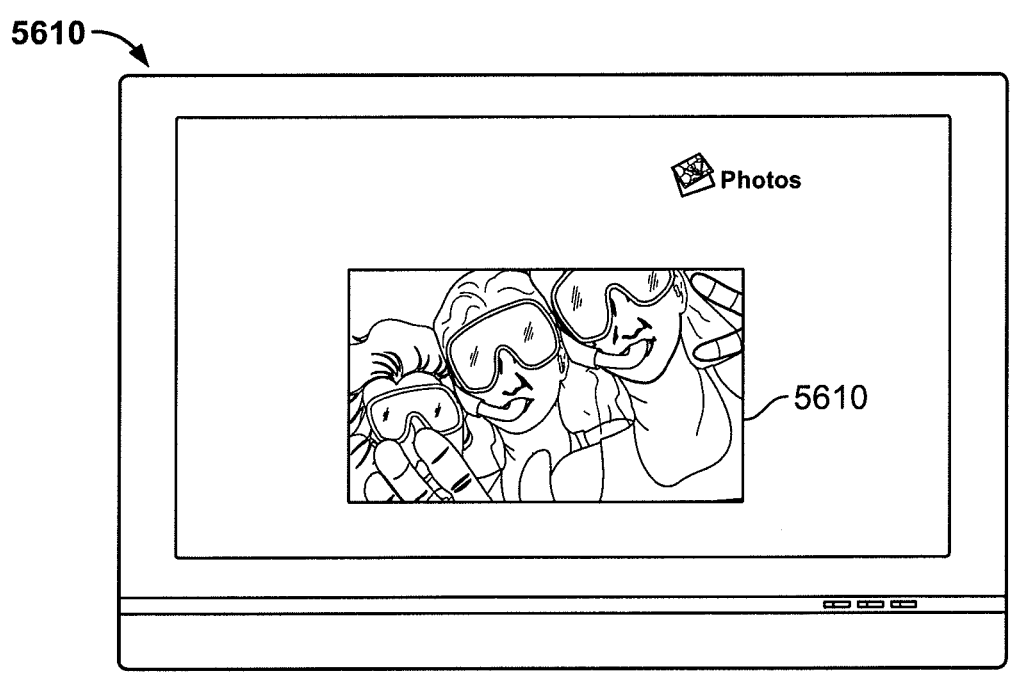

FIGS. 55 and 56 are illustrative display screens for cropping an image with an image application in accordance with one embodiment of the invention. Display screen 5500 may include image 5510 (e.g., a rotated image). The user may access crop options in any suitable manner. For example, the user may provide an indication to access crop options using an input mechanism of wand 5540 (e.g., provide an input using input mechanism 208, FIG. 2), selecting an on-screen CROP OPTIONS option, or moving wand 5540 in a particular manner to access the crop options (e.g., flick wand 5540, move wand 5540 in a circular manner, or point wand 5540 at a particular portion of screen 5500).

In response receiving the user indication to access crop options, the media application may display crop window 5520 on screen 5500. Crop window 5520 may be any suitable shape (e.g., rectangular, circular, polygonal, or irregular). The user may move or resize crop window 5520 in any suitable manner, including for example by selecting crop window 5520 or a portion of crop window 5520 (e.g., the right edge of crop window 5520) with wand 5540 and moving wand 5540.

Display screen 5600 may include cropped image 5610. Cropped image may correspond to the portions of image 5510 that were within crop window 5520 (FIG. 55). The user may direct the media system to create cropped image 5610 from an original image and a crop window in any suitable manner. For example, the user may provide an input on wand 5640 (e.g., pressing a suitable key or key sequence on input mechanism 208, FIG. 2, or selecting an on-screen CROP option) directing the media system to remove the portions of the original image that are outside the crop window. As another example, the user may move wand 5640 in a particular manner (e.g., flick wand 5640, move wand 5640 in a circular manner, or point wand 5640 at a particular portion of screen 5600) to direct the system to crop the original picture.

Figure 57:
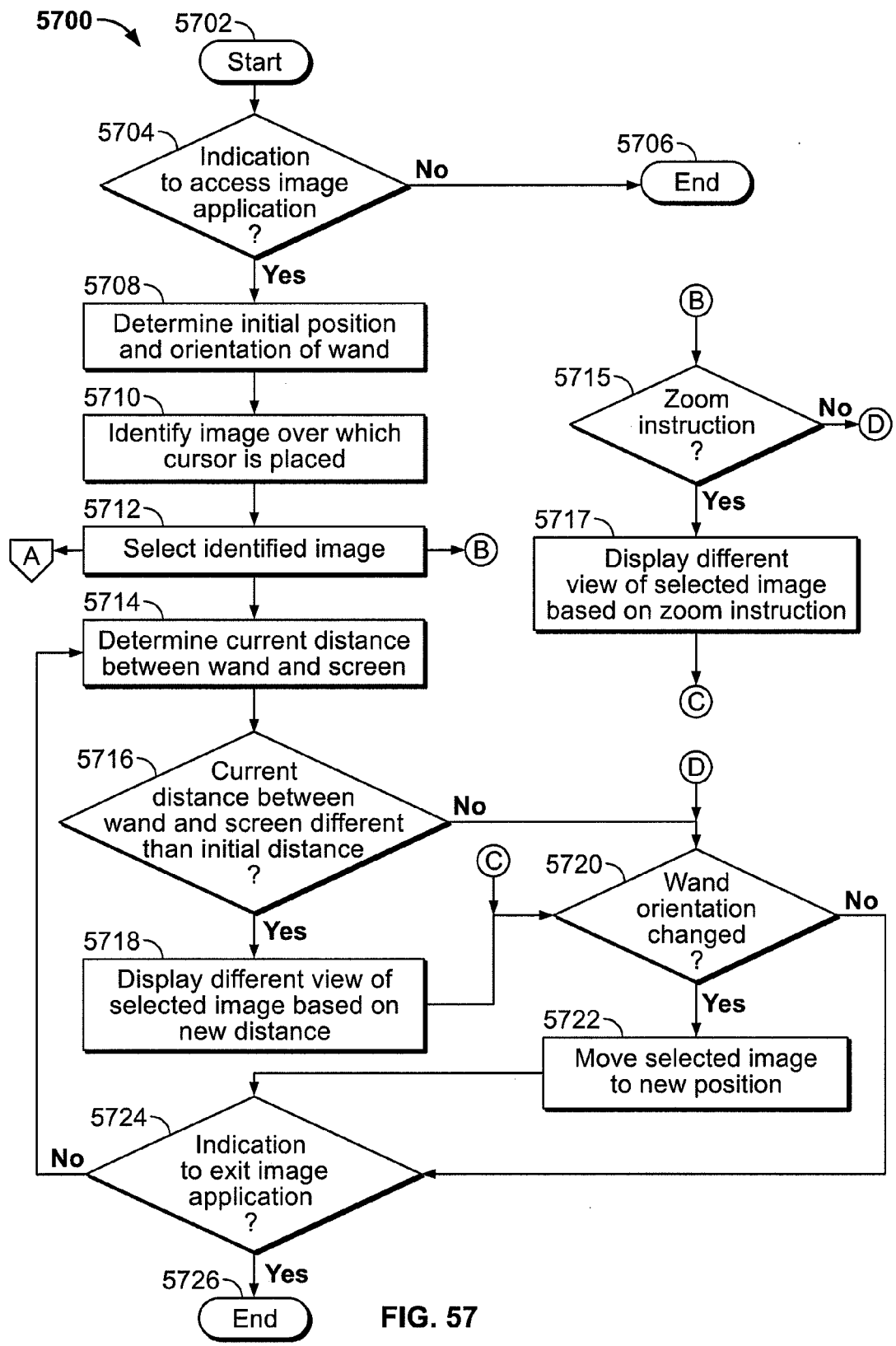
FIG. 57 is a flowchart of an illustrative process for displaying different views of images in an image application in accordance with one embodiment of the invention.

FIG. 57 is a flowchart of an illustrative process for displaying different views of images in an image application in accordance with one embodiment of the invention. Process 5700 begins at step 5702. At step 5704, the media system determines whether the user has provided an indication to access the image application. For example, electronic device 104 (FIG. 1) may determine whether the user has provided an indication to access the image application with wand 106 (FIG. 1). The user may provide an indication in any suitable manner, including for example, providing an input on wand 106 (e.g., pressing a suitable key or key sequence on input mechanism 208, FIG. 2), or moving wand 106 in a particular manner (e.g., flicking wand 106 or moving wand 106 in a circular manner). If the media system determines that the user has not provided an indication to access the image application, process 5700 may move to step 5706 and end.

If, at step 5704, the media system instead determines that the user has provided an indication to access the image application, process 5700 may move to step 5708. At step 5708, the media system may determine the initial position and orientation of the wand with respect to the screen. For example, wand 106 may detect its position and orientation relative to IR modules 120 and 122 (FIG. 1). In some embodiments, wand 106 may instead or in addition use information received from motion detection component 206 (FIG. 2) to determine the orientation of wand 106. Wand 106 may transmit the determined position and orientation information to electronic device 104 using any suitable approach. Electronic device 104 may determine the portion of screen 102 (FIG. 1) to which wand 106 points using the determined position and orientation information. In some embodiments, electronic device 104 and wand 106 may also determine the current distance between wand 106 and screen 102, the portion of screen 102 to which wand 106 points, and the current amount of roll of wand 106 from the determined position and orientation information. In some embodiments, wand 106 may only determine its initial orientation, or process 5700 may skip step 5708.

At step 5710, the media system may identify the image over which the cursor is placed. In some embodiments, the cursor may be displayed on the portion of the screen to which wand 106 points. Electronic device 104 may then determine the portion of screen 102 to which wand 106 points, and then identify the image displayed on the determined portion of screen 102.

In some embodiments, electronic device 104 may receive an indication from wand 106 of movement of the wand (e.g., movement identified by motion detection component 208). Electronic device 104 may move the cursor based on the received indications of movement of wand 106, independent of the actual orientation of wand 106 (i.e., independent of where wand 106 actually points). After determining how to move the cursor, electronic device 104 may then determine the image to which the cursor points.

At step 5712, the media system may select the identified image. For example, electronic device 104 may automatically select an image when a user points to it (e.g., select as soon as the user points, or select in response to remaining pointed at an image for a given amount of time). As another example, the user may provide an instruction to select the image (e.g., by providing an input with input mechanism 208, or by moving wand 106 in a particular manner).

At step 5714, the media system may determine the current position and orientation of the wand. For example, wand 106 may determine its current position and orientation in the manner described above in connection with step 5708. In some embodiments, electronic device 104 and wand 106 may also determine the current distance between wand 106 and screen 102, and the portion of screen 102 to which wand 106 points from the determined current position and orientation information.

At step 5716, the media system may determine whether the current distance between the wand and the screen determined at step 5714 is different from the initial distance determined at step 5708. For example, electronic device 104 may compare the distances between wand 106 and screen 102 calculated at steps 5708 and 5714. If the media system determines that the current distance between the wand and the screen is different from the initial distance, process 5700 may move to step 5718.

At step 5718, the media system may display a different view of the selected image based on the new determined distance between the wand and the screen. For example, if electronic device 104 determines that the current distance between wand 106 and screen 102 is smaller than the initial distance, electronic device 104 may zoom in the display of the selected image. Conversely, if electronic device 104 determines that the current distance between wand 106 and screen 102 is larger than the initial distance, electronic device 104 may zoom out the display of the selected image. In some embodiments, electronic device 104 may zoom the display of the selected image based on the rate at which the distance between wand 106 and screen 102 changes. Process 5700 may then move to step 5720.

In some embodiments, steps 5714, 5716 and 5718 may be replaced by steps 5715 and 5717. At step 5715, the media system may determine whether the user has provided a zoom instruction. For example, wand 106 may determine whether a user has provided an input in the z-direction (e.g., with input mechanism 208). If the media system determines that the user has provided an input to zoom, process 5700 may move to step 5717. At step 5717, the media system may display a different view of the selected image based on the zoom instruction. For example, if electronic device 104 determines wand 106 has transmitted a zoom in instruction, electronic device 104 may zoom in the display of the selected image. Conversely, if electronic device 104 determines wand 106 has transmitted a zoom out instruction, electronic device 104 may zoom out the display of the selected image. Process 5700 may then move to step 5720.

If, at step 5715, the media system instead determines that the user has not provided an instruction to zoom, process 5700 may move to step 5720, described below.

Process 5700 may reach step 5720 in two different manners. First, after step 5718 (or alternately 5717), process 5700 may move to step 5720. Second, if at step 5716 (or alternately step 5715), the media system instead determines that the current distance between the wand and the screen is the same as the initial distance, process 5700 may move to step 5720. At step 5720, the media system may determine whether the wand orientation has changed. For example, electronic device 104 may determine, based on the position and orientation information determined at step 5714, whether wand 106 is pointing to the same portion of screen 102 as it was at step 5706. As another example, wand 106 may determine, from motion information received from motion detection component 208, whether wand 106 has moved and whether its orientation has changed. If the media system determines that the wand's orientation has changed, process 5700 may move to step 5722.

At step 5722, the media system may move the image selected at step 5712 based on the new orientation of the wand. For example, electronic device 104 may displace the selected image to the current portion of screen 102 to which wand 106 points. As another example, electronic device 104 may displace the selected image based on the amount or rate by which wand 106 was moved. Electronic device 104 may move the selected image in any suitable manner. For example, electronic device 104 may automatically move the selected image as the user moves wand 106. As another example, electronic device 104 may only move the selected image when the user provides an instruction to move the selected image (e.g., provides an input with input mechanism 208, FIG. 2, or moves wand in a particular manner) and moves wand 106. Process 5700 may then move to step 5724.

Process 5700 may reach step 5724 in two different manners. First, after step 5722, process 5700 may move to step 5724. Second, if at step 5720, the media system instead determines that the wand is pointing to the same portion of the screen, process 5700 may move to step 5724. At step 5724, the media system may determine whether the user has provided an indication to exit the image application. For example, electronic device 104 may determine whether the user has provided an indication (e.g., using input mechanism 208 or by moving wand 106 in a specific manner) to exit the image application. If the media system determines that the user has provided an indication to exit the image application, process 5700 may move to step 5726 and end.

If, at step 5724, the media system instead determines that the user has not provided an indication to exit the image application, process 5700 may move back to step 5714, and the media system may determine the current position and orientation of the wand. The current position and orientation previously determined at step 5714 may become the initial position and orientation for the subsequent loop in steps 5716-5724 of process 5700.

Figure 58:
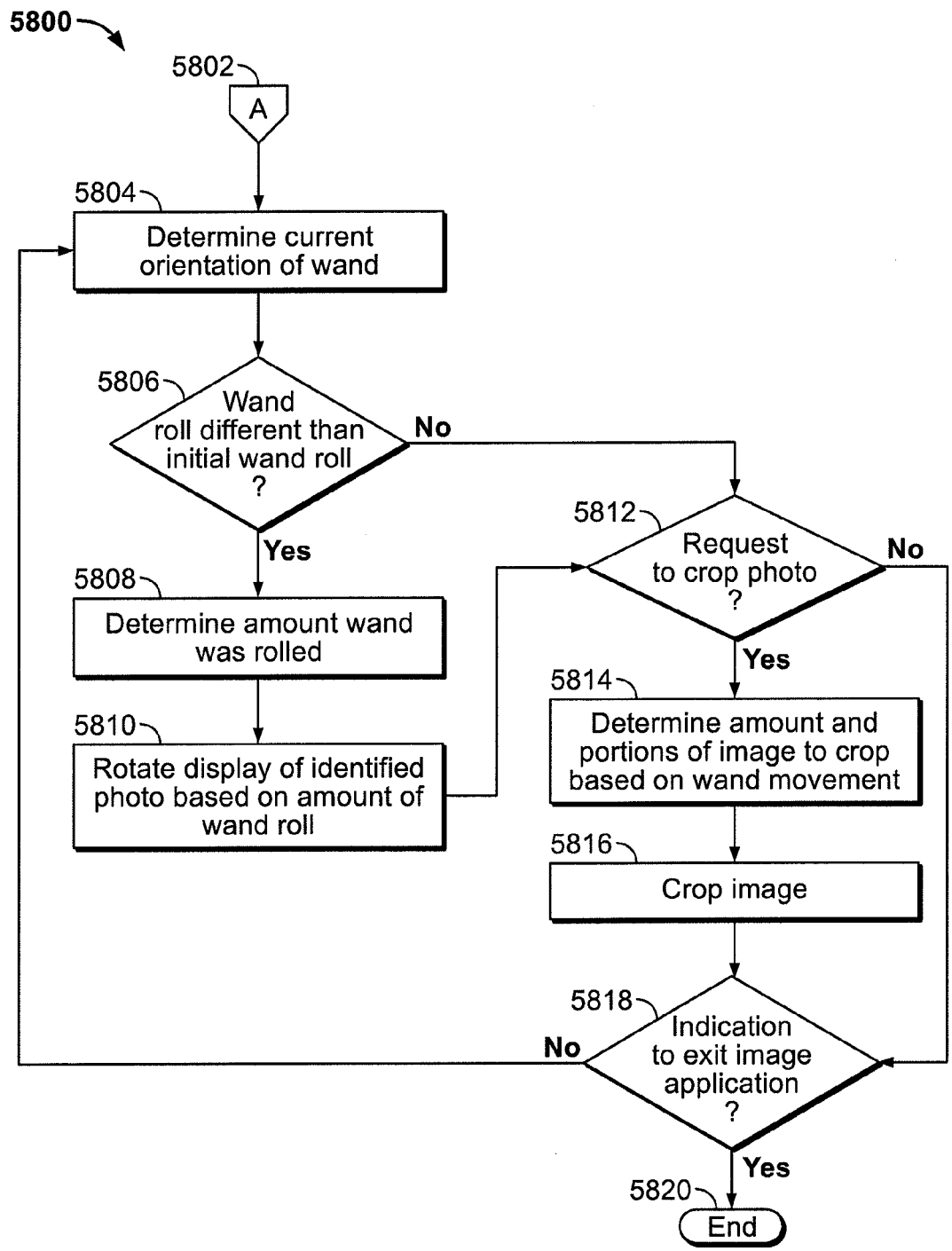
FIG. 58 is a flowchart of an illustrative process for rolling and cropping an image with an image application in accordance with one embodiment of the invention.

FIG. 58 is a flowchart of an illustrative process for rolling and cropping an image with an image application in accordance with one embodiment of the invention. Process 5800 begins at step 5802, which may correspond to step 5712 of process 5700 (FIG. 57). At step 5804, the media system may determine the current orientation of the wand. For example, wand 106 (FIG. 1) may instead or in addition use information received from motion detection component 206 (FIG. 2) to determine the orientation of wand 106. As another example, wand 106 may instead or in addition detect its orientation relative to IR modules 120 and 122 (FIG. 1). Wand 106 may transmit the determined orientation information to electronic device 104 (FIG. 1) using any suitable approach. In some embodiments, electronic device 104 and wand 106 may also determine the current roll of wand 106 from the determined orientation information.

At step 5806, the media system may determine whether the current roll of the wand is different than the initial roll of the wand. For example, electronic device 104 may determine whether the initial roll of wand 106 (e.g., determined from the initial wand position and orientation at step 5708 of process 5700, FIG. 57) is different than the current roll of wand 106 determined at step 5804. If the media system determines that the current roll of the wand is different than the initial roll of the wand, process 5800 may move to step 5808.

At step 5808, the media system may determine the amount that the wand was rolled. For example, electronic device 104 may compare the amounts of the initial and current roll of wand 106, and determine the different between the amounts. At step 5810, the media system may rotate the image previously selected (e.g., selected at step 5712 of process 5700, FIG. 57) by an amount related to the amount of roll determined at step 5808. Electronic device 104 may rotate the selected image in any suitable manner. For example, electronic device 104 may automatically rotate the selected image as the user rolls wand 106. As another example, electronic device 104 may only rotate the selected image when the user provides an instruction to rotate the selected image (e.g., provides an input with input mechanism 208, FIG. 2, or moves wand in a particular manner) and rolls wand 106. Process 5800 may then move to step 5812.

Process 5800 may reach step 5812 in two different manners. First, after step 5810, process 5800 may move to step 5812. Second, if at step 5806, the media system instead determines that the determines that the current roll of the wand is the same as the initial roll of the wand, process 5800 may move to step 5812. At step 5812, the media system may determine whether the user has provided an instruction to crop an image. For example, electronic device 104 may determine whether the user has provided an indication (e.g., using input mechanism 208 or by moving wand 106 in a specific manner) to access crop options. If the media system determines that the user has provided an indication to access crop options, process 5800 may move to step 5814.

At step 5814, the media system may determine the amount and portions of the selected image to crop based on the user's wand movements. For example, electronic device 104 may display a crop window that the user may manipulate using wand 106. In particular, the user may displace the crop window by selecting the crop window and moving wand 106. The user may also change the shape of the crop window by selecting a side or element of the crop window, and moving wand 106.

At step 5816, the media system may crop the selected image based on the crop window controlled at step 5814. For example, electronic device 104 may remove the portions of the selected image that lie outside of the boundaries of the crop window manipulated at step 5814. Electronic device 104 may display the remaining portions of the selected image on screen 102. Process 5800 may then move to step 5818.

Process 5800 may reach step 5818 in two different manners. First, after step 5816, process 5800 may move to step 5818. Second, if at step 5812, the media system instead determines that the determines that the user has not provided an instruction to crop an image, process 5800 may move to step 5818. At step 5818, the media system may determine whether the user has provided an indication to exit the image application. For example, electronic device 104 may determine whether the user has provided an indication (e.g., using input mechanism 208 or by moving wand 106 in a specific manner) to exit the image application. If the media system determines that the user has provided an indication to exit the image application, process 5800 may move to step 5820 and ends.

If, at step 5818, the media system instead determines that the user has not provided an indication to exit the image application, process 5800 may move back to step 5804, and the media system may determine the current position and orientation of the wand. The current position and orientation previously determined at step 5804 may become the initial position and orientation for the subsequent loop in steps 5806-5818 of process 5800.

Figure 59:
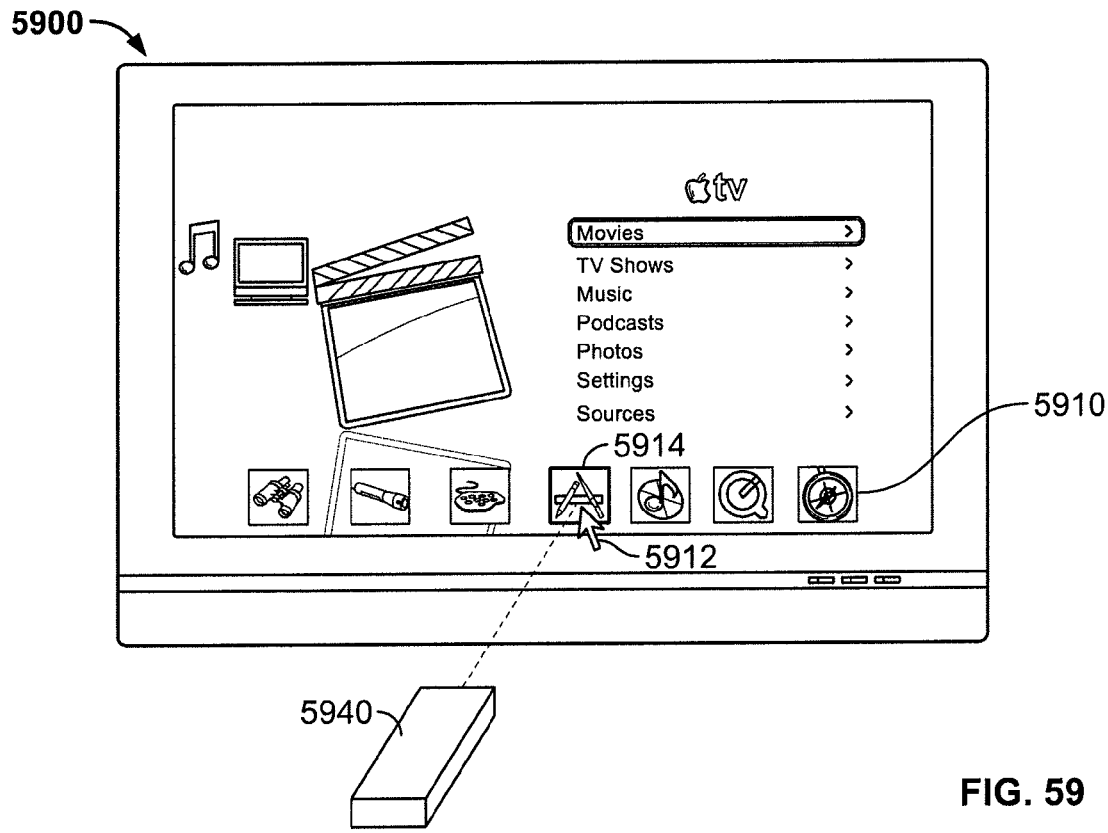
FIG. 59 shows an illustrative display for accessing an illustration application in accordance with one embodiment of the invention.

In some embodiments, the user may draw images or create designs using an illustration application. FIG. 59 shows an illustrative display for accessing an illustration application in accordance with one embodiment of the invention. Display screen 5900 may include selectable options 5910 that the user may select by placing cursor 5912 over a particular option (e.g., by pointing wand 5940 at the particular option). When a user selects an option, the electronic device may display highlight region 5914 to indicate to the user that the option has been selected. The user may select the option in any suitable manner including, for example, providing a selection on an input mechanism (e.g., pressing a button), or moving wand 5940 in a particular manner (e.g., flicking wand 5940, rotating wand 5940 in a particular manner, or moving wand 5940 a particular distance off screen 5900).

Figure 60:
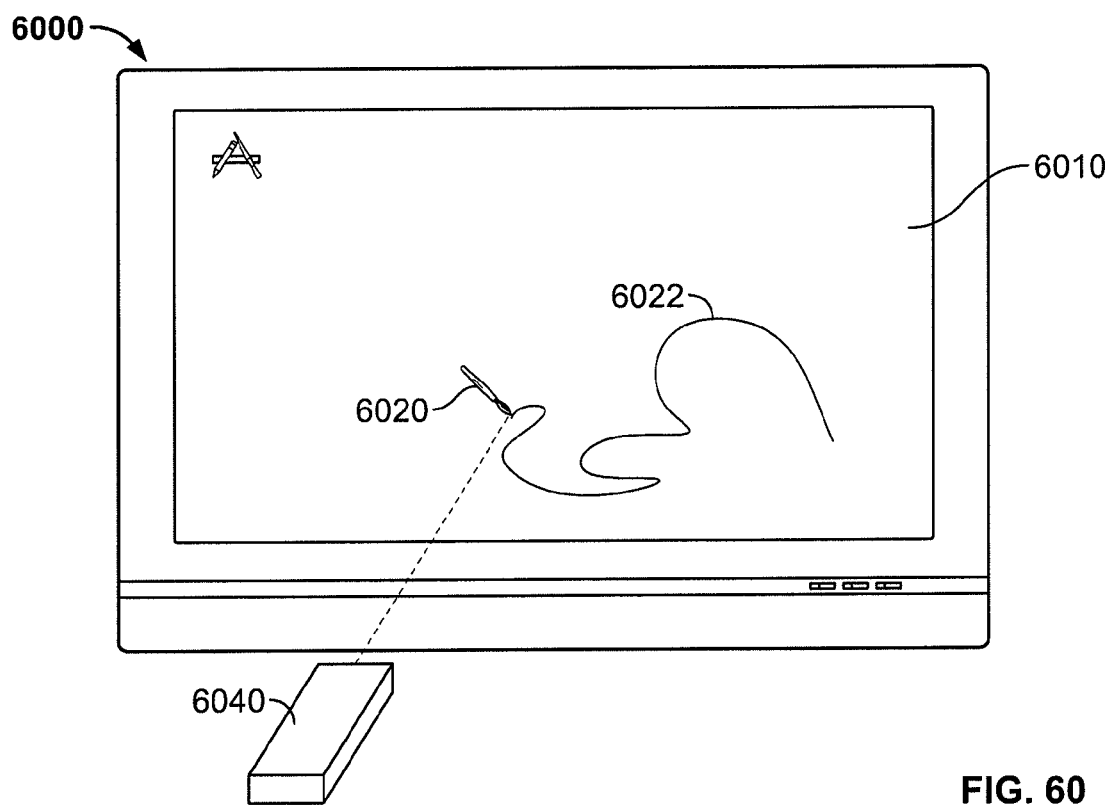
FIG. 60 is an illustrative display screen of an illustration application in accordance with one embodiment of the invention.

FIG. 60 is an illustrative display screen of an illustration application in accordance with one embodiment of the invention. Display screen 6000 may include drawing surface 6010 on which a user may draw or create a design. To draw line 6022, the user may control pen 6020 with wand 6040. Pen 6020 may be operative to follow the movements of wand 6040 such that as the user moves wand 6040, pen 6020 may be successively displayed and draw a line that follows the motion of wand 6040 (e.g., on the portions of drawing surface 6010 to which wand 6040 successively points).

To allow the user to pick up pen 6020, and draw discontinuous lines, pen 6020 may only write when the user provides a suitable instruction. For example, pen 6020 may only draw when the user simultaneously provides an instruction to draw (e.g., provides an input with input mechanism 208, FIG. 2, or moves wand in a particular manner) and moves wand 106. As another example, pen 6020 may only draw once the user has provided an instruction to draw (e.g., provides an input with input mechanism 208, FIG. 2, or moves wand in a particular manner), and ceases drawing once the user provides an instruction to stop drawing (e.g., provides the same or another input with input mechanism 208, FIG. 2, or moves wand in a particular manner).

Figure 61:
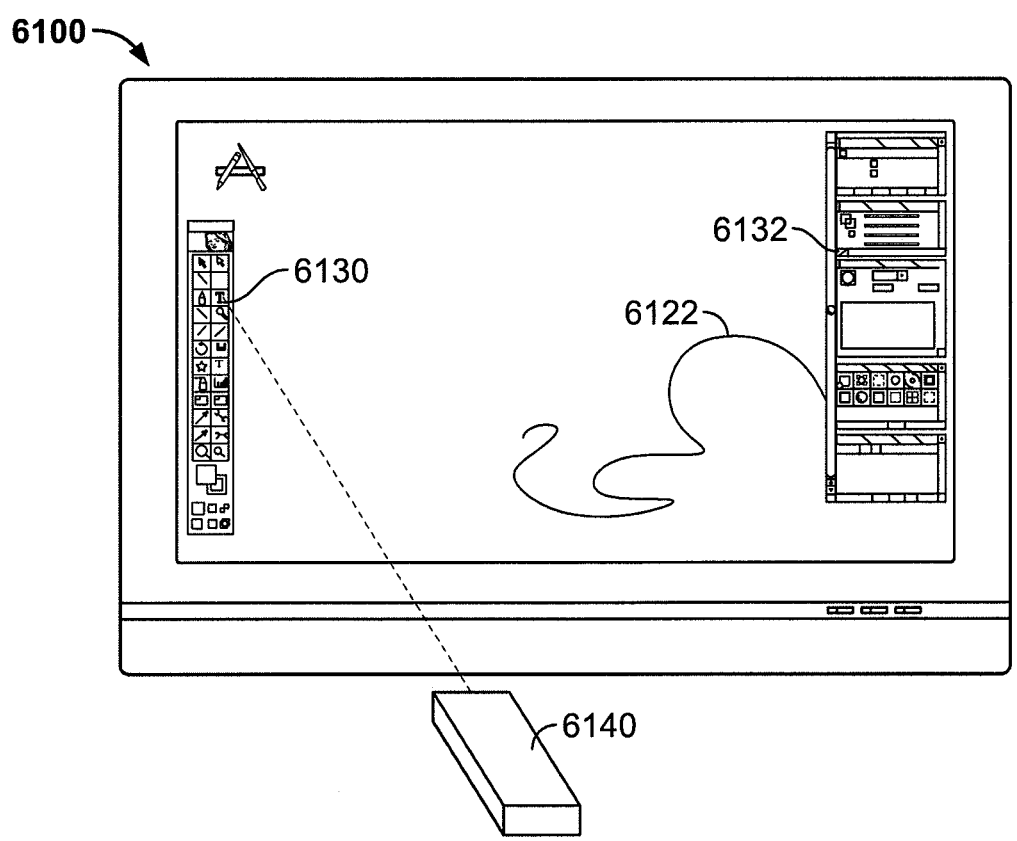
FIG. 61 is an illustrative display screen of options available to a user in an illustration application in accordance with one embodiment of the invention.

FIG. 61 is an illustrative display screen of options available to a user in an illustration application in accordance with one embodiment of the invention. Display screen 6100 may include drawing surface 6110 and line 6122. Display screen may also include illustration options 6130 and 6132, which may be any suitable option for drawing or creating a design. For example, illustration options 6130 and 6132 may include options for colors, drawing tools, layers, effects, or any other suitable option that may be desirable for drawing or creating a design.

The user may access options 6130 and 6132 in any suitable manner. For example, the user may provide an OPTIONS instruction using an input mechanism on wand 6140 (e.g., input mechanism 208, FIG. 2). As another example, the user may select on on-screen OPTIONS option. As still another example, the user may move wand 6140 in a particular manner (e.g., flicking wand 6140, rotating wand 6140 in a particular manner, or moving wand 6140 a particular distance off screen 6100).

Figure 62:
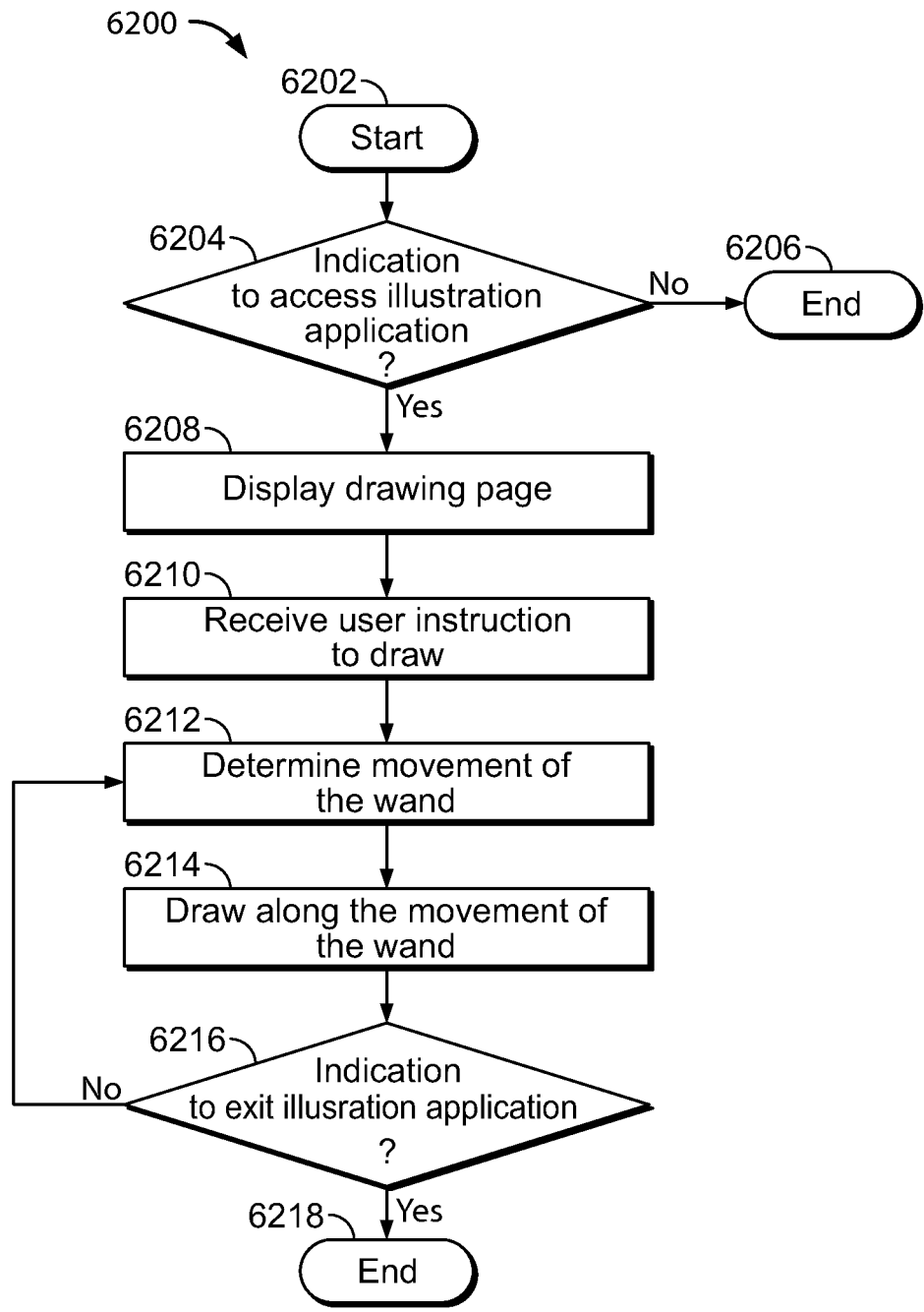
FIG. 62 is a flowchart of an illustrative process for accessing and using an illustration application in accordance with one embodiment of the invention.

FIG. 62 is a flowchart of an illustrative process for accessing and using an illustration application in accordance with one embodiment of the invention. Process 6200 begins at step 6202. At step 6204, the media system may determine whether the user has provided an indication to access the illustration application. For example, electronic device 104 (FIG. 1) may determine whether the user has provided an indication to access the illustration application with wand 106 (FIG. 1). The user may provide an indication in any suitable manner, including for example, providing an input on wand 106 (e.g., pressing a suitable key or key sequence on input mechanism 208, FIG. 2), or moving wand 106 in a particular manner (e.g., flicking wand 106 or moving wand 106 in a circular manner). If the media system determines that the user has not provided an indication to access the illustration application, process 6200 may move to step 6206 and end.

If, at step 6204, the media system instead determines that the user has provided an indication to access the image application, process 6200 may move to step 6208. At step 6208, the media system may display a drawing page. For example, electronic device 104 may, under the direction of the illustration application, display a drawing page on screen 102 (FIG. 1).

At step 6210, the media guidance application may receive an instruction to draw an image. For example, electronic device 104 may receive an indication from wand 106 (e.g., the user pressing a button on input mechanism 208, or the user moving wand 106 in a particular manner). At step 6212, the media guidance may determine the movement of the wand. For example, wand 106 may detect its successive positions and/or orientations relative to IR modules 120 and 122 (FIG. 1). In some embodiments, wand 106 may instead or in addition use information received from motion detection component 206 (FIG. 2) to determine the successive orientations of wand 106. Wand 106 may transmit the determined position and/or orientation information to electronic device 104 using any suitable approach so that electronic device 104 may determine the portion of screen 102 (FIG. 1) to which wand 106 points.

At step 6214, the media system may draw the lines of an image by drawing lines along the portions of the screen to which the wand points. For example, electronic device 104 may draw lines on the portions of the screens to which wand 106 points based on the successive positions and orientations determined at step 6212.

At step 6214, the media system may determine whether the user has provided an indication to exit the illustration application. For example, electronic device 104 may determine whether the user has provided an indication (e.g., using input mechanism 208 or by moving wand 106 in a specific manner) to exit the illustration application. If the media system determines that the user has provided an indication to exit the illustration application, process 6200 may move to step 6218 and end.

If, at step 6216, the media system instead determines that the user has not provided an indication to exit the illustration application, process 6200 may move back to step 6212 and the media system may continues to determine the movement of the wand.

Figure 63:
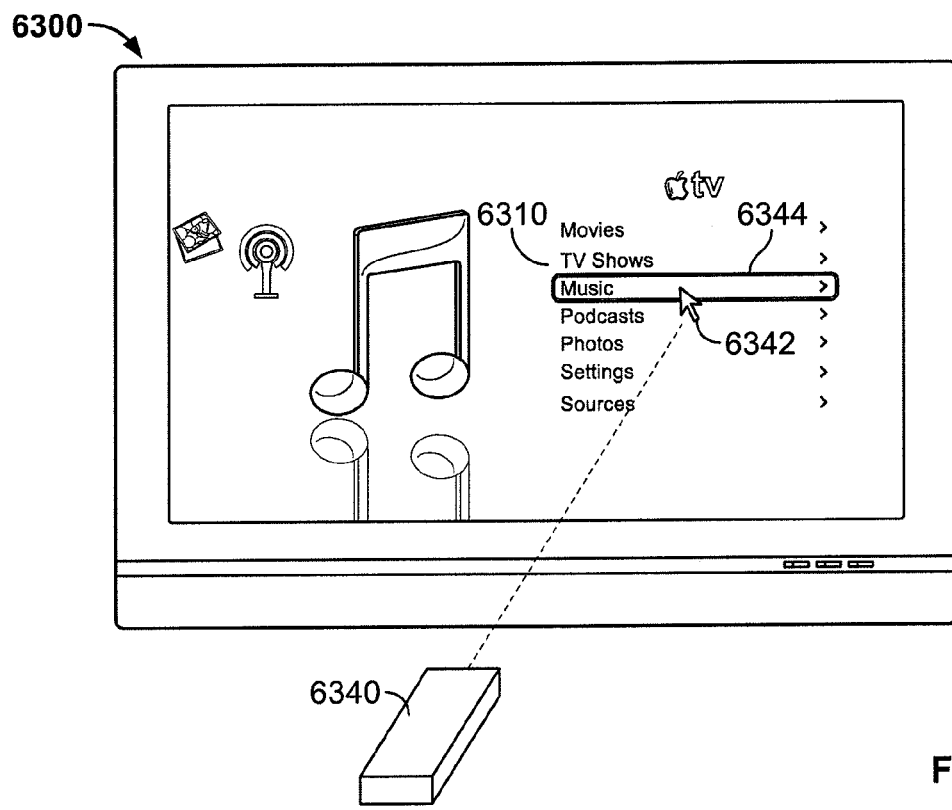
FIG. 63 shows an illustrative display for accessing a media application in accordance with one embodiment of the invention.

In some embodiments, the user may access and play back media (e.g., music and video) using a media application. FIG. 63 shows an illustrative display for accessing a media application in accordance with one embodiment of the invention. Display screen 6300 may include options 6310 for accessing functions of the media system. Options 6310 may include, for example, options to access media system applications (e.g., a media application or an image application), media system settings, and set-up options (e.g., to set-up sources for content). In some embodiments, the user may access the media application by selecting to view different types of media (e.g., movies, TV shows, music and podcasts options 6310). In some embodiments, the media system may include different media applications for different types of media.

The user may select an option 6310 by placing cursor 6342 over the option with wand 6340 and providing an indication for selecting the option. For example, the user may provide any suitable input with wand 6340 (e.g., provide an input using input mechanism 208, FIG. 2) or move wand 6340 in a particular manner (e.g., flick wand 6340, move wand 6340 in a circular manner, or point wand 6340 at a particular portion of screen 6300) to provide a selection indication. The media system may indicate that an option 6310 has been selected by placing highlight region 6344 over the selected option. In some embodiments, the user may control the position of highlight region 6344 instead of or in addition to controlling cursor 6342.

FIGS. 64-71 are illustrative displays of a media application in accordance with one embodiment of the invention. The displays of these figures include illustrative options and information related to playing back music. It will be understood, however, that similar displays may be used for any other suitable type of media.

Figure 64:
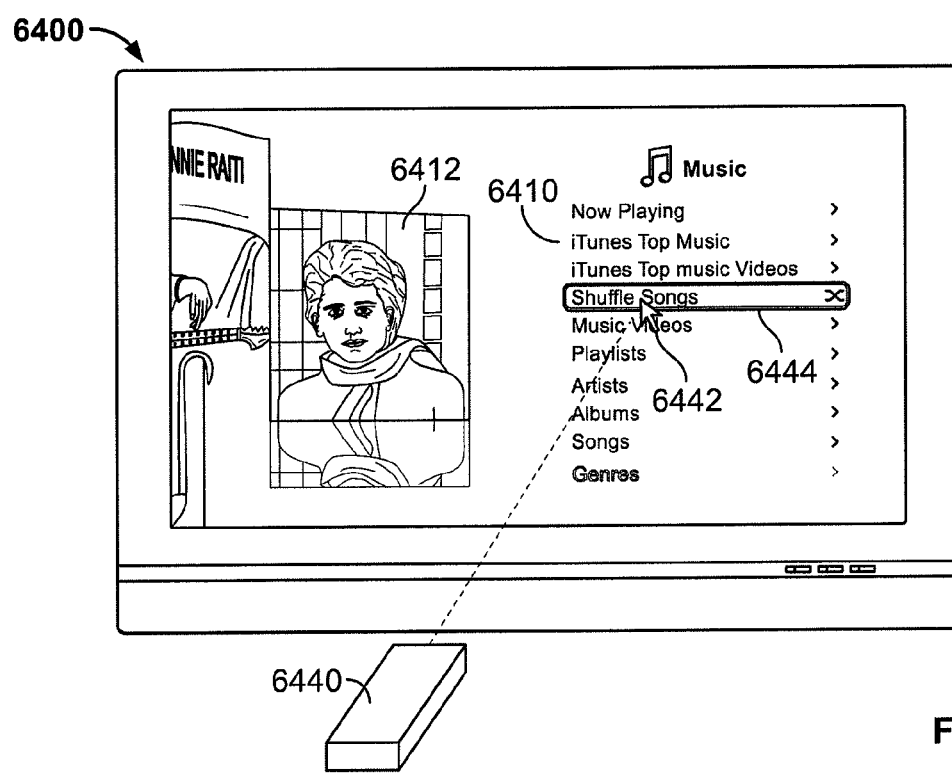
FIG. 64 is an illustrative display screen of a media application in accordance with one embodiment of the invention.

FIG. 64 is an illustrative display screen of a media application in accordance with one embodiment of the invention. Display 6400 may include media selection options 6410 and previews 6412. Media selection options 6410 may include a listing of media categories for organizing media available to the media system from one or more electronic devices. The media categories may include, for example, titles, artists, albums, genres, media length, source, or any other suitable categories. The user may select a media selection option 6410 in any suitable manner including, for example, placing cursor 6442 over media selection option 6410 and providing a selection instruction.

Previews 6412 may include preview images or video clips associated with media selection options 6410. The media system may automatically change the displayed preview 6412 to correspond to the media selection option 6410 that is currently highlighted by highlight region 6444. In some embodiments, the media system may only change the displayed preview 6412 in response to a user instruction while highlight region 6444 is over a media selection option 6410 (e.g., only change the displayed preview 6412 when the user provides a PREVIEW instruction with wand 6440).

Figure 65:
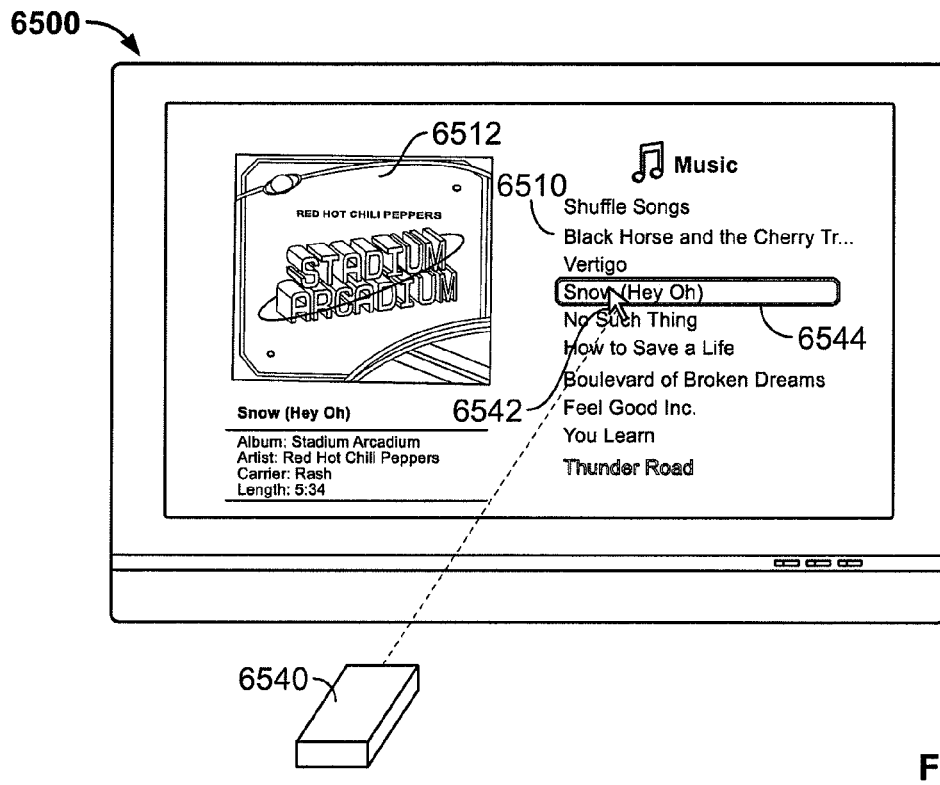
FIG. 65 is an illustrative display screen of a media playlist provided by a media application in accordance with one embodiment of the invention.

FIG. 65 is an illustrative display screen of a media playlist provided by a media application in accordance with one embodiment of the invention. Display screen 6500 may include playlist 6510 of media that the user may direct the media system to playback. The user may select a particular item from playlist 6510 by placing cursor 6542 over the item and providing a selection instruction. For example, the user may provide an input using an input mechanism or the user may move wand 6540 in a particular manner. The media guidance application may indicate that an item of listing 6510 has been selected by displaying highlight region 6540 over the item. In response to a selection of a media item, the media application may play back the media item, display additional information about the selected media item, or perform any other suitable operation Display screen 6500 may include illustration 6512 that is related to an item from playlist 6510. Illustration 6512 may be any suitable image or video, for example a poster, album art, or music video for an item of playlist 6510. The media system may automatically change the displayed illustration 6512 to correspond to a selected item from playlist 6510. In some embodiments, the media system may only change the displayed illustration 6512 in response to a user instruction while highlight region 6544 is over an item of playlist 6510 (e.g., only change the illustration 6512 when the user provides a SELECT instruction with wand 6540).

Figure 66:
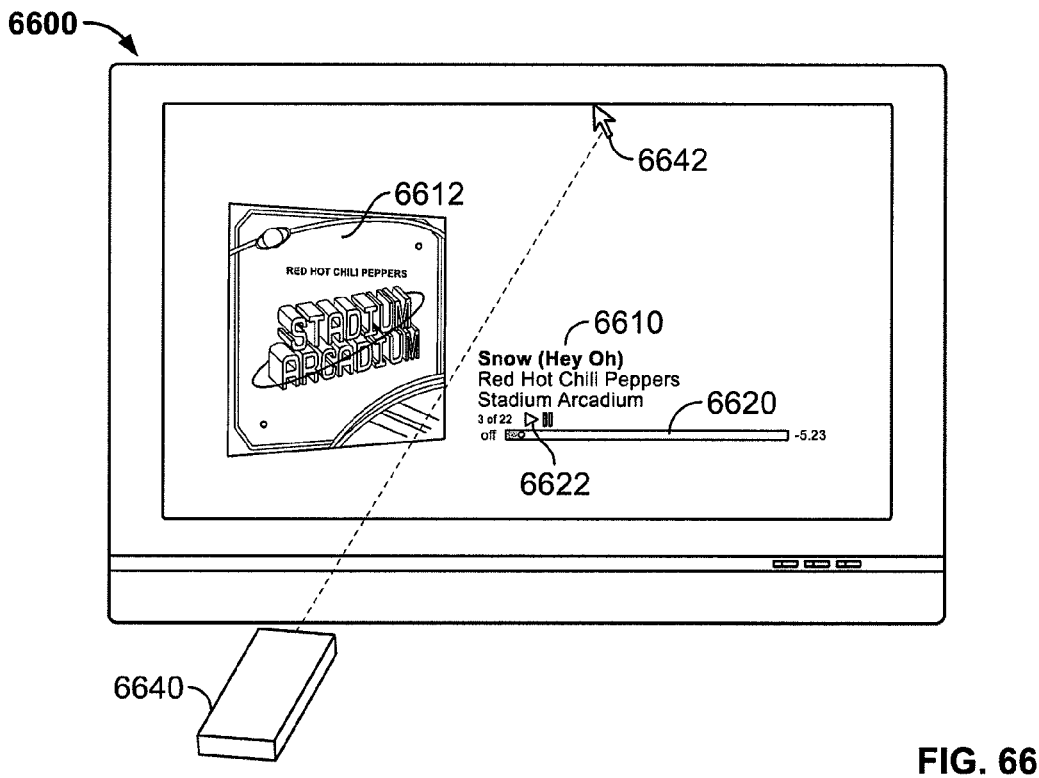
FIG. 66 is an illustrative display by which a user may play or pause media using a media application in accordance with one embodiment of the invention.

FIGS. 66 to 71 are illustrative display screens by which a user may control the operation of a media application in accordance with one embodiment of the invention. FIG. 66 is an illustrative display by which a user may play or pause media using a media application in accordance with one embodiment of the invention. Display 6600 may include media information 6610 and illustration 6612. Media information may include any suitable information about the media including, for example, the title, artist, album, date, or any other information.

Illustration 6612 may be any suitable image or video related to the media. For example, illustration 6612 may include a poster, album art, music video, or any other suitable illustration. Display 6600 may include media progress bar 6620. Progress bar 6620 may include information related to the length of the media and to the current position of the media (e.g., an indication of time left, and a progress marker). Progress bar 6620 may include icon 6622 indicating the current operation performed by the media application (e.g., play/pause icon 6622).

The user may direct the media application to pause or play media in any suitable manner. For example, the user may move wand 6640 in a particular manner (e.g., twist or flick wand 6640 in a particular direction). As another example, the user may move wand 6640 to point to a particular portion of screen 6600. In the example of FIG. 66, the user may move wand 6640 such that cursor 6642 is placed at the top of the screen to direct the media application to play and pause the media. For example, the user may point wand 6640 at the top portion of screen 6600, or the user may move wand 6640 up to move cursor 6642 to the top of screen 6600. In some embodiments, the media application may require the user to simultaneously move wand 6640 and provide an input (e.g., using an input mechanism or by flicking or twisting the wand) to play or pause the media.

Figure 67:
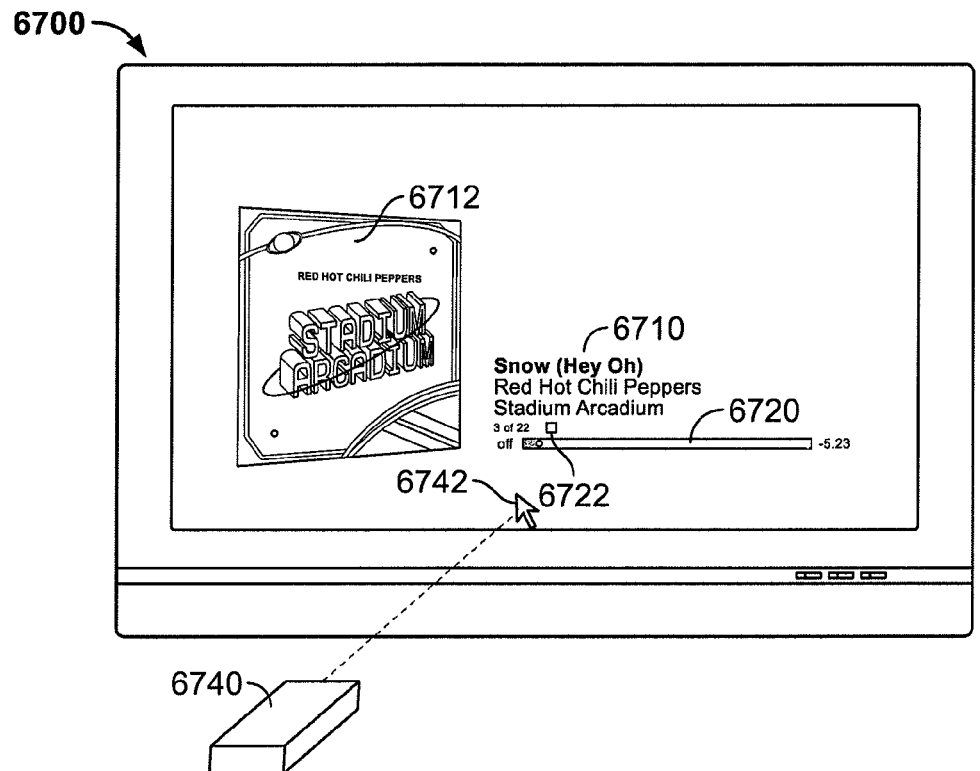
FIG. 67 is an illustrative display by which a user may stop media using a media application in accordance with one embodiment of the invention.

FIG. 67 is an illustrative display by which a user may stop media using a media application in accordance with one embodiment of the invention. Display 6700 may include media information 6710, illustration 6712, and progress bar 6720, which may include some or all of the features of media information 6610, illustration 6612, and progress bar 6620 (FIG. 66). Progress bar 6720 may include icon 6722 indicating the current operation performed by the media application (e.g., stop icon 6722).

The user may direct the media application to stop media in any suitable manner. For example, the user may move wand 6740 in a particular manner (e.g., twist or flick wand 6740 in a particular direction). As another example, the user may move wand 6740 to point to a particular portion of screen 6700. In the example of FIG. 67, the user may move wand 6740 such that cursor 6742 is placed at the bottom of the screen to direct the media application to stop the media. For example, the user may point wand 6740 at the bottom portion of screen 6700, or the user may move wand 6740 down to move cursor 6742 to the bottom of screen 6700. In some embodiments, the media application may require the user to simultaneously move wand 6740 and provide an input (e.g., using an input mechanism or by flicking or twisting the wand) to stop the media.

Figure 68:
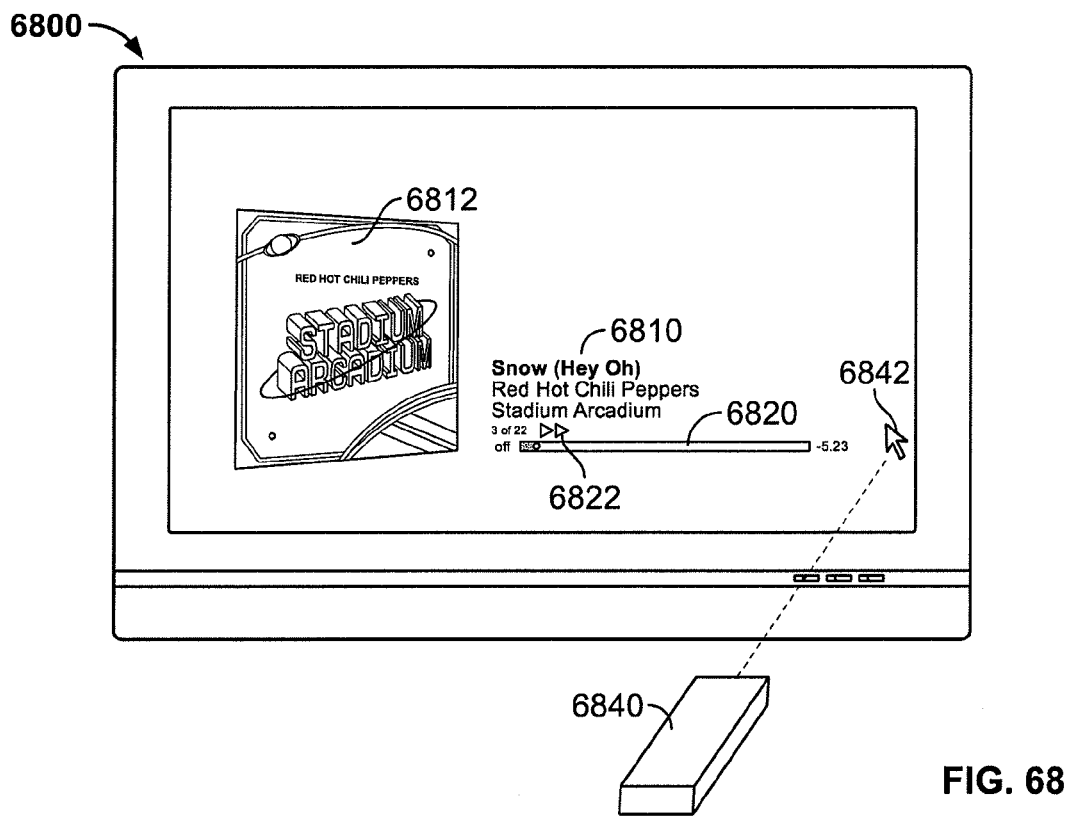
FIG. 68 is an illustrative display by which a user may fast forward media using a media application in accordance with one embodiment of the invention.

FIG. 68 is an illustrative display by which a user may fast forward media using a media application in accordance with one embodiment of the invention. Display 6800 may include media information 6810, illustration 6812, and progress bar 6820, which may include some or all of the features of media information 6610, illustration 6612, and progress bar 6620 (FIG. 66). Progress bar 6820 may include icon 6822 indicating the current operation performed by the media application (e.g., fast forward icon 6822).

The user may direct the media application to fast forward media in any suitable manner. For example, the user may move wand 6840 in a particular manner (e.g., twist or flick wand 6840 in a particular direction). As another example, the user may move wand 6840 to point to a particular portion of screen 6800. In the example of FIG. 68, the user may move wand 6840 such that cursor 6842 is placed at the right of the screen to direct the media application to fast forward the media. For example, the user may point wand 6840 at the right portion of screen 6800, or the user may move wand 6840 right to move cursor 6842 to the top of screen 6800. In some embodiments, the media application may require the user to simultaneously move wand 6840 and provide an input (e.g., using an input mechanism or by flicking or twisting the wand) to fast forward the media.

Figure 69:
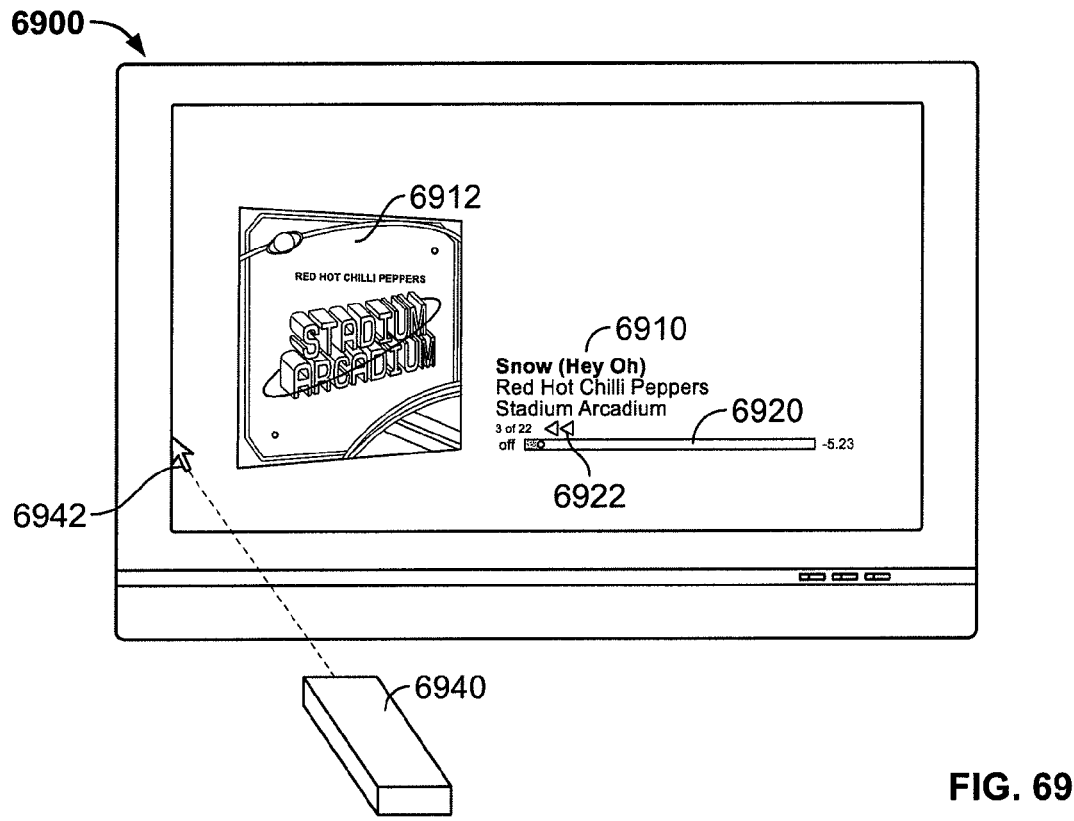
FIG. 69 is an illustrative display by which a user may rewind media using a media application in accordance with one embodiment of the invention.

FIG. 69 is an illustrative display by which a user may rewind media using a media application in accordance with one embodiment of the invention. Display 6900 may include media information 6910, illustration 6912, and progress bar 6920, which may include some or all of the features of media information 6610, illustration 6612, and progress bar 6620 (FIG. 66). Progress bar 6920 may include icon 6922 indicating the current operation performed by the media application (e.g., rewind icon 6922).

The user may direct the media application to rewind media in any suitable manner. For example, the user may move wand 6940 in a particular manner (e.g., twist or flick wand 6940 in a particular direction). As another example, the user may move wand 6940 to point to a particular portion of screen 6900. In the example of FIG. 69, the user may move wand 6940 such that cursor 6942 is placed at the left of the screen to direct the media application to rewind the media. For example, the user may point wand 6940 at the left portion of screen 6900, or the user may move wand 6940 up to move cursor 6942 to the left of screen 6900. In some embodiments, the media application may require the user to simultaneously move wand 6940 and provide an input (e.g., using an input mechanism or by flicking or twisting the wand) to rewind the media.

Figure 70:
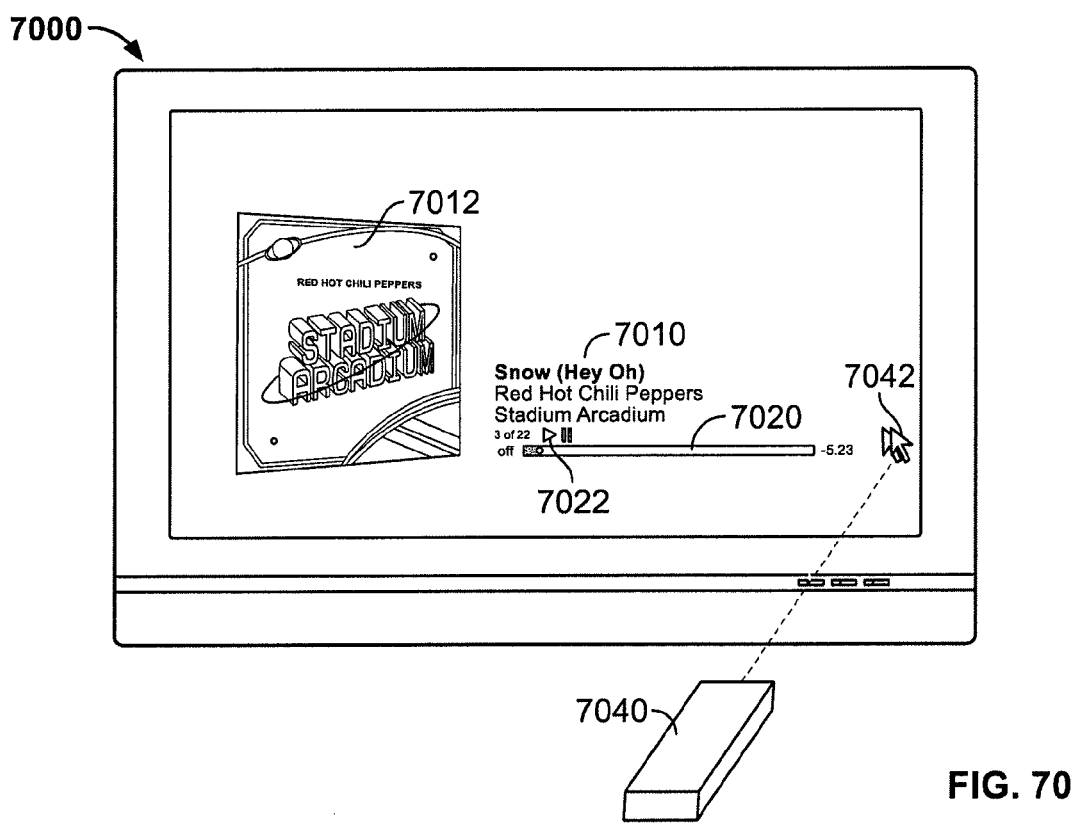
FIG. 70 is an illustrative display by which a user may skip to a next media item using a media application in accordance with one embodiment of the invention.

FIG. 70 is an illustrative display by which a user may skip to a next media item using a media application in accordance with one embodiment of the invention. Display 7000 may include media information 7010, illustration 7012, and progress bar 7020, which may include some or all of the features of media information 6610, illustration 6612, and progress bar 6620 (FIG. 66). Progress bar 7020 may include icon 7022 indicating the current operation performed by the media application (e.g., play icon 7022).

The user may direct the media application to skip to a next media item (e.g., the next item of a playlist) in any suitable manner. For example, the user may move wand 7040 in a particular manner (e.g., twist or flick wand 7040 in a particular direction). As another example, the user may move wand 7040 to point to a particular portion of screen 7000. In the example of FIG. 70, the user may move wand 7040 such that cursor 7042 is placed at the right edge of the screen to direct the media application to skip to a next media item. For example, the user may point wand 7040 beyond the right portion of screen 7000, or the user may move wand 7040 right to move cursor 6642 to the far right of screen 7000 (e.g., move wand 7040 faster or farther than the wand was moved to fast-forward media, as shown in FIG. 68). In some embodiments, cursor 7042 may be different than cursor 6842 (FIG. 68) to help the user differentiate between the fast forward and next operations. In some embodiments, the media application may require the user to simultaneously move wand 7040 and provide an input (e.g., using an input mechanism or by flicking or twisting the wand) to skip to a next media item.

Figure 71:
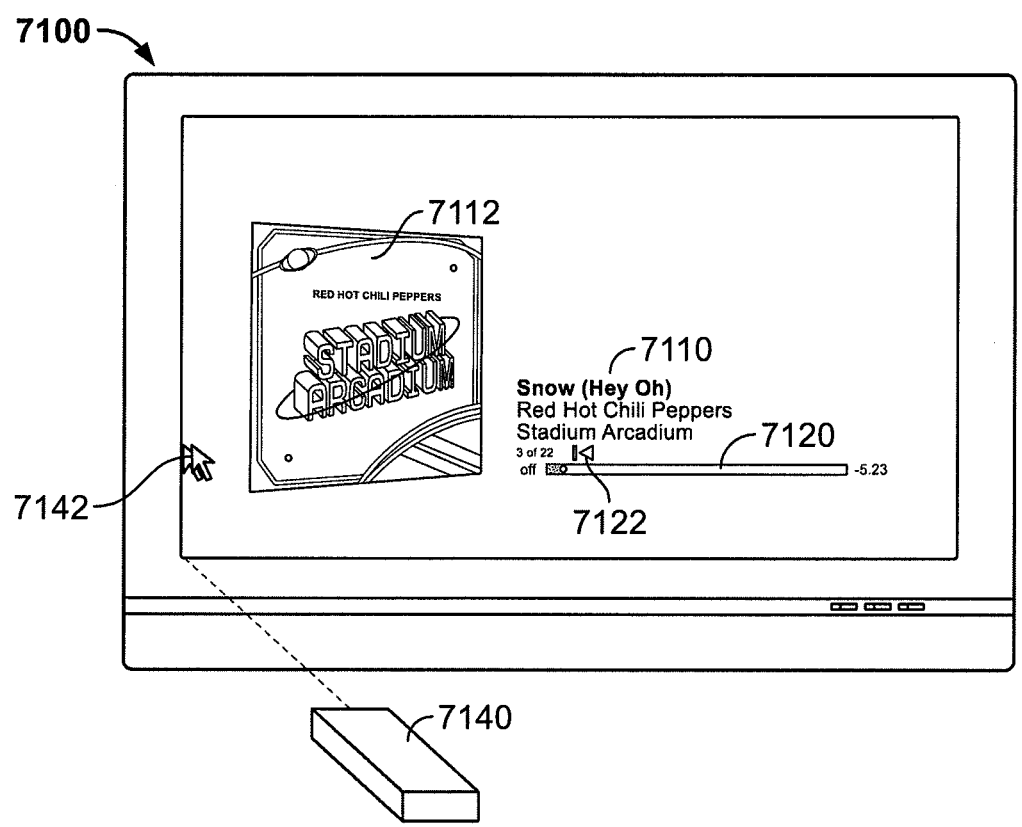
FIG. 71 is an illustrative display by which a user may skip to a previous item using a media application in accordance with one embodiment of the invention.

FIG. 71 is an illustrative display by which a user may skip to a previous media item using a media application in accordance with one embodiment of the invention. Display 7100 may include media information 7110, illustration 7112, and progress bar 7120, which may include some or all of the features of media information 6610, illustration 6612, and progress bar 6620 (FIG. 66). Progress bar 7120 may include icon 7122 indicating the current operation performed by the media application (e.g., previous icon 7122).

The user may direct the media application to skip to a previous media item (e.g., a previous item of a playlist) in any suitable manner. For example, the user may move wand 7140 in a particular manner (e.g., twist or flick wand 7140 in a particular direction). As another example, the user may move wand 7140 to point to a particular portion of screen 7100. In the example of FIG. 71, the user may move wand 7140 such that cursor 7142 is placed at the left edge of the screen to direct the media application to skip to a previous media item. For example, the user may point wand 7140 beyond the right portion of screen 7100, or the user may move wand 7140 left to move cursor 7142 to the far left of screen 7100 (e.g., move wand 7140 faster or farther than the wand was moved to rewind media, as shown in FIG. 69). In some embodiments, cursor 7142 may be different than cursor 6942 (FIG. 69) to help the user differentiate between the rewind and previous operations. In some embodiments, the media application may require the user to simultaneously move wand 7140 and provide an input (e.g., using an input mechanism or by flicking or twisting the wand) to skip to a previous media item.

The user may direct the media application to skip to a previous media item (e.g., a previous item of a playlist) in any suitable manner. For example, the user may move wand 7140 in a particular manner (e.g., twist or flick wand 7140 in a particular direction). As another example, the user may move wand 7140 to point to a particular portion of screen 7100. In the example of FIG. 71, the user may move wand 7140 such that cursor 7142 is placed at the left edge of the screen to direct the media application to skip to a previous media item. For example, the user may point wand 7140 beyond the right portion of screen 7100, or the user may move wand 7140 left to move cursor 6642 to the far left of screen 7100 (e.g., move wand 7140 faster or farther than the wand was moved to rewind media, as shown in FIG. 69). In some embodiments, cursor 7142 may be different than cursor 6942 (FIG. 69) to help the user differentiate between the rewind and previous operations. In some embodiments, the media application may require the user to simultaneously move wand 7140 and provide an input (e.g., using an input mechanism or by flicking or twisting the wand) to skip to a previous media item.

Figure 72:
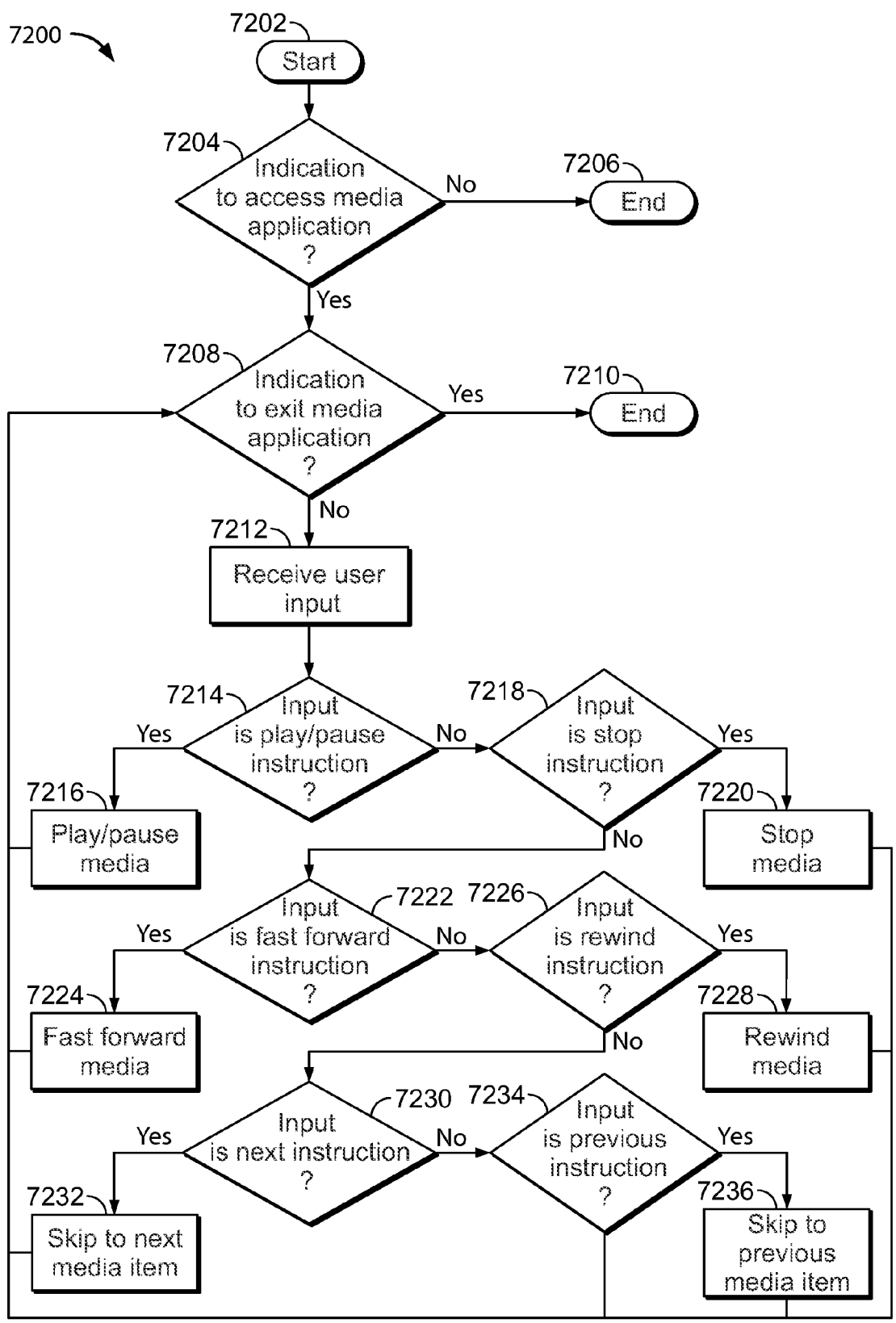
FIG. 72 is a flowchart of an illustrative process for controlling a media application in accordance with one embodiment of the invention.

FIG. 72 is a flowchart of an illustrative process for controlling a media application in accordance with one embodiment of the invention. Process 7200 begins at step 7202. At step 7204, the media system may determine whether the user has provided an indication to access the media application. For example, electronic device 104 (FIG. 1) may determine whether the user has provided an indication to access the media application with wand 106 (FIG. 1). The user may provide an indication in any suitable manner, including for example, providing an input on wand 106 (e.g., pressing a suitable key or key sequence on input mechanism 208, FIG. 2), or moving wand 106 in a particular manner (e.g., flicking wand 106 or moving wand 106 in a circular manner). If the media system determines that the user has not provided an indication to access the media application, process 7200 may move to step 7206 and end.

If, at step 7204, the media system instead determines that the user has provided an indication to access the media application, process 7200 may move to step 7208. At step 7208, the media system may determine whether the user has provided an indication to exit the media application. For example, electronic device 104 may determine whether the user has provided an indication to exit the media application with wand 106. The user may provided an indication in any suitable manner, including for example, providing an input on wand 106 (e.g., pressing a suitable key or key sequence on input mechanism 208), or moving wand 106 in a particular manner (e.g., flicking wand 106 or moving wand 106 in a circular manner). If the media system determines that the user has provided an indication to exit the media application, process 7200 may move to step 7210 and end.

If, at step 7208, the media system instead determines that the user has not provided an indication to exit the media application, process 7200 may move to step 7212. At step 7212, the media system may receive a user input. For example, electronic device 104 may receive an input from wand 106. The user may provide any suitable input, including for example, providing an input on wand 106, moving wand 106 in a particular manner, or combinations of these (e.g., pressing a button and flicking wand 106).

At step 7214, the media system may determine whether the input received at step 7212 is an instruction to play or pause media. For example, electronic device 104 may determine whether the user has provided an input that is associated with the play or pause instruction. The play or pause instruction may be any suitable instruction, including for example directing a cursor to move to the top portion of screen 102 (FIG. 1) by pointing wand 106 to that portion of screen 102 or by moving wand 106 in a particular manner (e.g., up). If the media system determines that the instruction received at step 7212 is to play or pause media, process 7200 may move to step 7216. At step 7216, the media system may play or pause media. For example, electronic device 104 may play or pause media (e.g., the media currently selected or displayed on screen 102). Process 7200 may then move back to step 7208, and the media system may monitor user interactions with the wand.

If, at step 7214, the media system instead determines that the input received at step 7212 is not an instruction to play or pause media, process 7200 may move to step 7218. At step 7218, the media system may determine whether the input received at step 7212 is an instruction to stop currently playing media. For example, electronic device 104 may determine whether the user has provided an input that is associated with the stop instruction. The stop instruction may be any suitable instruction, including for example directing a cursor to move to the bottom portion of screen 102 by pointing wand 106 to that portion of screen 102 or by moving wand 106 in a particular manner (e.g., down). If the media system determines that the instruction received at step 7212 is to stop currently playing media, process 7200 may move to step 7220. At step 7220, the media system may stop the media. For example, electronic device 104 may stop the currently played media. Process 7200 may then move back to step 7208, and the media system may monitor user interactions with the wand.

If, at step 7218, the media system instead determines that the input received at step 7212 is not an instruction to stop currently playing media, process 7200 may move to step 7222. At step 7222, the media system may determine whether the input received at step 7212 is an instruction to fast forward media. For example, electronic device 104 may determine whether the user has provided an input that is associated with the fast forward instruction. The fast forward instruction may be any suitable instruction, including for example directing a cursor to move to the right portion of screen 102 by pointing wand 106 to that portion of screen 102 or by moving wand 106 in a particular manner (e.g., right). If the media system determines that the instruction received at step 7212 is to fast forward media, process 7200 may move to step 7224. At step 7224, the media system may fast forward the media. For example, electronic device 104 may fast forward the currently played media. Process 7200 may then move back to step 7208, and the media system may monitor user interactions with the wand.

If, at step 7222, the media system instead determines that the input received at step 7212 is not an instruction to fast forward media, process 7200 may move to step 7226. At step 7226, the media system may determine whether the input received at step 7212 is an instruction to rewind media. For example, electronic device 104 may determine whether the user has provided an input that is associated with the rewind instruction. The rewind instruction may be any suitable instruction, including for example directing a cursor to move to the left portion of screen 102 by pointing wand 106 to that portion of screen 102 or by moving wand 106 in a particular manner (e.g., left). If the media system determines that the instruction received at step 7212 is to rewind media, process 7200 may move to step 7228. At step 7228, the media system may rewind the media. For example, electronic device 104 may rewind the currently played media. Process 7200 may then move back to step 7208, and the media system may monitor user interactions with the wand.

If, at step 7226, the media system instead determines that the input received at step 7212 is not an instruction to rewind media, process 7200 may move to step 7230. At step 7230, the media system may determine whether the input received at step 7212 is an instruction to skip to the next media item. For example, electronic device 104 may determine whether the user has provided an input that is associated with the next instruction. The next instruction may be any suitable instruction, including for example directing a cursor to move to the right portion of screen 102 by pointing wand 106 off of the right portion of screen 102 or by moving wand 106 in a particular manner (e.g., far right). If the media system determines that the instruction received at step 7212 is to skip to the next media item, process 7200 may move to step 7232. At step 7232, the media system may skip to the next media item. For example, electronic device 104 may skip to the next item of the currently selected playlist (e.g., a playlist previously selected when the user started playing media). If the current media item is the last of the playlist, electronic device 104 may either stop playing the media, or may skip to the first item of the playlist. Process 7200 may then move back to step 7208, and the media system may monitor user interactions with the wand.

If, at step 7230, the media system instead determines that the input received at step 7212 is not an instruction to skip to the next media item, process 7200 may move to step 7234. At step 7234, the media system may determine whether the input received at step 7212 is an instruction to skip to the previous media item. For example, electronic device 104 may determine whether the user has provided an input that is associated with the previous instruction. The previous instruction may be any suitable instruction, including for example directing a cursor to move to the left portion of screen 102 by pointing wand 106 off of the left portion of screen 102 or by moving wand 106 in a particular manner (e.g., far left). If the media system determines that the instruction received at step 7212 is to skip to the previous media item, process 7200 may move to step 7236. At step 7236, the media system may skip to the previous media item. For example, electronic device 104 may skip to the previous item of the currently selected playlist (e.g., a playlist previously selected when the user started playing media). If the current media item is the first of the playlist, electronic device 104 may either stop playing the media, or may skip to the last item of the playlist. Process 7200 may then moves back to step 7208, and the media system may monitor user interactions with the wand.

If, at step 7230, the media system instead determines that the input received at step 7212 is not an instruction to skip to the previous media item, process 7200 may move to step 7208, and the media system may continue to monitor user interactions with the wand.

The above described embodiments of the present invention are presented for purposes of illustration and not of limitation, and the present invention is limited only by the claims which follow.

What is claimed is:

1. A method for scrolling through content with a media system comprising a screen and a wand for providing user inputs, the method comprising:

displaying content on the screen, wherein the content comprises an indication that additional content is hidden from view beyond at least a first edge of the screen;

detecting that the wand was moved based on a transmission received from the wand, the transmission comprising either an instruction to move a cursor towards the first edge of the screen or an instruction to move the cursor beyond the first edge of the screen;

in the event that the transmission comprises the instruction to move the cursor towards the first edge of the screen, scrolling the content on the screen such that at least a portion of the additional content hidden from view beyond the first edge of the screen is displayed and a portion of the content previously displayed is hidden from view beyond a second edge of the screen opposite the first edge, wherein the content is scrolled at a rate based in part on a distance between the cursor and the center of the screen; and in the event that the transmission comprises the instruction to move the cursor beyond the first edge of the screen, paging the content on the screen such that at least a portion of the additional content hidden from view beyond the first edge of the screen is displayed and all of the content previously displayed is hidden from view beyond the second edge of the screen, wherein the content is paged at a rate based in part on a distance between the first edge of the screen and a point beyond the first edge of the screen that the wand is pointing to.

2. The method of claim 1, further comprising:
receiving the transmission comprising an output of at least one motion detection component incorporated in the wand; and
moving the cursor on the screen based on the received transmission.

3. The method of claim 2, wherein the motion detection component comprises at least one of an accelerometer and a gyroscope.

4. The method of claim 3, further comprising:
determining the amount and orientation of the movement of the wand based on the output of the at least one motion detection component; and
wherein displaying the additional content further comprises displaying the additional content based on the determined amount and orientation.

5. A system for displaying content to a user, the system comprising an electronic device, a display, and a wand, the electronic device operative to:
direct the display to display a plurality of initial objects in a display area of the display, wherein the plurality of initial objects form a portion of a set of objects, the set of objects further including a plurality of undisplayed objects, and to further display an indication that the plurality of undisplayed objects of the set of objects is hidden beyond a first edge of the display;
receive a transmission from a motion detection component of the wand indicating that the wand was moved towards the first edge;
in response to the received transmission, determining whether the wand was moved beyond the first edge;
in the event that the wand was not moved beyond the first edge, directing the display to scroll the set of objects such that at least one object from the plurality of undisplayed objects moves into the display area from beyond the first edge, toward which the wand was moved, and at least one object of the plurality of initial objects moves out of the display area beyond a second edge of the display, the second edge opposite the first edge, wherein the set of objects are scrolled at a rate based in part on a distance between the center of the display and a point within the display that the wand is pointing to; and
in the event that the wand was moved beyond the first edge, directing the display to page the set of objects such that at least two of the plurality of undisplayed objects move into the display area from beyond the first edge, beyond which the wand was moved, and all of the plurality of initial objects move out of the display area beyond the second edge, wherein the set of objects are paged at a rate based in part on a distance between the first edge and a point beyond the first edge that the wand is pointing to.

6. The system of claim 5, wherein the motion detection component comprises at least one of an accelerometer and a gyroscope.

7. The system of claim 5, wherein the electronic device is further operative to:
determine the speed with which the wand was moved from the received transmission; and
direct the display to scroll or page the set of objects at a rate related to the determined speed.

8. A non-transitory machine-readable medium for scrolling through content with a media system comprising a screen and a wand for providing user inputs, comprising machine program logic recorded thereon for:
displaying content on the screen, wherein the content comprises an indication that additional content is hidden from view beyond at least a first edge of the screen;
detecting that the wand was moved based on a transmission received from the wand, the transmission comprising either an instruction to move a cursor towards the at least one edge of the screen or an instruction to move the cursor beyond the first edge of the screen;
in the event that the transmission comprises the instruction to move the cursor towards the first edge of the screen, scrolling the content on the screen such that at least a portion of the additional content hidden from view beyond the first edge of the screen is displayed and a portion of the content previously displayed is hidden from view beyond a second edge of the screen opposite the first edge, wherein the content is scrolled at a rate based in part on a distance between the cursor and the center of the screen; and
in the event that the transmission comprises the instruction to move the cursor beyond the first edge of the screen, paging the content on the screen such that at least a portion of the additional content hidden from view beyond the first edge of the screen is displayed and all of the content previously displayed is hidden from view beyond the second edge of the screen, wherein the content is paged at a rate based in part on a distance between the first edge of the screen and a point beyond the first edge of the screen that the wand is pointing to.

9. The non-transitory machine-readable medium of claim 8, further comprising additional machine program logic recorded thereon for:
receiving the transmission comprising an output of at least one motion detection component incorporated in the wand; and
moving the cursor on the screen based on the received transmission.

10. The non-transitory machine-readable medium of claim 9, wherein the motion detection component comprises at least one of an accelerometer and a gyroscope.

11. The method of claim 1 wherein the first edge of the screen corresponds to one of a right edge or a left edge and the second edge of the screen corresponds to the other of the right edge or the left edge.

12. The method of claim 1 wherein the first edge of the screen corresponds to one of a top edge or a bottom edge and the second edge of the screen corresponds to the other of the top edge or the bottom edge.

* * * * *